US012680915B2

(12) United States Patent　　(10) Patent No.:　US 12,680,915 B2

Matsumoto et al.　　(45) Date of Patent:　Jul. 14, 2026

(54) TIRE TESTING DEVICE

(71) Applicant: KOKUSAI KEISOKUKI KABUSHIKI KAISHA, Tama (JP)

(72) Inventors: Sigeru Matsumoto, Tokyo (JP); Hiroshi Miyashita, Tokyo (JP); Kazuhiro Murauchi, Tokyo (JP); Shuichi Tokita, Kanagawa (JP)

(73) Assignee: KOKUSAI KEISOKUKI KABUSHIKI KAISHA, Tama (JP)

( * ) Notice: Subject to any disclaimer, the term of this patent is extended or adjusted under 35 U.S.C. 154(b) by 337 days.

(21) Appl. No.: 18/182,433

(22) Filed: Mar. 13, 2023

(65) Prior Publication Data

US 2023/0213411 A1　　Jul. 6, 2023

Related U.S. Application Data

(63) Continuation-in-part of application No. PCT/JP2021/035867, filed on Sep. 29, 2021.

(30) Foreign Application Priority Data

Sep. 30, 2020　(JP) ................................. 2020-166577

(51) Int. Cl.
　　*G01M 17/02*　　(2006.01)
　　*B60C 25/00*　　(2006.01)
(52) U.S. Cl.
　　CPC ........... *G01M 17/02* (2013.01); *B60C 25/002* (2013.01)
(58) Field of Classification Search
　　CPC .. G02M 17/013; G02M 17/02; G02M 17/021; G02M 17/022; B60C 19/00; B60C 25/002
　　See application file for complete search history.

(56) References Cited

U.S. PATENT DOCUMENTS 3,345,865 A　　10/1967　Ostrander
3,726,124 A　　4/1973　Obarski
(Continued)

FOREIGN PATENT DOCUMENTS

CN　　202851645 U　　4/2013
CN　　107367396 A　　11/2017
(Continued)

OTHER PUBLICATIONS

Foreign Reference.*

(Continued)

*Primary Examiner* — Jill E Culler
(74) *Attorney, Agent, or Firm* — Oliff PLC

(57)　　ABSTRACT

A tire testing device includes a road surface, and a carriage configured to rotatably hold a test wheel and traveling along the road surface. The carriage includes an alignment part configured to adjust wheel alignment of the test wheel. The alignment part includes a load adjusting part configured to adjust load acting on the test wheel. The load adjusting part includes a first movable frame movable up and down, a linear guide that guides the movement of the first movable frame, and a first driver that drives the first movable frame up and down. One of a rail and a traveling part of the linear guide is fixed to the first movable frame. The carriage includes a main frame having an alignment mechanism support part that accommodates the alignment part. The other of the rail and the traveling part is fixed to the alignment mechanism support part.

12 Claims, 35 Drawing Sheets

(56)      References Cited

U.S. PATENT DOCUMENTS

| | | | |
|---|---|---|---|
| 3,861,208 A | 1/1975 | Lippmann et al. | |
| 3,878,712 A | 4/1975 | Chapin | |
| 3,948,095 A | 4/1976 | Burgett et al. | |
| 3,999,429 A * | 12/1976 | Pennells | G01M 17/02 |
| | | | 73/146 |
| 4,344,324 A | 8/1982 | Anger | |
| 4,458,527 A | 7/1984 | McFarland et al. | |
| 4,848,143 A | 7/1989 | Ushikoshi | |
| 4,936,138 A | 6/1990 | Cushman et al. | |
| 4,958,512 A | 9/1990 | Johnsen | |
| 5,027,649 A | 7/1991 | Himmler | |
| 5,029,467 A | 7/1991 | Cargould | |
| 5,067,348 A | 11/1991 | Himmler et al. | |
| 5,111,687 A | 5/1992 | Hill | |
| 5,289,718 A | 3/1994 | Mousseau | |
| 5,317,912 A | 6/1994 | Mallison | |
| 5,481,907 A | 1/1996 | Chasco et al. | |
| 6,094,979 A | 8/2000 | Haslett | |
| 6,192,736 B1 | 2/2001 | Clem | |
| 6,578,275 B1 | 6/2003 | Delmoro et al. | |
| 7,509,847 B2 | 3/2009 | Halliday | |
| 7,552,630 B2 | 6/2009 | Delmoro et al. | |
| 7,908,916 B2 | 3/2011 | Jenniges et al. | |
| 7,908,917 B2 | 3/2011 | Kitagawa et al. | |
| 8,776,587 B2 | 7/2014 | Sumitani et al. | |
| 8,794,059 B2 | 8/2014 | Wollbrinck et al. | |
| 8,869,618 B2 | 10/2014 | Wakao | |
| 9,140,628 B2 * | 9/2015 | Symens | G01M 17/022 |
| 9,677,972 B2 | 6/2017 | Symens et al. | |
| 9,746,396 B2 | 8/2017 | Seimoto et al. | |
| 10,281,417 B2 | 5/2019 | Ueda et al. | |
| 10,371,603 B2 | 8/2019 | Koike | |
| 10,585,020 B2 * | 3/2020 | Smith | G01M 17/02 |
| 10,782,209 B2 | 9/2020 | Matuszny et al. | |
| 11,549,863 B2 | 1/2023 | Matuszny et al. | |
| 11,867,588 B2 | 1/2024 | Matsumoto et al. | |
| 2003/0061719 A1 | 4/2003 | Gerdes | |
| 2007/0280573 A1 | 12/2007 | Yoshikawa et al. | |
| 2008/0282789 A1 | 11/2008 | Regis et al. | |
| 2010/0064789 A1 | 3/2010 | Schraudolf et al. | |
| 2010/0254648 A1 | 10/2010 | Yoshikawa et al. | |
| 2011/0048120 A1 | 3/2011 | Dank et al. | |
| 2012/0260726 A1 | 10/2012 | Cuttino | |
| 2013/0006514 A1 | 1/2013 | Martin et al. | |
| 2014/0090461 A1 | 4/2014 | Cuttino | |
| 2014/0250997 A1 | 9/2014 | Sprenger et al. | |
| 2014/0260583 A1 | 9/2014 | Vernyi et al. | |
| 2016/0054199 A1 | 2/2016 | Fritz et al. | |
| 2017/0115187 A1 | 4/2017 | Symens et al. | |
| 2021/0025784 A1 | 1/2021 | Matsumoto et al. | |
| 2022/0244143 A1 | 8/2022 | Matsumoto et al. | |
| 2023/0213411 A1 | 7/2023 | Matsumoto et al. | |
| 2024/0060858 A1 | 2/2024 | Matsumoto et al. | |

FOREIGN PATENT DOCUMENTS

| | | | | |
|---|---|---|---|---|
| CN | 110998274 A | 4/2020 | | |
| EP | 2 192 567 A1 | 6/2010 | | |
| EP | 2426475 A1 | 3/2012 | | |
| EP | 2482054 A1 | 8/2012 | | |
| JP | H08-64564 A | 3/1996 | | |
| JP | 2003-269948 A | 9/2003 | | |
| JP | 2005-265748 A | 9/2005 | | |
| JP | 2007-522467 A | 8/2007 | | |
| JP | 2007-309508 A | 11/2007 | | |
| JP | 2009-180715 A | 8/2009 | | |
| JP | 2013-520667 A | 6/2013 | | |
| JP | 2013-156087 A | 8/2013 | | |
| JP | 2013-238565 A | 11/2013 | | |
| JP | 2013-246008 A | 12/2013 | | |
| JP | 2014-020807 A | 2/2014 | | |
| JP | 2014-181958 A | 9/2014 | | |
| JP | 2015-072215 A | 4/2015 | | |
| JP | 2016-080414 A | 5/2016 | | |
| JP | 2019-124693 A | 7/2019 | | |
| KR | 10-0822961 B1 | 4/2008 | | |
| KR | 101489239 B1 | 2/2015 | | |
| KR | 10-2005187 B1 | 7/2019 | | |
| WO | WO-2015005099 A1 * | 1/2015 | | G01M 17/02 |
| WO | 2019/203359 A1 | 10/2019 | | |

OTHER PUBLICATIONS

Dec. 28, 2021 International Search Report issued in International Patent Application No. PCT/JP2021/035867.

Jul. 23, 2019 International Search Report issued in International Patent Application No. PCT/JP2019/016890.

Dec. 28, 2020 International Search Report issued in International Application No. PCT/JP2020/040018.

Feb. 7, 2022 Extended European Search Report issued in European Patent Application No. 19788227.7.

Aug. 12, 2020 International Preliminary Report on Patentability issued in International Patent Application No. PCT/JP2019/016890.

Jan. 31, 2022 International Preliminary Report on Patentability issued in Patent Application No. PCT/JP2020/040018.

Aug. 8, 2022 Office Action issued in Chinese Patent Application No. 201980027057.1.

U.S. Appl. No. 17/718,589, filed Apr. 12, 2022 in the name of Matsumoto et al.

U.S. Appl. No. 17/071,252, filed Oct. 15, 2020 in the name of Matsumoto et al.

May 20, 2024 U.S. Office Action issued in U.S. Appl. No. 18/385,562.

Sep. 16, 2024 extended European Search Report issued in European Application No. 21875695.5.

Sep. 6, 2023 Extended Search report issued in European Patent Application No. 20879611.0.

Feb. 2, 2024 Extended Search Report issued in European Patent Application No. 23196877.7.

Oct. 31, 2024 Notice of Allowance issued in U.S. Appl. No. 17/718,589.

Aug. 16, 2023 Notice of Allowance issued in U.S. Appl. No. 17/071,252.

Aug. 28, 2023 Notice of Allowance issued in U.S. Appl. No. 17/071,252.

Mar. 28, 2024 Office Action issued in U.S. Appl. No. 17/718,589.

Jul. 31, 2023 Office Action issued in Japanese Patent Application No. 2019-194640.

Aug. 19, 2024 Notice of Allowance issued in U.S. Appl. No. 18/385,562.

* cited by examiner

C-C

D-D

TIRE TESTING DEVICE

CROSS REFERENCE TO RELATED APPLICATIONS

This is a Continuation-in-Part of International Application No. PCT/JP2021/035867 filed on Sep. 29, 2021, which claims priority from Japanese Patent Application No. 2020-166577 filed on Sep. 30, 2020. The entire disclosures of the prior applications are incorporated herein by reference.

BACKGROUND

Technical Field

Aspects of the present disclosure relate to a tire testing device.

Related Art

As tests for evaluating tire performance, an on-road test in which test tires are for example mounted to wheel rims of a test-dedicated vehicle and the test-dedicated vehicle is made to run on actual roads and an indoor test (bench test) in which a testing device installed indoor is used are known. The bench test is excellent at repeatability as compared to the on-road test.

A conventional testing device to be used in the bench test of tires includes a rotating drum to which a simulated road surface is provided on its outer peripheral surface, and the test is performed by causing a test tire and the drum to rotate in a state where the test tire is made to contact with the simulated road surface.

SUMMARY

Since tire performance is influenced by conditions of road surfaces, the tire performance needs to be evaluated for road surfaces of various conditions. However, in the conventional testing device for the bench test, since the simulated road surface is made to run at high speed during the test, it is difficult to perform the test in road surface conditions in which the road surface is covered with rain, snow, gravel or the like.

At least one aspects of the present disclosure are advantageous to provide a technique to provide a tire testing device that is capable of performing the bench test in various road surface conditions.

According to aspects of the present disclosure, there is provided a tire testing device including a road surface, and a carriage configured to rotatably hold a test wheel on which a test tire is mounted and traveling along the road surface in a state where the test tire is made to contact the road surface. The carriage includes an axle part that rotatably supports the test wheel, and an alignment part configured to adjust wheel alignment of the test wheel by changing orientation of the axle part. The alignment part includes a load adjusting part configured to adjust load acting on the test wheel by changing a height of the axle part. The load adjusting part includes a first movable frame supported to be movable up and down, a linear guide that guides the up-and-down movement of the first movable frame, and a first driver that drives the first movable frame up and down. The linear guide includes a rail, and a traveling part configured to travel on the rail. One of the rail and the traveling part is fixed to the first movable frame. The carriage includes a main frame having an alignment mechanism support part that accommodates the alignment part. The other of the rail and the traveling part is fixed to the alignment mechanism support part.

According to aspects of the present disclosure, there is further provided a tire testing device including a road surface, and a carriage configured to rotatably hold a test wheel on which a test tire is mounted and traveling along the road surface in a state where the test tire is made to contact the road surface. The carriage includes an axle part that rotatably supports the test wheel, and an alignment part configured to adjust wheel alignment of the test wheel by changing orientation of the axle part. The alignment part includes a load adjusting part configured to adjust load acting on the test wheel by changing a height of the axle part. The load adjusting part includes a first movable frame supported to be movable up and down, a linear guide that guides the up-and-down movement of the first movable frame, and a first driver that drives the first movable frame up and down. The alignment part includes a camber adjusting part configured to adjust a camber angle of the test wheel. The camber adjusting part includes a second movable frame supported so as to be rotatable about an $E_\varphi$ axis parallel to a traveling direction of the carriage, a $\varphi$ driver that rotationally drives the second movable frame about the $E_\varphi$ axis, a cylindrical first pivot disposed coaxially with the $E_\varphi$ axis, and a first bearing that rotatably supports the first pivot. One of the first pivot and the first bearing is fixed to the second movable frame. The other of the first pivot and the first bearing is fixed to the first frame.

DETAILED DESCRIPTION

Figure 1:
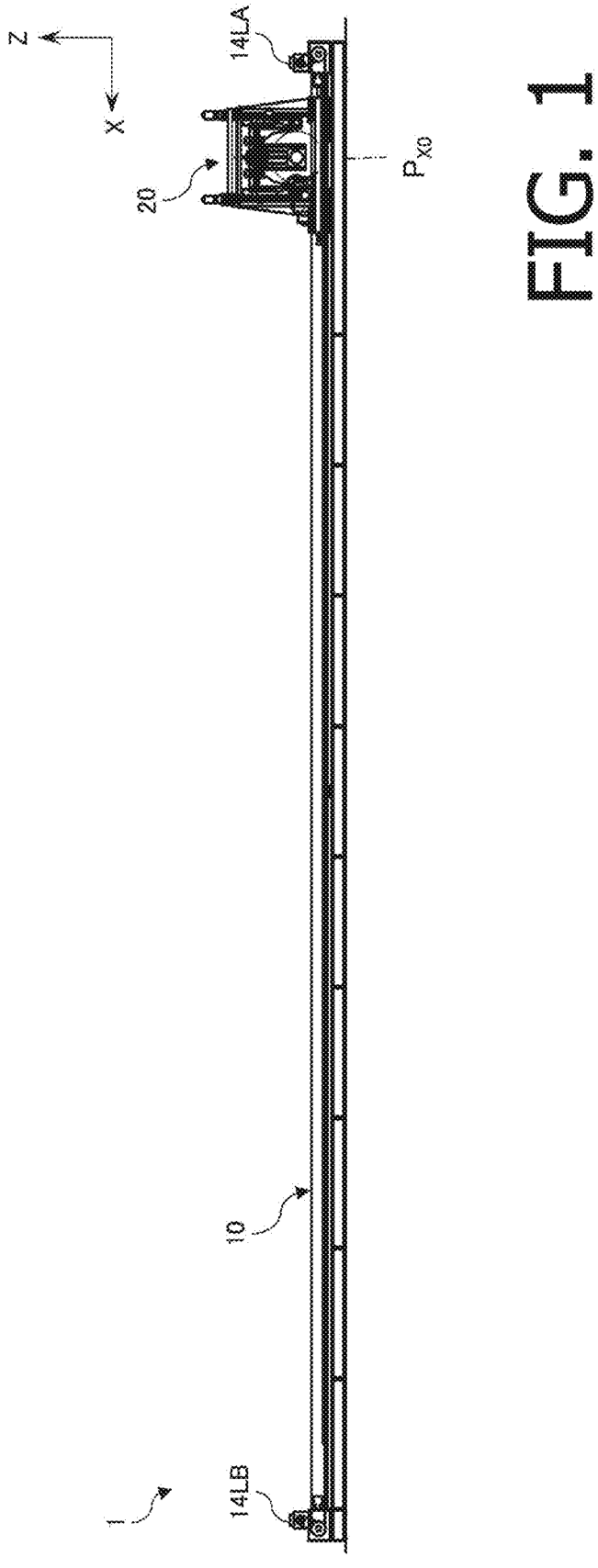
FIG. 1 is a right side view of a tire testing device.

It is noted that various connections are set forth between elements in the following description. It is noted that these connections in general and, unless specified otherwise, may be direct or indirect and that this specification is not intended to be limiting in this respect.

Hereinafter, illustrative embodiments according to aspects of the present disclosure will be described with reference to the drawings. In the following description, the same or corresponding numerals are assigned to the same or corresponding components, and redundant descriptions are herein omitted. In addition, in each drawing, when a plurality of items having a common reference numeral are shown, all of the plurality of items shown are not necessarily denoted with the reference numeral but denotation of the reference numeral is appropriately omitted for some of the plurality of items shown. Furthermore, in each drawing, a portion of a configuration is omitted or shown in cross section for convenience of explanation.

Figure 2:
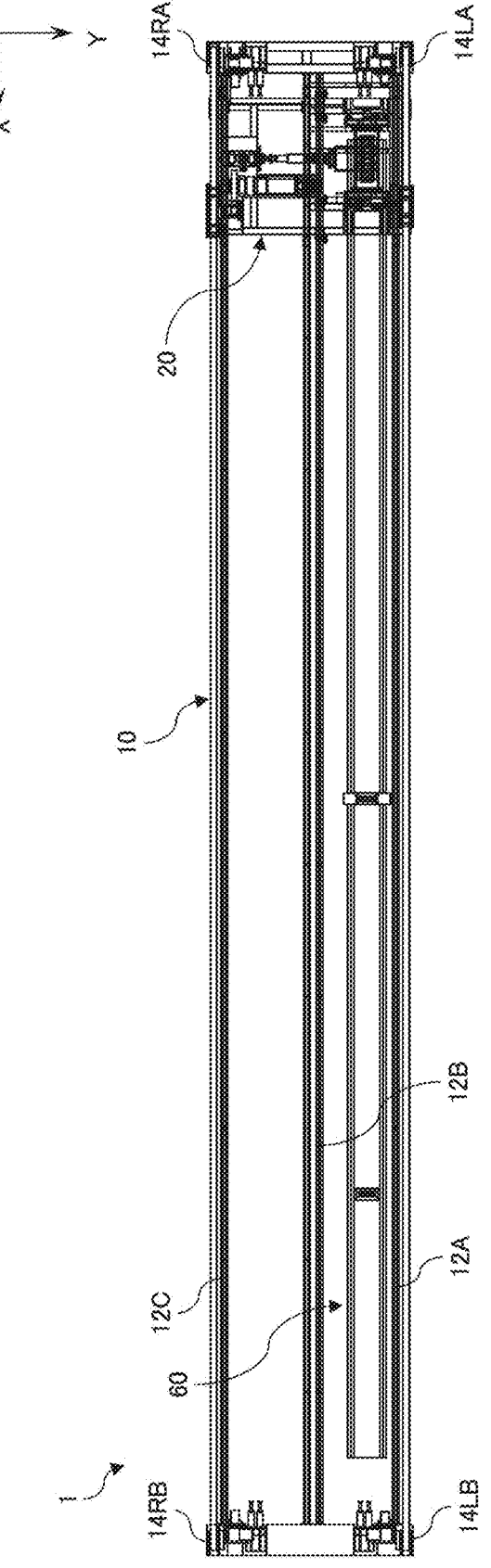
FIG. 2 is a plan view of the tire testing device.
Figure 3:
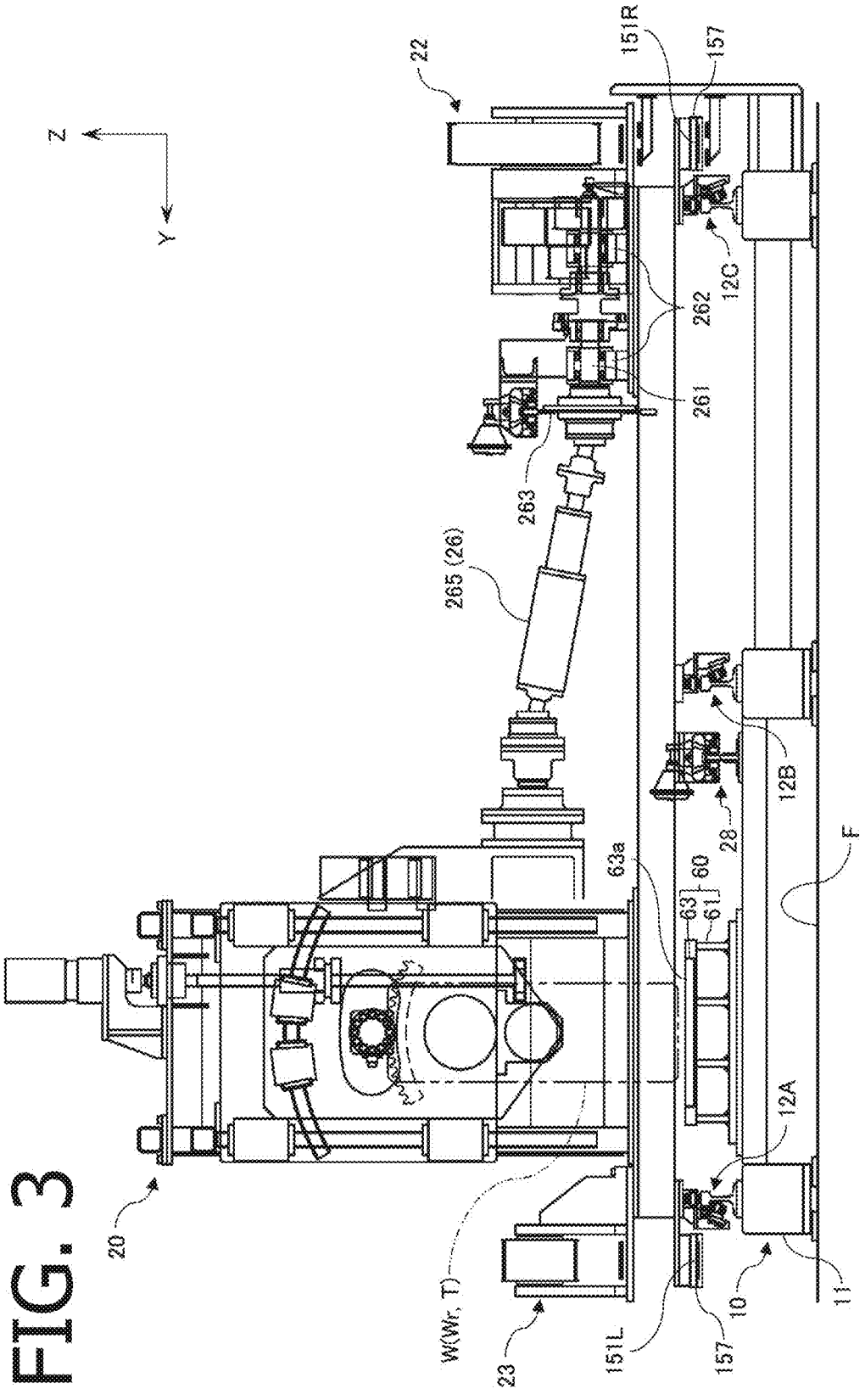
FIG. 3 is a rear view of the tire testing device.
Figure 4:
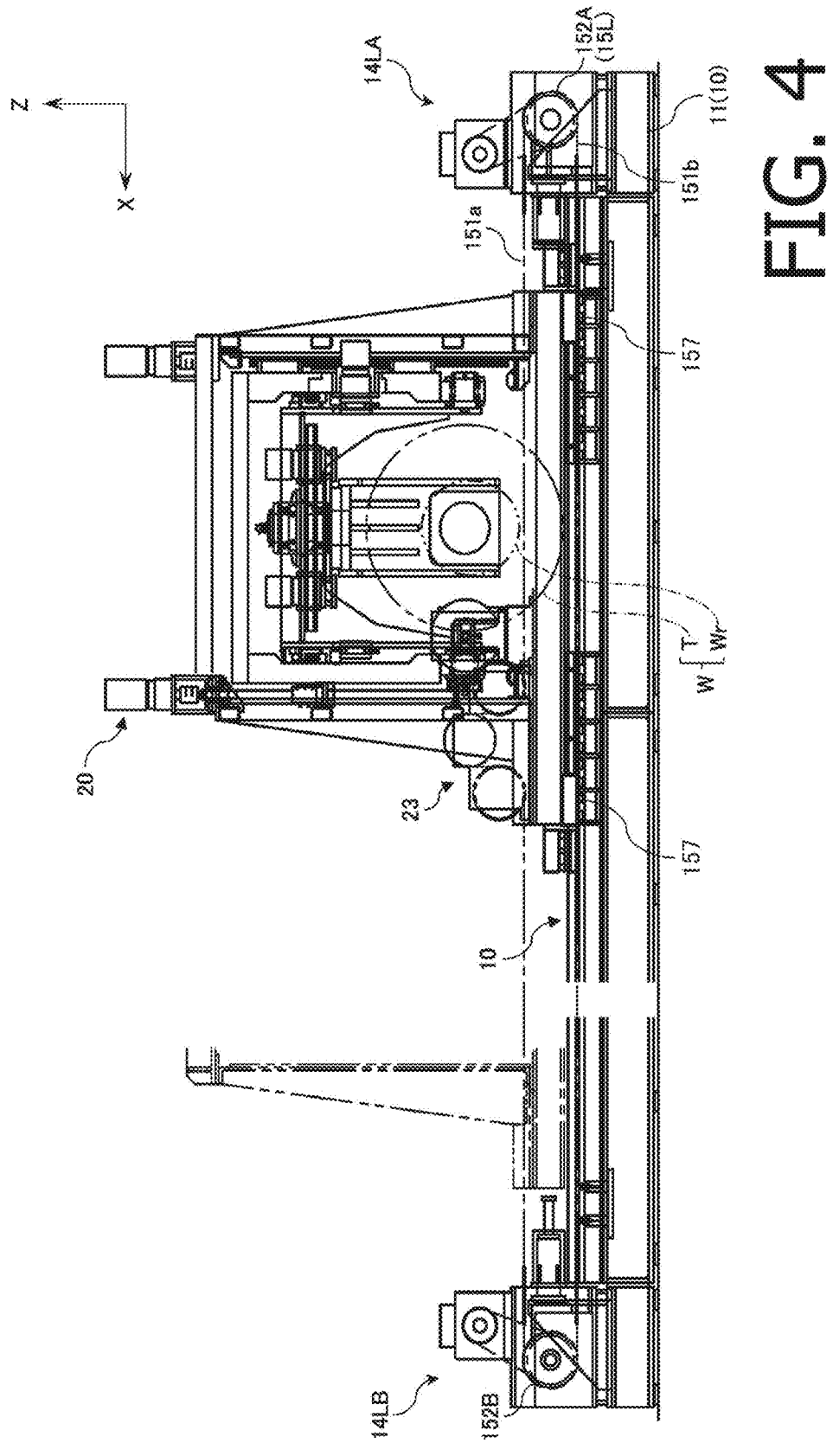
FIG. 4 is an enlarged view (right side view) of the tire testing device.
Figure 5:
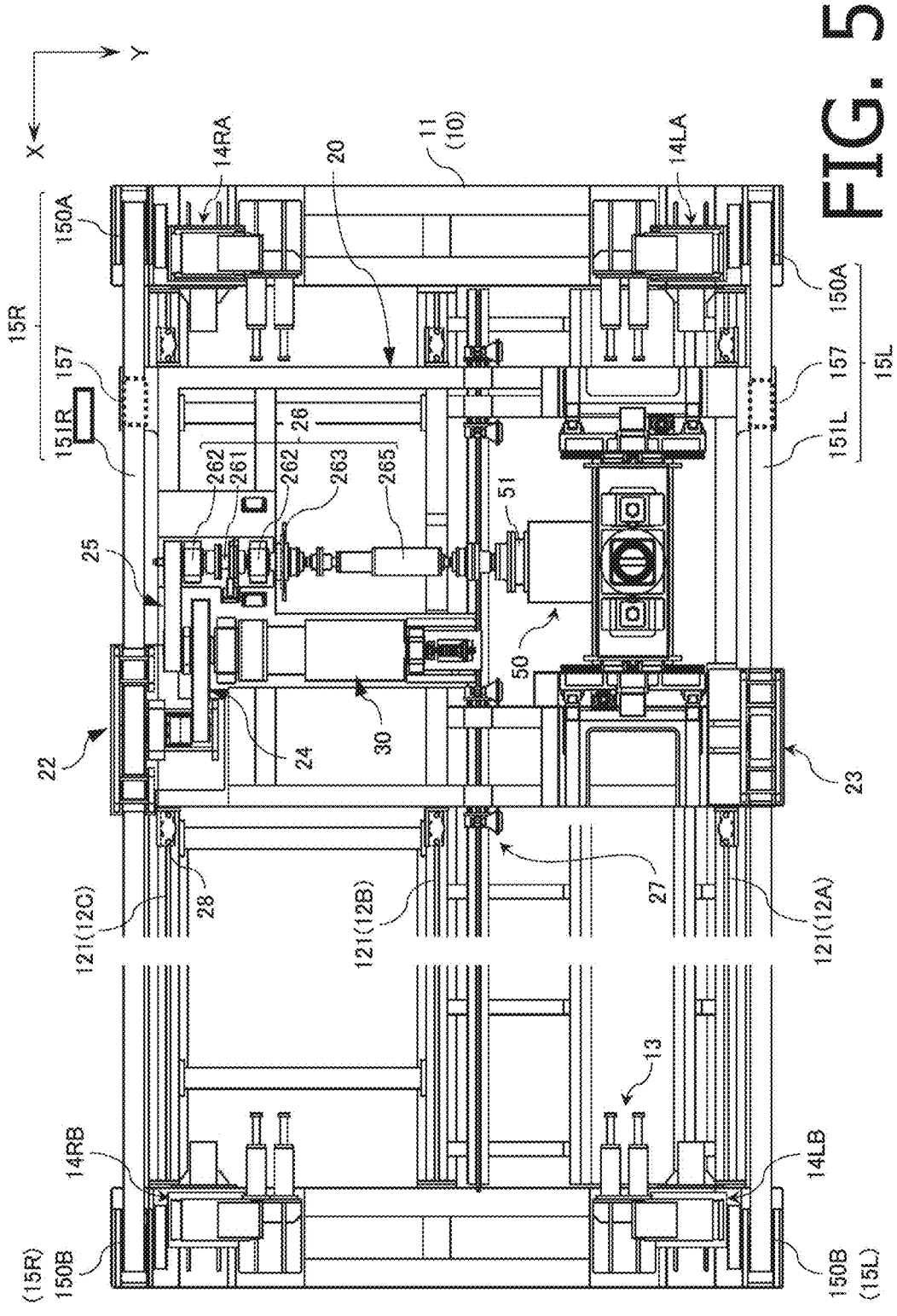
FIG. 5 is an enlarged view (plan view) of the tire testing device.

FIGS. 1 to 3 are a right side view, a plan view and a rear view of a tire testing device 1 according to an embodiment of the present disclosure, respectively. FIGS. 4 and 5 are enlarged right side view and plan view of a main section of the tire testing device 1.

In plan views (FIGS. 2 and 5), a direction from right to left is defined as an X axis direction, a direction from top to bottom is defined as a Y axis direction, and a direction perpendicular to the paper surface from back to front is defined as a Z axis direction. The X axis direction and the Y axis direction are horizontal directions orthogonal to each other, and the Z axis direction is a vertical direction. Unless otherwise specified, the front-rear, right-left, and up-down directions are defined as directions when facing a traveling direction of a carriage 20 (X axis positive direction). That is, the X axis positive direction is referred to as front, the X axis negative direction is referred to as rear, the Y axis positive direction is referred to as left, the Y axis negative direction is referred to as right, the Z axis positive direction is referred to as up, and the Z axis negative direction is referred to as down. With respect to the names of the drawings, regardless of the above definition, a side surface on the right side (Y axis positive direction) with respect to the front face is referred to as a right side surface, and a side surface on the left side (Y axis negative direction) with respect to the front face is referred to as a left side surface.

The tire testing device 1 includes a track part 10 and a road surface part 60 elongated in the X axis direction, and a carriage 20 that is configured to travel on the track part 10 in the X axis direction. As shown in FIG. 3, the road surface part 60 is mounted on a left side part of a base frame 11 (hereinafter referred to as "base 11") of the track part 10. On an upper surface of the road surface part 60, a road surface 63*a* with which the test tire T mounted to the carriage 20 contacts is provided. In the present embodiment, the road surface part 60 is removably attached to the base 11 of the track part 10 so that the road surface part 60 can be replaced according to test conditions. The base 11 of the track part 10 and a frame 61 of the road surface part 60 may be integrated by welding or the like. Alternatively, the road surface part 60 may be installed directly on a foundation F (FIG. 3) to completely separate the road surface part 60 from the track part 10.

As shown in FIG. 5, a pair of wheel stoppers 13 is provided at a front end portion of the track part 10 adjacent to drive parts 14LB and 14RB described later. The wheel stopper 13 is a device which, when the carriage 20 overruns, collides with the carriage 20 to forcibly stop the carriage 20. Each wheel stopper 13 includes a pair of hydraulic type buffer devices that mitigate an impact generated at the time of collision with the carriage 20.

As shown in FIG. 3, a test wheel W (i.e., a wheel rim Wr to which a test tire T is mounted) is attached to the carriage 20. During the test, the carriage 20 travels in a state where the test wheel W is made to contact the road surface 63*a*, and the test wheel W rolls on the road surface 63*a*.

As shown in FIGS. 3 and 5, the track part 10 includes a plurality of (in the illustrated embodiment, three) guide mechanisms 12A, 12B, and 12C that guide movement of the carriage 20 in the X axis direction. The guide mechanisms 12A, 12B, and 12C are disposed at a left end portion, a central portion in the width direction (i.e., in the Y axis direction), and a right end portion of the track part 10, respectively.

Figure 6:
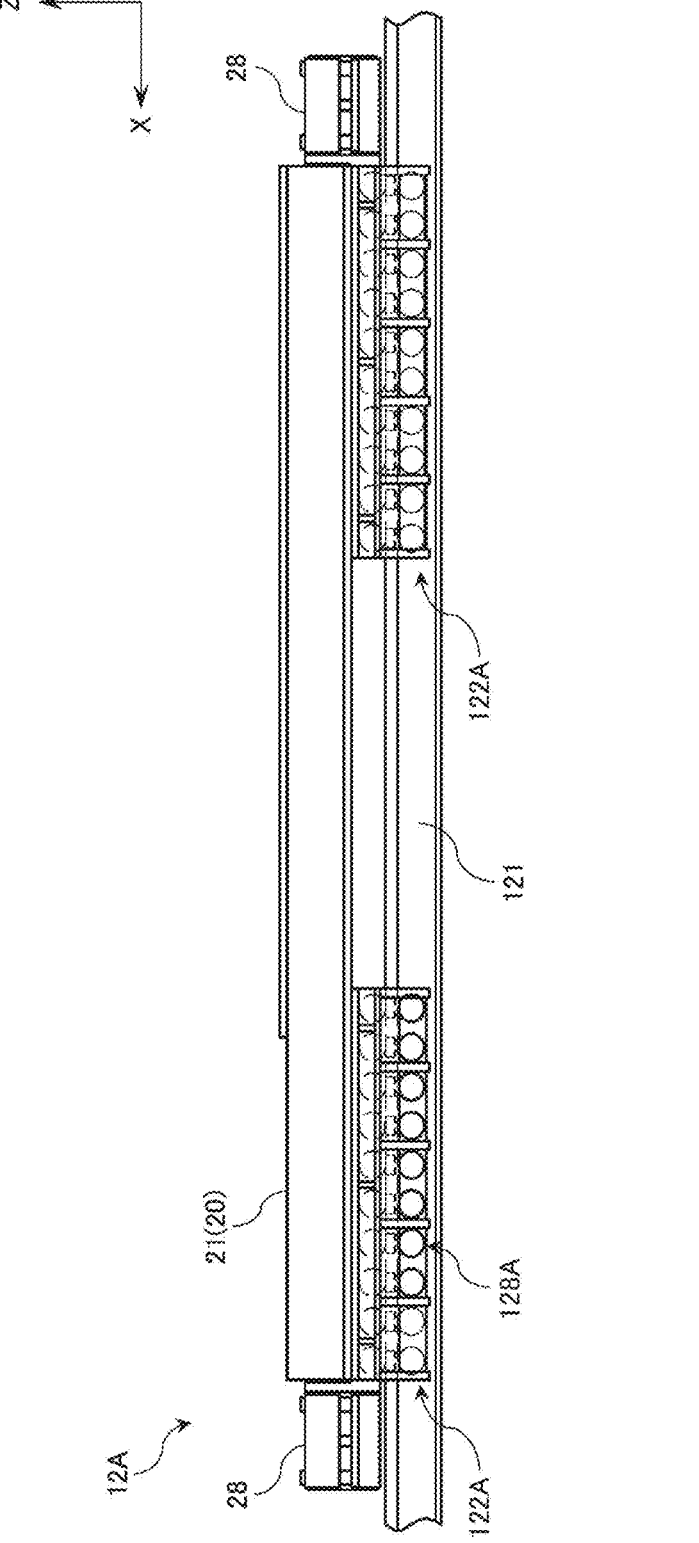
FIG. 6 is a diagram showing an arrangement of guide mechanisms.
Figure 7:
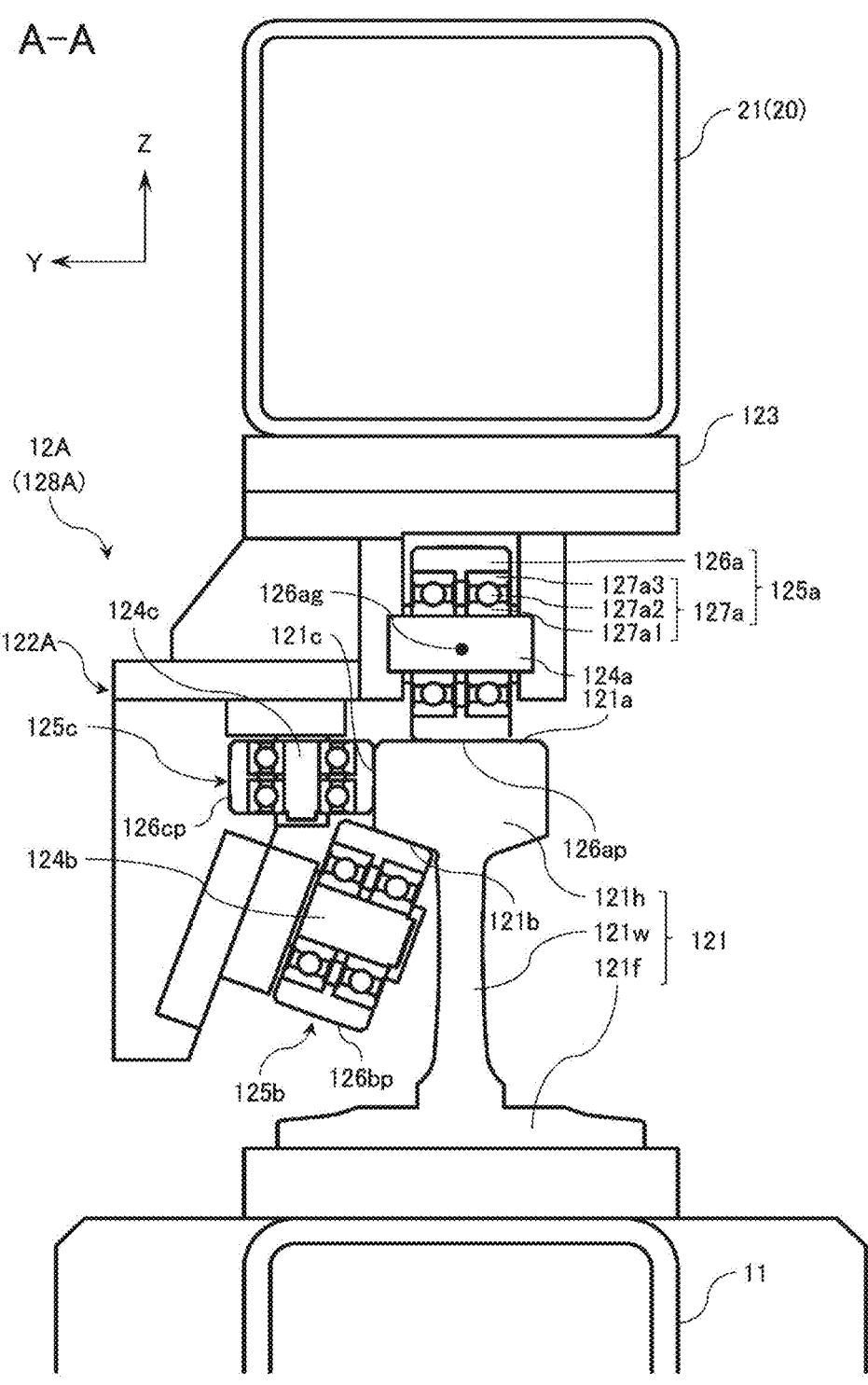
FIG. 7 is a cross-sectional view of a guide mechanism (type A).
Figure 8:
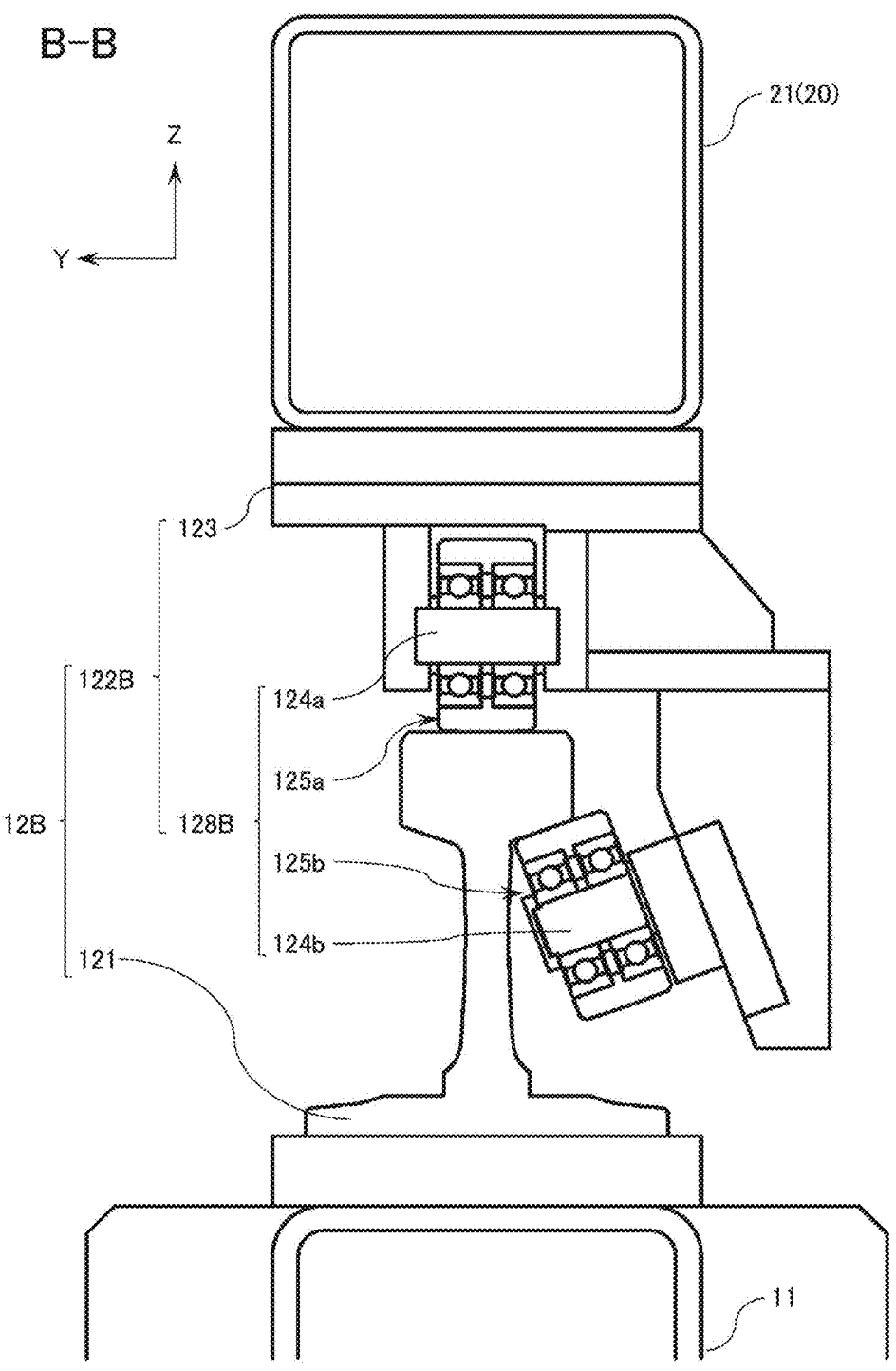
FIG. 8 is a cross-sectional view of a guide mechanism (type B).

FIG. 6 is a right side view of the guide mechanism 12A. FIGS. 7 and 8 are cross-sectional views of the guide mechanisms 12A and 12B, respectively. Since the guide mechanism 12C is bilaterally symmetric with the guide mechanism 12A, a detailed description of the guide mechanism 12C is herein omitted.

Each of the guide mechanisms 12A, 12B, and 12C includes one rail 121 forming a track extending in the X axis direction, and one or more (in the illustrated embodiment, two) traveling parts 122A (FIG. 7) and 122B (FIG. 8) or 122C (Not shown. Configured to be symmetrical to the traveling part 122A of the guide mechanism 12A.) configured to travel on the rail 121. As shown in FIG. 6 with respect to the traveling part 122A, one of two of the traveling parts 122A, 122B, and 122C is attached to a front end portion of a bottom surface of the carriage 20 and the other is attached to a rear end portion of the bottom surface of the carriage 20.

As shown in FIGS. 7 and 8, the rail 121 is laid on the base 11 of the track part 10. Each of the traveling parts 122A, 122B and 122C is attached to a lower surface of a main frame 21 of the carriage 20.

The rail 121 is a flat bottom rail having a head part 121*h*, a bottom part 121*f* wider than the head part 121*h*, and a narrow body part 121*w* coupling the head part 121*h* and the bottom part 121*f*. The rail 121 of the present embodiment is for example a heat-treated rail (for example, a heat-treated rail 50N-HH340) conforming to Japanese Industrial Standard JIS E 1120:2007, which is additionally processed. The heat-treated rail is a rail for railway having improved wear resistance by applying heat treatment to the head part.

As shown in FIG. 7, the traveling part 122A of the guide mechanism 12A includes a frame 123 long in the X axis direction and attached to the lower surface of the main frame 21 of the carriage 20, and a plurality of roller units 128A attached to the frame 123. The roller unit 128A includes three rods 124*a*, 124*b* and 124*c* attached to the frame 123, and three roller assemblies 125*a*, 125*b* and 125*c* attached to the rods 124*a*, 124*b* and 124*c*, respectively. The three roller assemblies 125*a*, 125*b* and 125*c* of each roller unit 128A are arranged at the same position in the X axis direction. As shown in FIG. 6, the plurality of roller units 128A are arranged at predetermined intervals in the X axis direction.

The roller assemblies 125*b* and 125*c* have the same configuration as the roller assembly 125*a* (The roller assembly 125*c* is different in size from the roller assembly 125*a*). Therefore, the roller assembly 125*a* will be described as a representative of these components, and redundant descriptions of the roller assemblies 125*b* and 125*c* is herein omitted.

As shown in FIG. 7, the roller assembly 125*a* includes a roller 126*a* rolling on the rail 121, and a pair of bearings 127*a* that rotatably support the roller 126*a*. The bearing 127*a* is a rolling bearing, and in the illustrated embodiment, a ball bearing is used.

In the present embodiment, an outer peripheral surface 126*ap* of the roller 126*a* is formed in a cylindrical shape, but may be a curved surface (e.g., a spherical surface having a center point 126*ag* of the roller 126*a* as its center) having a curvature in a direction of a rotation axis (i.e., in a longitudinal section including the rotation axis shown in FIG. 7).

The bearing 127*a* of the roller assembly 125*a* is, for example, a single row radial bearing. The bearing 127*a* includes an inner ring 127*a*1 fitted to the rod 124*a*, an outer ring 127*a*3 fitted to an inner peripheral surface of the roller 126*a*, and balls 127*a*2 as a plurality of rolling elements interposed between the inner ring 127*a*1 and the outer ring 127*a*3. The balls 127*a*2 roll along a circular track defined by a pair of annular grooves formed on an outer peripheral surface of the inner ring 127*a*1 and an inner peripheral surface of the outer ring 127*a*3, respectively.

The roller assembly 125*a* is disposed so that the outer peripheral surface 126*ap* contacts a head upper surface (top surface) 121*a* of the rail 121 and rolls on the head upper surface 121*a* as the carriage 20 travels. The roller assembly 125*b* is disposed so that an outer peripheral surface 126*bp* contacts one of head lower surfaces 121*b* of the rail 121 and rolls on the head lower surface 121*b*. The roller assembly 125*c* is disposed so that an outer peripheral surface 126*cp* contacts one of head side surfaces 121*c* of the rail 121 and rolls on the head side surface 121*c*.

In the rail 121, the head upper surface 121*a*, the head lower surfaces 121*b*, and the head side surfaces 121*c*, which contact the roller assemblies 125*a*, 125*b*, and 125*c*, respectively, have their shapes changed to flat surfaces, and additional work (e.g., grinding and polishing) is performed to improve surface accuracy such as flatness and parallelism.

As described above, the guide mechanisms 12A and 12C attached to the left and right end portions of the carriage 20, respectively, are configured to be bilaterally symmetric. That is, the guide mechanism 12C is the same as the guide mechanism 12A and disposed with the right and left reversed (i.e., rotated by 180 degrees about a vertical axis).

As shown in FIG. 8, the traveling part 122B of the guide mechanism 12B includes a frame 123 attached to the lower surface of the main frame 21 of the carriage 20, and a plurality of roller units 128B attached to the frame 123. The roller unit 128B includes two rods 124*a* and 124*b*, and two roller assemblies 125*a* and 125*b*. The rod 124*b* and the roller assembly 125*b* are disposed on the left side of the rail 121 in the traveling part 122A of the guide mechanism 12A, whereas they are disposed on the right side of the rail 121 in the traveling part 122B of the guide mechanism 12B. That is, the traveling part 122B of the guide mechanism 12B is the one obtained by omitting the roller assembly 125*c* and the rod 124*c* from the traveling part 122A of the guide mechanism 12A described above and disposing with the right and left reversed. However, the traveling part 122B of the guide mechanism 12B may include the roller assembly 125*c* and the rod 124*c*.

In the present embodiment, the roller assemblies 125*b* and 125*c* of the guide mechanism 12A disposed on the left side of the rail 125 prevent the carriage 20 from moving to the right (Y axis negative direction) with respect to the rail 121. The roller assembly 125*b* of the guide mechanism 12B and the roller assemblies 125*b* and 125*c* of the guide mechanism 12C disposed on the right side of the rail 121 prevent the carriage 20 from moving to the left (Y axis positive direction) with respect to the rail 121. Therefore, the carriage 20 is prevented from moving in the Y axis direction with respect to the rail 121. The roller assemblies 125*b* of the guide mechanisms 12A, 12B and 12C prevents the carriage 20 from moving upward (in the Z axis positive direction) with respect to the rail 121. Derailment of the carriage 20 from the rail 121 is prevented by preventing the carriage 20 from moving in the Y axis direction and the Z axis positive direction with respect to the rail 121 as described above.

In the present embodiment, the traveling part 122B (FIG. 8) is disposed with the right and left sides reversed with respect to the traveling part 122A (FIG. 7), but the traveling part 122B may be disposed in the same orientation in the right-left direction as the traveling part 122A. Similarly, the traveling part 122C and the traveling part 122A may be disposed in the same orientation in the right-left direction. However, any two of the traveling part 122A, the traveling part 122B and the traveling part 122C are disposed with the right and left reversed with respect to each other (i.e., the roller assemblies 125*b* and 125*c* are disposed on opposite sides of the rail 121 in the right-left direction).

In order to prevent the carriage 20 from moving in the right-left direction (Y axis direction), it is sufficient that at least two of the traveling parts 122A, 122B, and 122C which are disposed with the right and left reversed with respect to each other include the roller assembly 125*c* and the rod 124.

In order to prevent the carriage 20 from moving upward (in the Z axis positive direction), it is sufficient that at least one of the traveling parts 122A, 122B or 122C includes the roller assembly 125*b* and the rod 124*b*.

When an angle between the head lower surface 121*b* of the rail 121 and a horizontal plane is larger than a certain angle (e.g., 5 degrees), the roller assembly 125*b* may be used in place of the roller assembly 125*c*.

Figure 9:
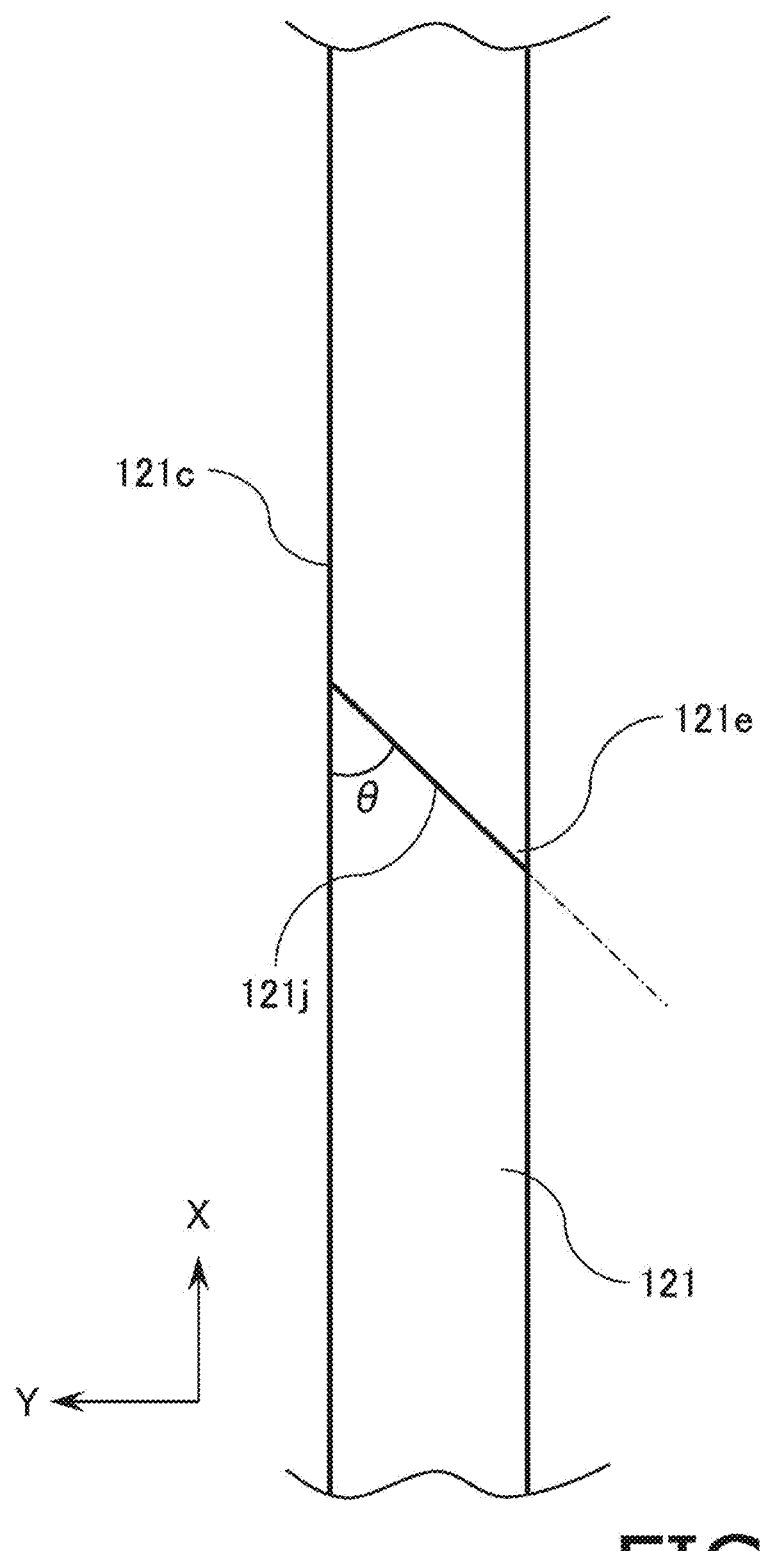
FIG. 9 is a diagram showing a connecting part of a rail member.

The rail 121 of the guide mechanism 12 may be formed by connecting a plurality of short rail members. In this case, as shown in FIG. 9, a joint 121*j* of the rail 121 may not be perpendicular to a lengthwise direction (X axis direction) of the rail 121 but may be formed obliquely in plan view (i.e., such that the joint 121*j* is inclined at an angle θ with respect to the ZX plane). By forming the joint 121*j* obliquely, even if the rail 121 expands or contracts due to temperature change, strain of the rail 121 is released by the sliding of the rail members at the joint 121*j*, thereby preventing the rail 121 from curving.

When forming the oblique joint 121*j*, the roller assemblies 125*b* and 125*c* (FIG. 9) are disposed on a side of the rail 121 where the head side surface 121*c* forms an obtuse angle with the joint 121*j* ahead of the joint 121*j* (i.e., on the left side in the guide mechanism 12A and on the right side in the guide mechanisms 12B and 12C). By disposing the roller assemblies 125*b* and 125*c* as described above, occurrence of significant impact or damage due to collision of the roller assemblies 125*b* and 125*c* with an acute end portion 121*e* of the joint 121*j* can be prevented even if relative displacement occurs at the joint 121*j* of the rail.

At the joint 121*j*, end faces of two rail members to be connected may be brought into contact with each other, or may be brought to oppose to each other without contact by providing a predetermined gap between the end faces. In the present embodiment, the end faces of the two rail members to be connected are merely made to oppose to each other at the joint 121*j* of the rail 121 and thus are not joined, but the rail members may be joined at the joint 121*j* by welding or brazing.

In place of the guide mechanisms 12A, 12B, and 12C of the present embodiment, a guide-way type circulation type linear bearing (so-called linear guide) may be used. The circulation type linear bearing has an oblong track (i.e., a path in which rolling elements roll) in which adjacent ends of two parallel linear tracks are coupled by a semi-circular track. When a linear bearing having such an oblong track is driven at a high speed (e.g., at a speed of 10 km/h or more), when a rolling element moves from the straight track to the curved track, a centrifugal force rapidly acts on the rolling element (i.e., an impact load acts on the rolling element and a rolling surface of the curved track), so that the rolling element and the rolling surface of the curved track are rapidly worn or damaged. Therefore, when the carriage 20 is driven at high speed, there is a problem that life of the linear bearing is shortened or the linear bearing is damaged.

In the bearings 127*a* to 127*c* used in the guide mechanisms 12A, 12B and 12C of the present embodiment, since the rolling elements always travel along a circular track having a constant curvature, a rapid change in centrifugal force acting on the rolling element (i.e., an impact load) does not occur. Therefore, even if the rollers 126*a* to 126*c* are rotated at a high peripheral speed exceeding, for example, 60 km/h, no significant reduction in life or breakage of the bearings 127*a* to 127*c* occurs. Therefore, by constituting the guide mechanisms 12A to 12C by using the rolling bearings having circular tracks in which the curvatures of the tracks of the rolling elements are constant, the carriage 20 can travel at high speed (for example, at a speed of 10 km/h or more). In the tire testing device 1 of the present embodiment, since the guide mechanisms 12A, 12B, and 12C described above are employed, the carriage 20 can travel at a speed exceeding 85 km/h.

Figure 10:
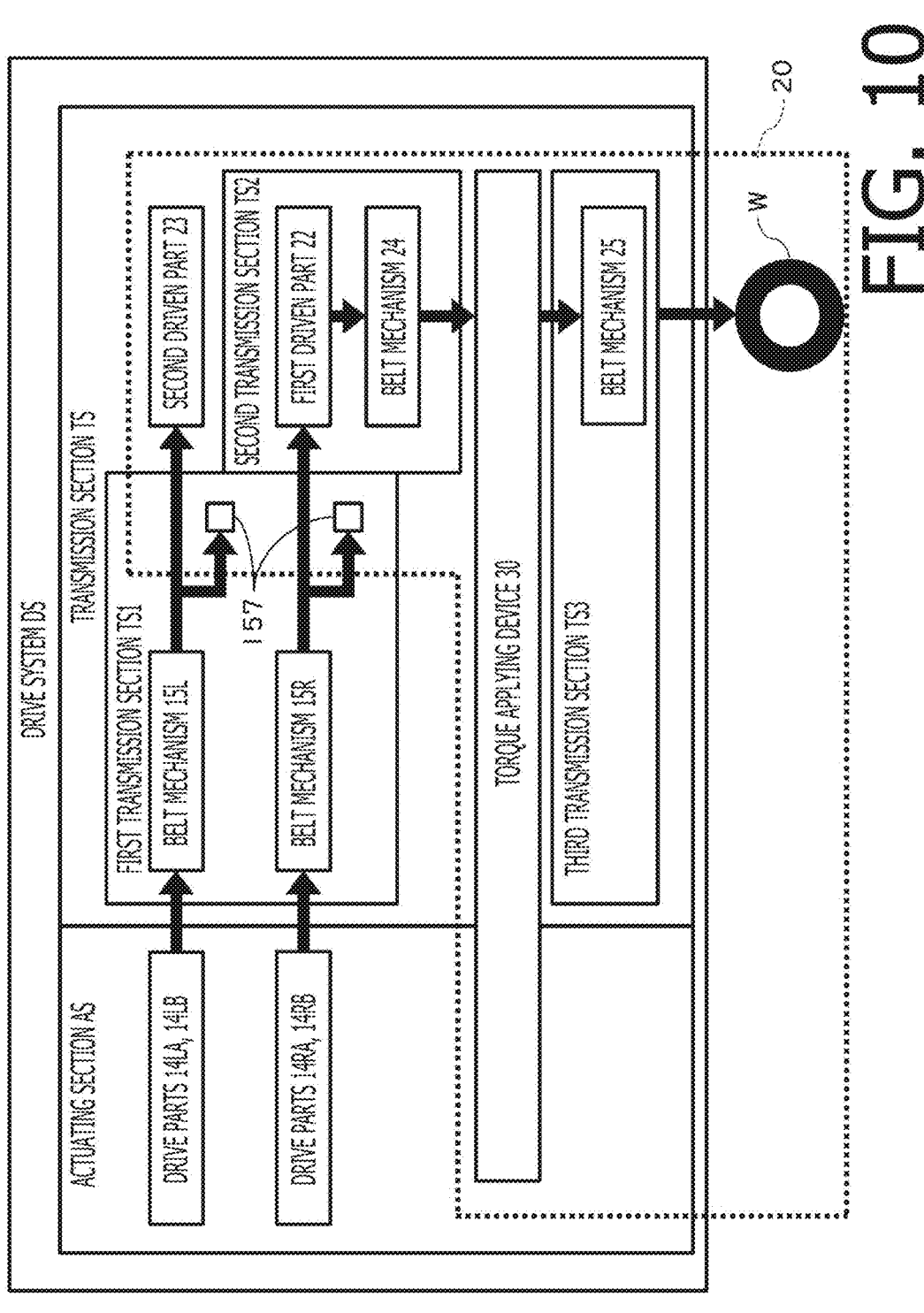
FIG. 10 is a block diagram showing a schematic logical configuration of a drive system.
Figure 11:
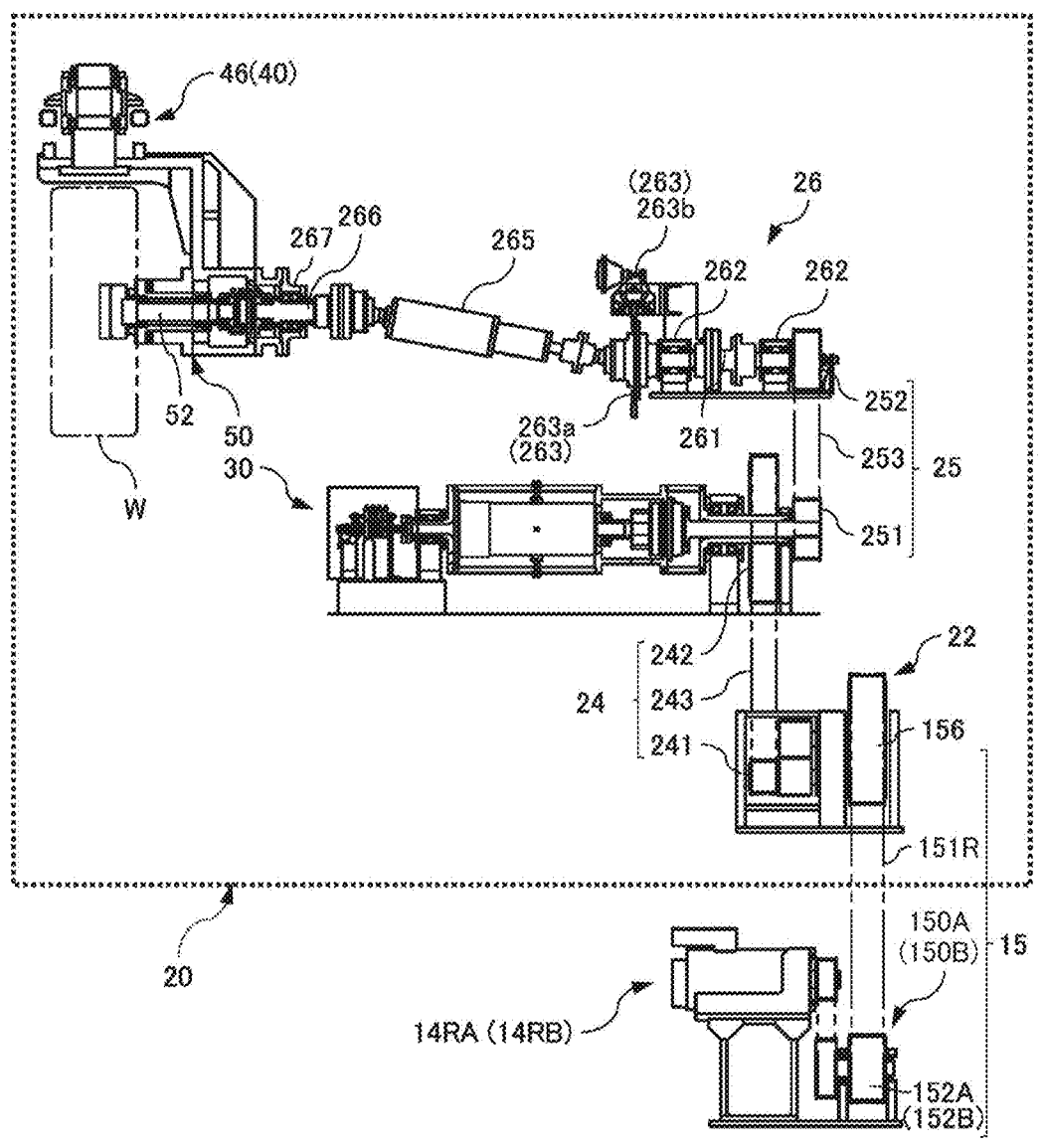
FIG. 11 is a diagram showing a schematic mechanical configuration of main parts of the drive system.

The tire testing device 1 includes a drive system DS that drives the carriage 20 and the test wheel W. FIG. 10 is a block diagram showing a schematic logical configuration of the drive system DS. FIG. 11 is a diagram showing a schematic mechanical configuration of a main part of the drive system DS. In FIG. 10, the arrows indicate transmission paths of mechanical power (hereinafter simply referred to as "power").

As shown in FIG. 10, the drive system DS includes an actuating section AS that generates power, and a transmission section TS that transmits the power generated by the actuating section AS to the carriage 20 and the test wheel W which are targets to be driven. The drive system DS, together with the test wheel W and the road surface part 60, constitutes a power circulation system.

The actuating section AS includes two pairs of drive parts 14 (first actuator) on the right and left attached to the track part 10, and a torque applying device 30 (second actuator) attached to the carriage 20. The drive part 14 are mainly used to control the traveling speed of the carriage 20 and the number of rotations of the test wheel W, and the torque applying device 30 is mainly used to control the torque applied to the test wheel W.

The transmission section TS includes a first transmission section TS1 that transmits power generated by the drive part 14 to the carriage 20, a second transmission section TS2 that takes out a portion of the power transmitted by the first transmission section TS1 and transmitting it to the torque applying device 30, and a third transmission section TS3 that transmits the power output from the torque applying device 30 to the test wheel W. The torque applying device 30 also constitutes a part of the transmission section TS.

As shown in FIGS. 4 and 5, two pairs of drive parts 14 (a pair of drive parts 14LA and 14LB on the left side and a pair of drive parts 14RA and 14RB on the right) are installed near four corners on the base 11 of the track part 10. The drive parts 14LA and 14RA are disposed at a rear end portion of the track part 10, and the drive parts 14LB and 14RB are disposed at a front end portion of the track part 10.

As will be described later, the drive parts 14RA and 14RB on the right have both a function as a carriage driver that drives the carriage 20 to travel, and a function as a test wheel driver that rotationally drives the test wheel W at a rotation speed corresponding to a traveling speed of the carriage 20. The drive parts 14LA and 14LB on the left has a function as the carriage driver.

The first transmission section TS1 includes a pair of belt mechanisms 15 (15L, 15R) and a pair of driven parts (a first driven part 22 and a second driven part 23). The belt mechanism 15L on the left is driven by a pair of drive parts 14LA and 14LB on the left, and the belt mechanism 15R on the right is driven by a pair of drive parts 14RA and 14RB on the right. The first driven part 22 and the second driven part 23 are attached to the main frame 21 of the carriage 20. The first driven part 22 is connected to the belt mechanism 15R on the right, and the second driven part 23 is connected to the belt mechanism 15L on the left.

Figure 12:
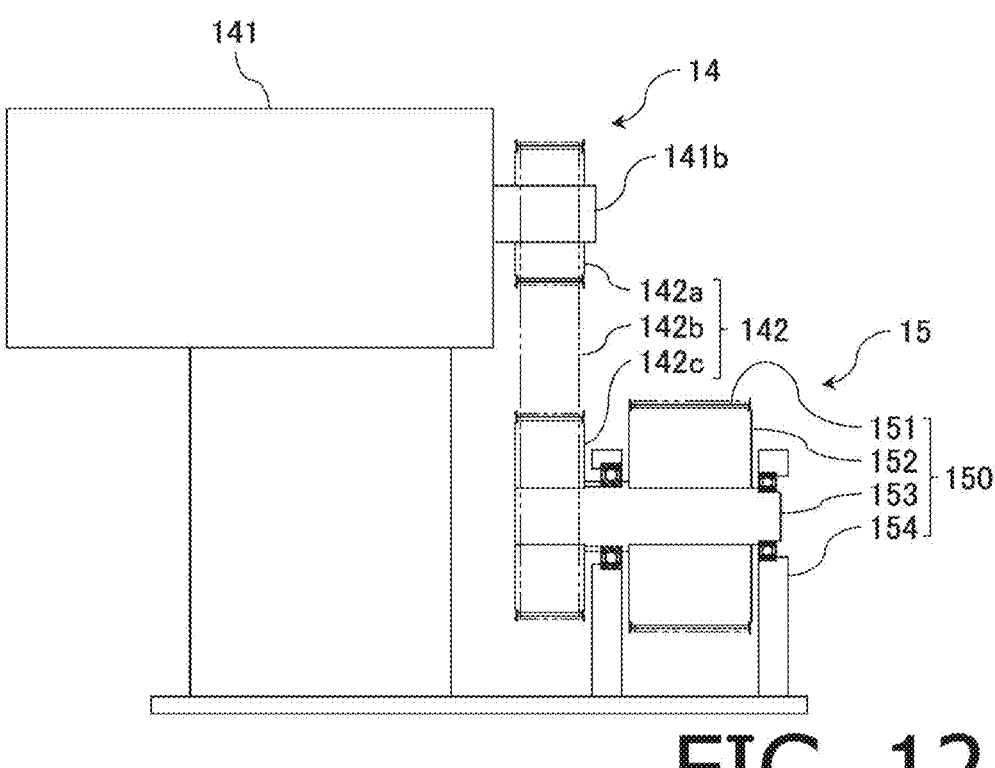
FIG. 12 is a diagram showing a schematic structure of a drive part and a drive pulley part.
Figure 13:
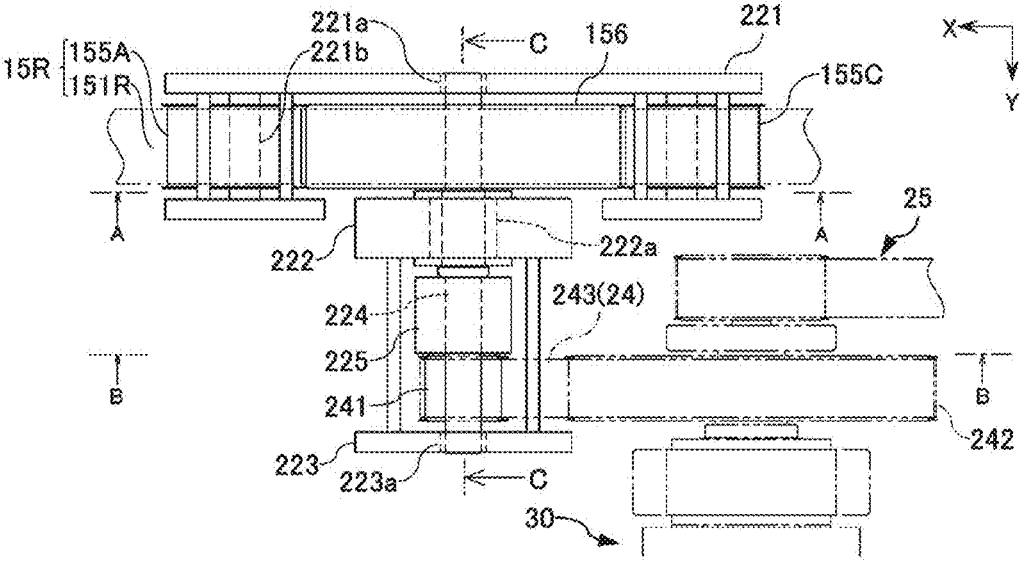
FIG. 13 is a plan view of a first driven part.
Figure 14:
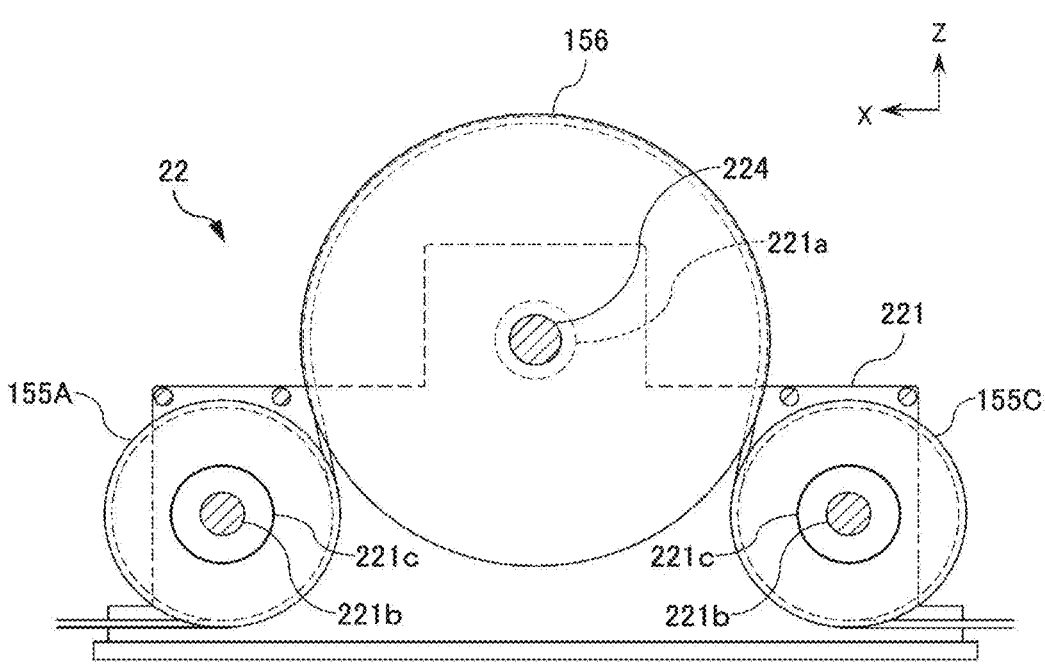
FIG. 14 is a cross-sectional view A-A of FIG. 13.
Figure 15:
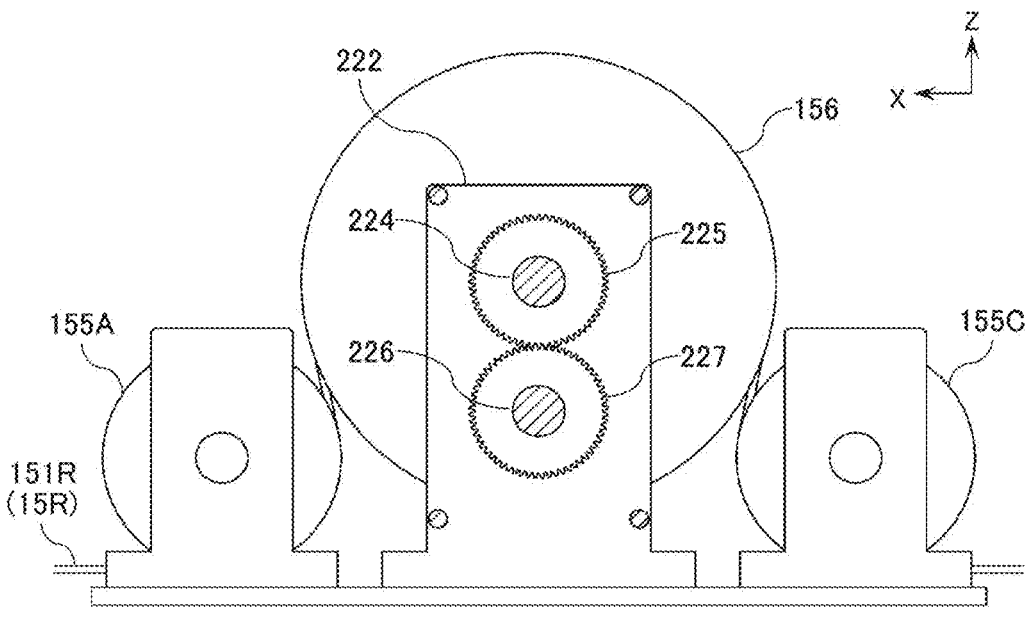
FIG. 15 is a cross-sectional view B-B of FIG. 13.
Figure 16:
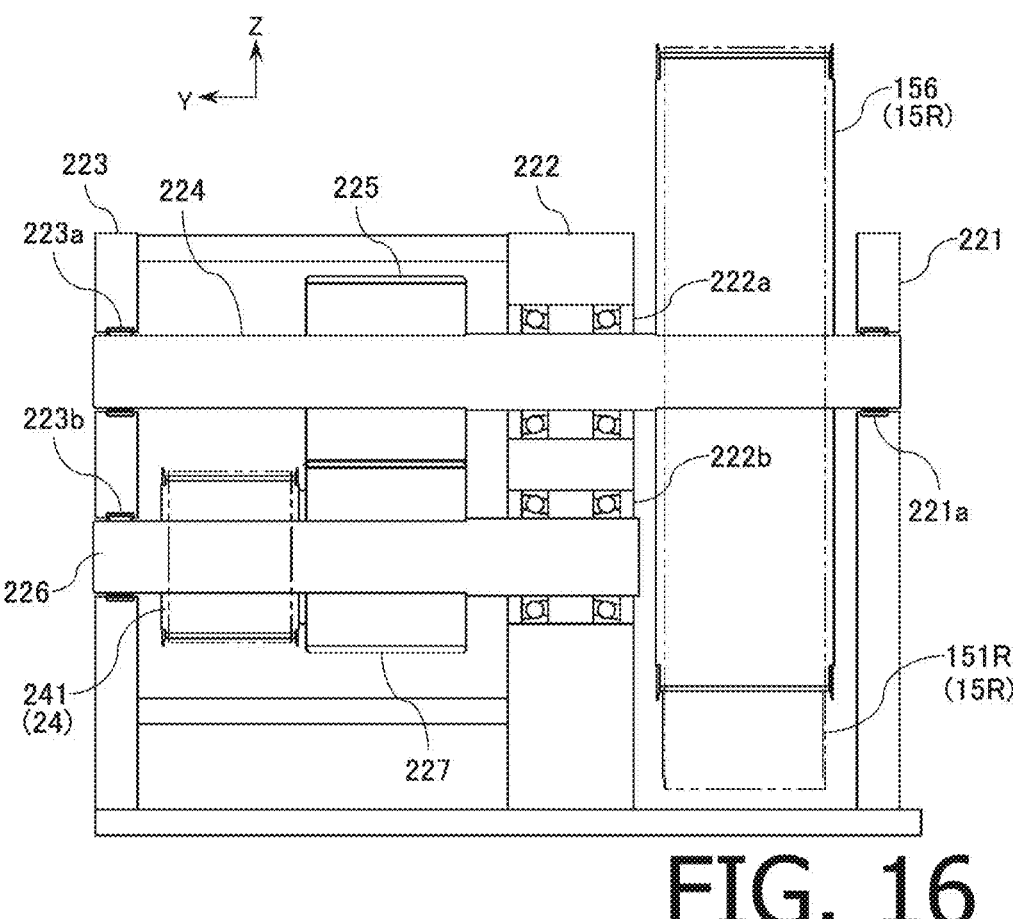
FIG. 16 is a cross-sectional view C-C of FIG. 13.
Figure 17:
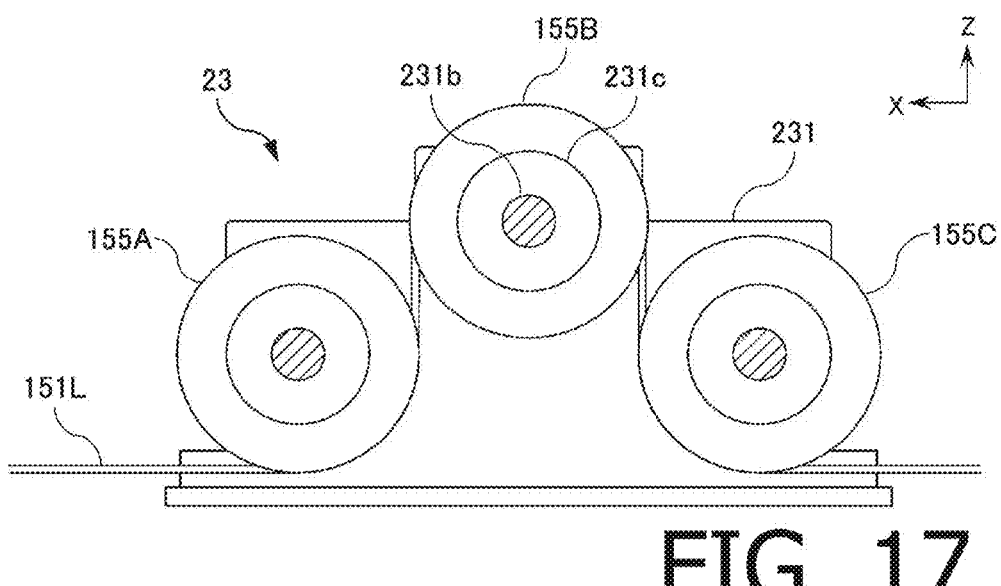
FIG. 17 is a cross-sectional view of a second driven part.

FIG. 12 is a diagram showing a schematic structure of the drive part 14 and a drive pulley section 150 of the belt mechanism 15. FIG. 13 is a plan view of the first driven part 22. FIGS. 14, 15 and 16 are cross-sectional views A-A, B-B and C-C of FIG. 13, respectively. FIG. 17 is a cross-sectional view showing a schematic structure of the second driven part 23.

Each belt mechanism 15 (15L, 15R) includes a pair of drive pulley sections 150 (150A and 150B), a belt 151 (151L, 151R), three driven pulleys 155A, 155C, and 156 (FIG. 14) held by a first driven part 22 or three driven pulleys 155A, 155B, and 155C (FIG. 17) held by the second driven part 23, and a pair of belt clamps 157 (FIGS. 3 and 5) that fix both end portions of the belt 151 to the main frame 21 of the carriage 20. The drive pulley section 150 is mounted on the base 11 of the track part 10 and is connected to a corresponding drive part 14.

The belt 151R is wound around drive pulleys (152A and 152B) of a pair of drive pulley sections 150 and three driven pulleys 155A, 156 and 155C. The belt 151L is wound around drive pulleys (152A and 152B) of a pair of drive pulley sections 150 and three driven pulleys 155A, 155B and 155C.

The drive part 14 includes a motor 141 (first motor) and a belt mechanism 142. The motor 141 is, for example, a super-low inertia and high-power type AC servo motor with an inertia moment of a rotating part being equal to or less than 0.01 kg·m$^2$ (preferably equal to or less than 0.008 kg·m$^2$) and with a rated power of 3 to 60 kW (7 to 37 kW being more suitable for practical use). By using such an super-low inertia and high power motor 141, it becomes possible to accelerate the carriage 20 to the maximum speed of the test tire T (e.g., 240 km) in a short traveling distance (e.g., 20 to 50 m).

As the motor 141, a motor of which a rotating part has a standard inertia moment may be used. The motor 141 may be of another type of which speed can be controlled such as, for example, a so-called inverter motor in which an inverter is used for drive control.

The belt mechanism 142 includes a drive pulley 141a attached to a shaft 141b of the motor 141, a driven pulley 142c, and a belt 142b wound around the drive pulley 142a and the driven pulley 142c. The belt 142b is, for example, a toothed belt having the same configuration as the belt 151 described later. The type of belt 142b may be different from that of the belt 151.

In the belt mechanism 142, since the driven pulley 142c has a pitch diameter larger than that of the drive pulley 142a (i.e., has a larger number of teeth), the belt mechanism 142 has a speed reduction ratio larger than 1. Therefore, rotation output from the motor 141 is decelerated by the belt mechanism 142. The reduction ratio of the belt mechanism 142 may be equal to or less than 1. A reducer may be provided to the drive part 14 in place of (or in addition to) the belt mechanism 142. Instead of providing the belt mechanism 142 and the reducer, a later-described shaft 153 of the belt mechanism 15 may be directly connected to the shaft 141b of the motor 141.

The drive pulley section 150 of the belt mechanism 15 is disposed adjacent to the drive part 14. The drive pulley section 150 includes a pair of bearing parts 154, a shaft 153 rotatably supported by the pair of bearing parts 154, and a drive pulley 152 attached to the shaft 153. The driven pulley 142c of the belt mechanism 142 is also attached to the shaft 153, and an output of the drive part 14 is transmitted to the belt 151 wound around the drive pulley 152 via the shaft 153 and the drive pulley 152.

The belt 151 is a toothed belt having a core wires made of steel wires. It should be noted that a toothed belt having core wires made of so-called super fiber such as carbon fiber, aramid fiber or ultra-high molecular weight polyethylene fiber may be used as the toothed belt 151. By the use of light-weight and high-strength core wires such as carbon core wires, it becomes possible to drive the carriage 20 at high acceleration (or to apply high driving/braking force to the test wheel W) using a motor of relatively low output power, and thus it becomes possible to downsize the tire testing device 1. When a motor having the same output is used, the performance of the tire testing device 1 can be enhanced (specifically, the acceleration performance can be improved) by using a lightweight belt 151 having core wires made of so-called super fiber.

As shown in FIGS. 3 to 5, both end portions of each belt 151 are fixed to the main frame 21 of the carriage 20. Thus, each belt 151 forms a loop via the carriage 20. When each belt mechanism 15 is operated, the carriage 20 is pulled by each belt 151 and travels in the X axis direction.

In the present embodiment, the belt 151 is fixed to the carriage 20 by the belt clamp s 157 at a lower side of the loop, and the belt mechanism 15 and the first driven part 22 or the second driven part 23 are connected at an upper side of the loop. By disposing the belt clamps 157 having relatively low height below the first driven part 22 or the second driven part 23, a height of the belt mechanism 15 can be reduced. It should be noted that the belt 151 may be fixed to the carriage 20 at the upper side of the loop.

As shown in FIG. 4, the pair of drive pulleys 152 (152A, 152B) of the belt mechanism 15 are fixed pulleys that are disposed across an area in which the carriage 20 can travel and are held on the base 11 (i.e., the center of gravity is fixed with respect to the base 11). The driven pulleys 155 (155A, 155B, 155C) and 156 held by the first driven part 22 or the second driven part 23 are movable pulleys configured to move in the X axis direction together with the carriage 20.

In the following description, regarding a configuration in which a pair is provided on the right and left sides, in principle, the configuration on the left side will be described, and a reference numeral for the configuration on the right side will be enclosed in square brackets and redundant description will be omitted.

In the present embodiment, the pair of drive parts 14LA and 14LB [14RA and 14RB] are driven in the same phase. The drive parts 14LA and 14LB on the left and the drive parts 14RA and 14RB on the right are disposed with the left and the right reversed and are driven in opposite phases.

The drive pulley 152 (FIG. 12) and the driven pulleys 155 (FIGS. 14 and 17) have the same effective diameter (i.e., pitch diameter) or the same number of teeth. The pitch diameter or the number of teeth of the driven pulley 156 (FIG. 14) held by the first driven part 22 is larger than (e.g., twice) that of the drive pulley 152 and the driven pulley 155.

As shown in FIG. 5, the carriage 20 includes the main frame 21, the first driven part 22, the second driven part 23, a belt mechanism 24, a belt mechanism 25, a transmission shaft part 26, a brake system 27, a brake system 28, the torque applying device 30, an alignment part 40, and a spindle part 50 (axle part). As shown in FIG. 10, the first driven part 22 and the belt mechanism 24 constitute the second transmission section TS2. The belt mechanism 25, the transmission shaft part 26 and the spindle part 50 constitute the third transmission section TS3.

As shown in FIG. 11, the spindle part 50 includes a rotatably supported spindle 52. The spindle 52 is a shaft (i.e., an axle) to which the test wheel W is to be coaxially attached to one end thereof (i.e., so as to share the center line), and the test wheel W is rotationally driven together with the spindle 52 by the power output from the torque applying device 30. The alignment part 40 is a mechanical part configured to adjust wheel alignment of the test wheel W (alignment adjustment) by changing an orientation of the spindle part 50.

As shown in FIGS. 13 to 16, the first driven part 22 includes a main body part 221, a bearing part 222, a bearing part 223, a shaft 224, a drive gear 225, a shaft 226, and a driven gear 227.

As shown in FIG. 14, the main body part 221 includes two rods 221b extending in the Y axis direction, and a pair of bearings 221c of which inner rings are fitted to the respective rods 221b. The driven pulleys 155A and 155C of the belt mechanism 15R are fitted to outer rings of the respective bearings 221c. With this configuration, the driven pulleys 155A and 155C of the belt mechanism 15R are rotatably supported by the main body part 221.

As shown in FIG. 16, the main body part 221 includes a bearing 221a. The bearing part 222 includes a pair of bearings 222a and 222b arranged vertically. The bearing part 223 includes a pair of bearings 223a and 223b arranged vertically.

The shaft 224 is rotatably supported by the bearing 221a at one end in the longitudinal direction thereof, by the bearing 223a at the other end thereof, and by the bearing 222a at a central portion thereof. The driven pulley 156 of the belt mechanism 15R and a drive gear 225 are attached to the shaft 224.

The shaft 226 is shorter than the shaft 224 and is rotatably supported by the bearing 222b at one end in the longitudinal direction thereof, and by the bearing 223b at the other end thereof. The driven gear 227 meshing with the drive gear 225 and a drive pulley 241 of the belt mechanism 24 are attached to the shaft 226.

That is, the driven pulley 156 (belt mechanism 15R) and the drive pulley 241 (belt mechanism 24) are coupled via the first driven part 22. A portion of the power transmitted by the belt mechanism 15R is transmitted to the shaft 224 via the driven pulley 156, to the shaft 226 via the drive gear 225 and the driven gear 227, and further to the belt mechanism 24 via the drive pulley 241. The power transmitted to the belt mechanism 24 is used to drive the test wheel W.

That is, the first driven part 22 on the right and the driven pulleys 156 (and the driven pulleys 155A and 155C) rotatably supported by the first driven part 22 have a function of taking out a portion of the power from the belt mechanism 15R and supplying it to the belt mechanism 24.

The remaining portion of the power transmitted by the belt mechanism 15R is transmitted to the main frame 21 of the carriage 20 to which the belt 151 is fixed by the belt clamps 157, and is used to drive the carriage 20.

That is, the belt mechanism 15R on the right constitutes a part of a driver that drives the carriage 20 (carriage driver) and also constitutes a part of a driver for driving the test wheel W (test wheel driver). In addition, the belt mechanism 15R on the right, together with the first driven part 22 on the right, functions as a distributor (power distributor) that distributes power generated by the drive parts 14RA and 14RB to power to be used to drive the carriage 20 and power to be used to drive the test wheel W.

In the belt mechanism 15R of the present embodiment, since the pitch diameter of the output-side driven pulley 156 is larger than that of the input-side drive pulley 152, the belt mechanism 15R has a reduction ratio larger than 1. It should be noted that aspects of the present disclosure are not limited to this configuration. The pitch diameter of the driven pulley 156 may be set to be equal to or larger than the pitch diameter of the drive pulley 152 to set the reduction ratio of the belt mechanism 15R to be equal to or smaller than 1.

The first driven part includes the drive gear 225 and the driven gear 227, thereby reversing rotational direction of the power.

As shown in FIG. 17, the second driven part 23 (main body part 231) includes three rods 231b extending in the Y axis direction, and three bearings 231c having respective inner rings fitted with the respective rods 231b. The three rods 231b are arranged at equal intervals in the X axis direction. In the present embodiment, the rod 231b at the center is disposed higher than the remaining two rods 231b, but all the rods 231b may be disposed at the same height.

Outer rings of the bearings 231c are fitted with three driven pulleys 155 of the belt mechanism 15L (driven pulleys 155A, 155B, and 155C in order from the front), respectively. With this configuration, the driven pulleys 155A, 155B, and 155C of the belt mechanism 15L are rotatably supported by the second driven part 23.

As shown in FIG. 4, the belt 151 of the belt mechanism 15 is divided into an upper portion 151a and a lower portion 151b by being folded back by the drive pulleys 152A and 152B. The upper portion 151a and the lower portion 151b are stretched in the traveling direction of the carriage 20 and driven in opposite directions to each other. Specifically, the lower portion 151b of the belt 151 fixed to the carriage 20 is driven together with the carriage 20 in the traveling direction of the carriage, and the upper portion 151a is driven in the opposite direction to the carriage 20 and the lower portion 151b. The upper portion 151a of the belt 151 traveling in the opposite direction to the carriage 20 is wound around the driven pulleys 155 and 156 attached to the carriage 20, and the driven pulleys 155 and 156 are driven by the upper portion 151a.

As shown in FIGS. 10 and 11, a portion of the power transmitted by the belt mechanism 15R on the right is transmitted to the torque applying device 30 by the second transmission section TS2, is further transmitted to the test wheel W by the third transmission section TS3, and is used to drive the test wheel W. The second transmission section TS2 includes the first driven part 22 and the belt mechanism 24, and the third transmission section TS3 includes the belt mechanism 25, the transmission shaft part 26, and the spindle part 50. As described above, the remaining portion of the power transmitted by the belt mechanism 15R on the right is transmitted to the main frame 21 of the carriage 20 to which the leading end portions of the belt 151 are fixed by the belt clamps 157, and is used to drive the carriage 20. By the belt mechanism 15R and the first driven part 22 configured as described above, both the carriage 20 and the test wheel W can be driven by the belt 151.

The second driven part 23 on the left is different from the first driven part 22 on the right in that the second driven part 23 on the left does not include a configuration for extracting a portion of the power transmitted by the belt mechanism 15L and transmitting the extracted power to the second transmission section TS2 provided to the carriage 20 (specifically, the bearing parts 222 and 223, the shafts 224 and 226, the drive gear 225, and the driven gear 227). The second driven part 23 on the left is not an essential component, but by providing the second driven part 23 on the left, forces that the carriage 20 receives from the belt mechanisms 15L and 15R on left and right balance and the traveling of the carriage 20 stabilizes.

As described above, in the present embodiment, a configuration is adopted in which the carriage 20 and the test wheel W are driven by using the power transmitted by a common power transmitter (i.e., the belt mechanism 15R). With this configuration, regardless of the traveling speed of the carriage 20, the test wheel W can always be driven to rotate at a peripheral speed (rotation speed) corresponding to the traveling speed of the carriage 20. Furthermore, in order to reduce the operating amount (i.e., power consumption) of the torque applying device 30, the present embodiment is configured such that the test wheel W rotates at a peripheral speed that is substantially the same as the traveling speed of the carriage 20 when the torque applying device 30 is not operating.

The belt mechanism 24 includes the drive pulley 241 attached to the above-described shaft 226 (FIG. 16) of the first driven part 22, a driven pulley 242 attached to a later-described shaft part 314 (FIG. 18) of the torque applying device 30, and a belt 243 wound around the drive pulley 241 and the driven pulley 242. The belt 243 is, for example, a toothed belt having the same configuration as that of the belt 151 described above. The type of belt 243 may be different from that of the belt 151.

Figure 18:
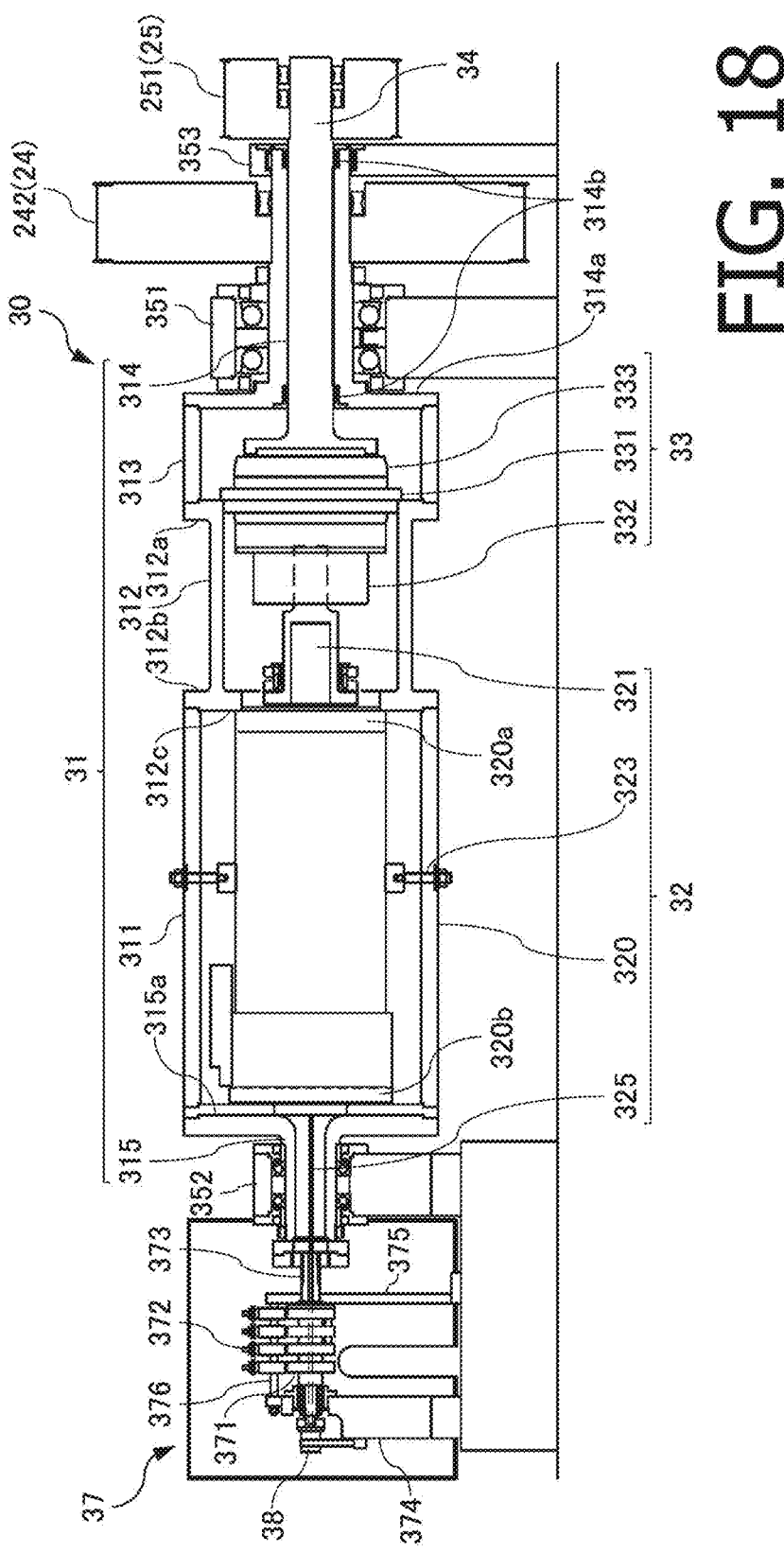
FIG. 18 is a cross-sectional view of a torque applying device.

FIG. 18 is a diagram showing a structure of the torque applying device 30. The torque applying device 30 generates torque to be applied to the test wheel W and outputs the torque by adding the torque to the rotational motion transmitted by the belt mechanism 24. In other words, the torque applying device 30 can apply the torque to the test wheel W (i.e., the torque applying device 30 can apply driving force or braking force between the road surface 63*a* and the test wheel W) by changing phase of the rotational motion transmitted by the belt mechanism 24.

The torque applying device 30 functions as a second actuator configured to generate power to drive the test wheel W, and also functions as a power coupler configured to couple power generated by the motor 141 (first motor) of the drive part 14 (first actuator) with power generated by a later-described motor 32 (second motor) of the torque applying device 30.

By incorporating the torque applying device 30 into the drive system DS, it becomes possible to divide roles between a power source (the drive parts 14RA, 14RB) for controlling the rotating speed of the test wheel W and a power source (a motor 32 which will be described later) for controlling the torque. Due to this configuration, it becomes possible to use a power source of a smaller capacity and to control the rotating speed and the torque to be applied to the test wheel W with higher accuracy. Also, since load that acts on the belt mechanism 15R decreases by incorporating the torque applying device 30 in the carriage 20, it becomes possible to downsize the belt mechanism 15R (e.g., decrease the number of toothed belts used) and to use members of lower load capacities.

The torque applying device 30 includes a rotating frame 31, a motor 32 (second motor), a reducer 33 and a shaft 34 that are attached inside the rotating frame 31, three bearing parts 351, 352 and 353 configured to rotatably support the rotating frame 31, a slip ring part 37, and a rotary encoder 38 configured to detect a rotating speed of the rotating frame 31.

In the present embodiment, as the motor 32, a super-low inertia and high-power type AC servo motor with an inertia moment of a rotating part being equal to or less than 0.01 kg·m$^2$ (preferably equal to or less than 0.008 kg·m$^2$) and with a rated output of 3 to 60 kW (7 to 37 kW being more suitable for practical use).

The rotating frame 31 has a substantially cylindrical first cylindrical part 311 (motor housing part), a second cylindrical part 312 (coupling tube), and a third cylindrical part 313 having large diameters, and substantially cylindrical shaft parts 314 and 315 having smaller diameters than the first cylindrical part 311. The shaft part 314 is coaxially connected to one end portion (the right end portion in FIG. 18) of the first cylindrical part 311 via the second cylindrical part 312 and the third cylindrical part 313. The shaft part 315 is coaxially connected to the other end portion (the left end portion in FIG. 18) of the first cylindrical part 311. The shaft part 314 is rotatably supported by the bearing parts 351 and 353, and the shaft part 315 is rotatably supported by the bearing part 352.

The motor 32 is accommodated in a hollow portion of the first cylindrical part 311. A shaft 321 the motor 32 is disposed coaxially with the rotating frame 31, and a motor case 320 (i.e., a stator) is fixed to the first cylindrical part 311 with a plurality of stud bolts 323.

The reducer 33 is disposed in hollow portions of the second cylindrical part 312 and the third cylindrical part 313. The shaft 321 of the motor 32 is connected to an input shaft 332 of the reducer 33, and the shaft 34 is connected to an output shaft 333 of the reducer 33.

A flange 312*a* projecting radially outward is formed to one end portion (the right end portion in FIG. 18) of the second cylindrical part 312. A flange 312*b* projecting radially outward and an inner flange 312*c* projecting radially inward are formed to the other end portion (the left end portion in FIG. 18) of the second cylindrical part 312.

A flange 320*a* of the motor 32 is fixed to the inner flange 312*c* of the second cylindrical part 312. A gear case 331 of the reducer 33 is fixed to one end portion of the second cylindrical part 312 (i.e., a base of the flange 312*a*). That is, the motor case 320 of the motor 32 and the gear case 331 of the reducer 33 are coupled to each other with high rigidity via the second cylindrical part 312, which is a single short cylindrical member. As a result, almost no bending moment acts on the shaft 321 of the motor 32 and the input shaft 332 of the reducer 33, smooth (i.e., low friction) rotation of the shaft 321 and the input shaft 332 is ensured, and accuracy of control of the torque to be applied to the test wheel W is improved.

A flange 315*a* having the same diameter as the first cylindrical part 311 is formed to a base of the shaft part 315, and one end of the first cylindrical part 311 is fixed to an outer peripheral portion of the flange 315*a*. A flange 320*b* of the motor 32 is fixed to the flange 315*a* of the first cylindrical part 311. Since the motor 32 is fixed to the rotating frame 31 at both end portions and a central portion in a lengthwise direction of the motor case 320, the motor 32 is supported with high rigidity.

A flange 314*a* having the same diameter as the third cylindrical part 313 is formed to a base of the shaft part 314, and one end of the third cylindrical part 313 is fixed to an outer peripheral portion of the flange 314*a*. The other end of the third cylindrical part 313 is fixed to an outer peripheral portion of the flange 312*a* of the second cylindrical part 312.

A base side of the shaft part 314 near the flange 314*a* is rotatably supported by the bearing part 351, and a tip portion of the shaft part 314 is rotatably supported by the bearing part 353. The driven pulley 242 of the belt mechanism 24 is disposed between the bearing part 351 and the bearing part 353, and is coaxially attached to an outer periphery of the shaft part 314. A rotating portion of the torque applying device 30 is driven to rotate by the power transmitted by the belt mechanism 24. That is, the shaft part 314 (rotating frame 31) serves as an input shaft of the torque applying device 30.

A pair of bearings 314*b* is provided on inner peripheries of both end portions of the shaft part 314 (i.e., portions supported by the bearing part 351 or the bearing part 353). The shaft 34 passes through a hollow portion of the shaft part 314, and is rotatably supported by the pair of bearings 314*b*. A distal end of the shaft 34 protrudes outward from a distal end of the shaft part 314. A drive pulley 251 of the belt mechanism 25 is coaxially attached to a distal end portion of the shaft 34 protruding from the shaft part 314, and the belt mechanism 25 is driven by power output from the shaft 34. That is, the shaft 34 serves as an output shaft of the torque applying device 30.

Torque output from the motor 32 is amplified by the reducer 33 and transmitted to the shaft 34. Rotation output from the shaft 34 to the belt mechanism 25 is a superposition of the torque generated by the motor 32 and the reducer 33 on the rotation of the rotating frame 31 driven by the belt mechanism 24. The torque applying device 30 adds the torque generated by the torque applying device 30 to the rotational motion transmitted to the shaft part 315 of the rotating frame 31 being the input shaft, and outputs the torque from the shaft 34 being the output shaft.

The slip ring part 37 includes a plurality of pairs of a slip ring 371 a brush 372, a support tube 373, a bearing part 374, a support column 375, and a support arm 376. The support tube 373 is coaxially coupled to the shaft part 315 of the rotating frame 31. A distal end portion of the support tube 373 is rotatably supported by the bearing part 374. The support arm 376 is disposed parallel to the support tube 373, one end of which is fixed to the support column 375 disposed on the rotating frame 31 side, and the other end of which is fixed to a frame of the bearing part 374.

The plurality of slip rings 371 are arranged at constant intervals in the axial direction and are attached to an outer periphery of the support tube 373. The plurality of brushes 372 are disposed to face and contact outer peripheral surfaces of the corresponding slip rings 371, and are attached to the support arm 376.

Figure 38:
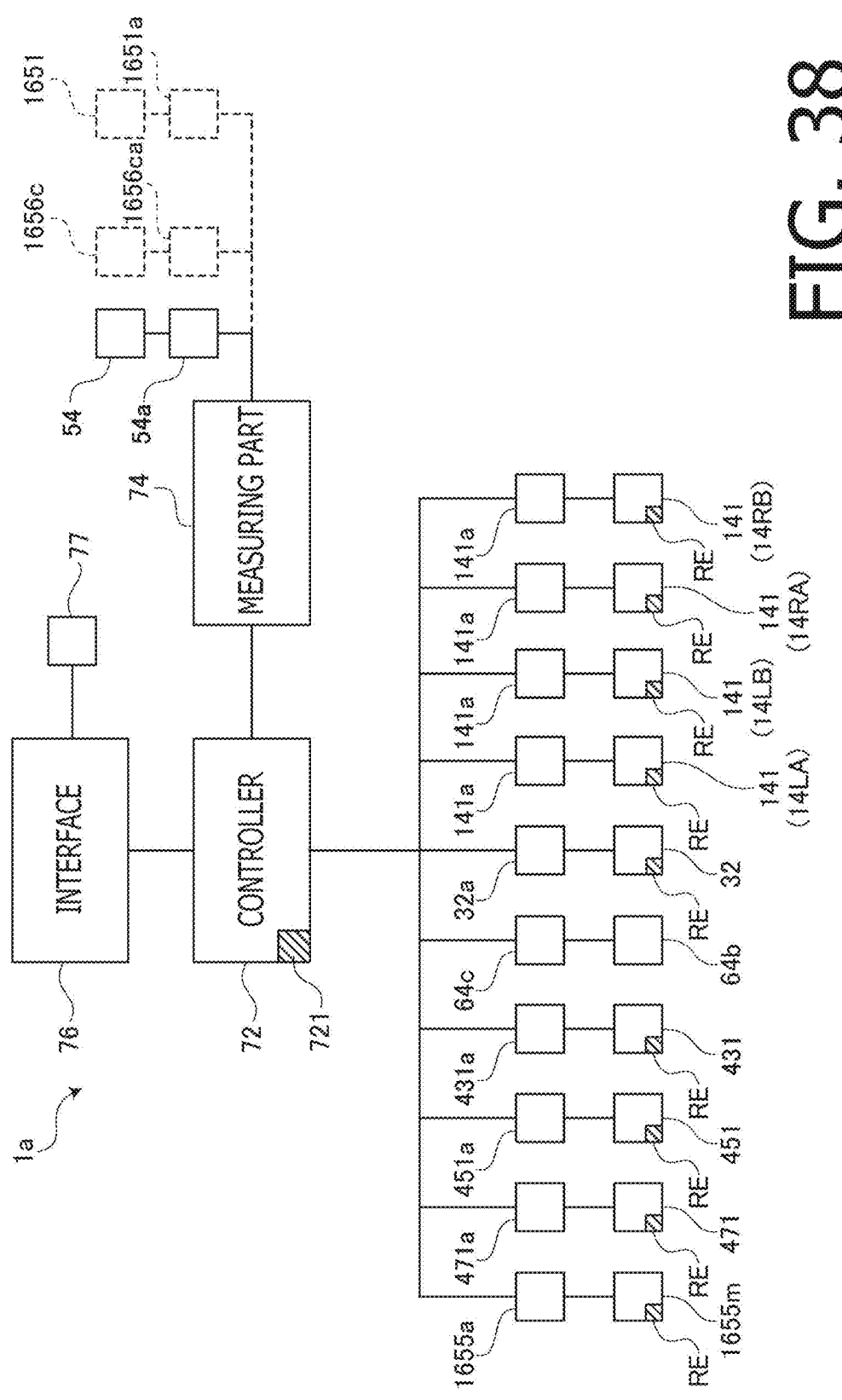
FIG. 38 is a block diagram showing a schematic configuration of a control system.

A conventionally-known lead wire is connected to each slip ring 371. The lead wire passes through a hollow portion of the support tube 373 and is drawn out into a hollow portion of the shaft part 315 of the rotating frame 31. A cable 325 of the motor 32 passes through the hollow portion of the shaft part 315, and a plurality of wires included in the cable 325 are connected to the lead wires of the corresponding slip rings 371. The brushes 372 are connected to a driver 32a (FIG. 38). That is, the motor 32 and the driver 32a are connected to each other via the slip ring part 37.

The rotary encoder 38 is attached to the bearing part 374 of the slip ring part 37. The support tube 373 which rotates integrally with the rotating frame 31 is connected to an input shaft of the rotary encoder 38.

As shown in FIG. 11, the belt mechanism 25 includes the drive pulley 251 attached to the output shaft (shaft 34) of the torque applying device 30, a driven pulley 252 attached to an input shaft (transmission shaft 261) of the transmission shaft part 26, and a belt 253 wound around the drive pulley 251 and the driven pulley 252, and transmits the power output from the torque applying device 30 to the transmission shaft part 26. The belt 253 is, for example, a toothed belt having the same configuration as that of the above-described belt 151. The type of the belt 253 may be different from that of the belt 151.

The transmission shaft part 26 includes the transmission shaft 261, a pair of bearing parts 262 that rotatably supports the transmission shaft 261, a disc brake 263, a slide type constant velocity joint 265, a transmission shaft 266, and a bearing 267 that rotatably supports the transmission shaft 266. The disc brake 263 includes a disc rotor 263a attached to the transmission shaft 261, and a caliper 263b that applies friction to the disc rotor 263a for braking.

The driven pulley 252 of the belt mechanism 25 is attached to one end portion of the transmission shaft 261, and one end of the slide type constant velocity joint 265 is connected to the other end via the disc rotor 263a. The other end of the slide type constant velocity joint 265 is coupled to the spindle 52 via the transmission shaft 266. The slide type constant velocity joint 265 is configured so that rotation can be smoothly transmitted without rotation fluctuation regardless of an operating angle (i.e., an angle between an input shaft and an output shaft). A length (transmission distance) in an axial direction of the slide type constant velocity joint 265 is also variable.

The spindle 52 to which the test wheel W is to be attached is supported by the alignment part 40 so that its angle and position can be changed. By coupling the transmission shaft 261 and the spindle 52 via the slide type constant velocity joint 265, even if the angle and/or position of the spindle 52 changes, the slide type constant velocity joint 265 can flexibly follow this change. Therefore, a large strain does not act on the spindle 52 and the transmission shaft 261, and the power is smoothly transmitted.

Figure 19:
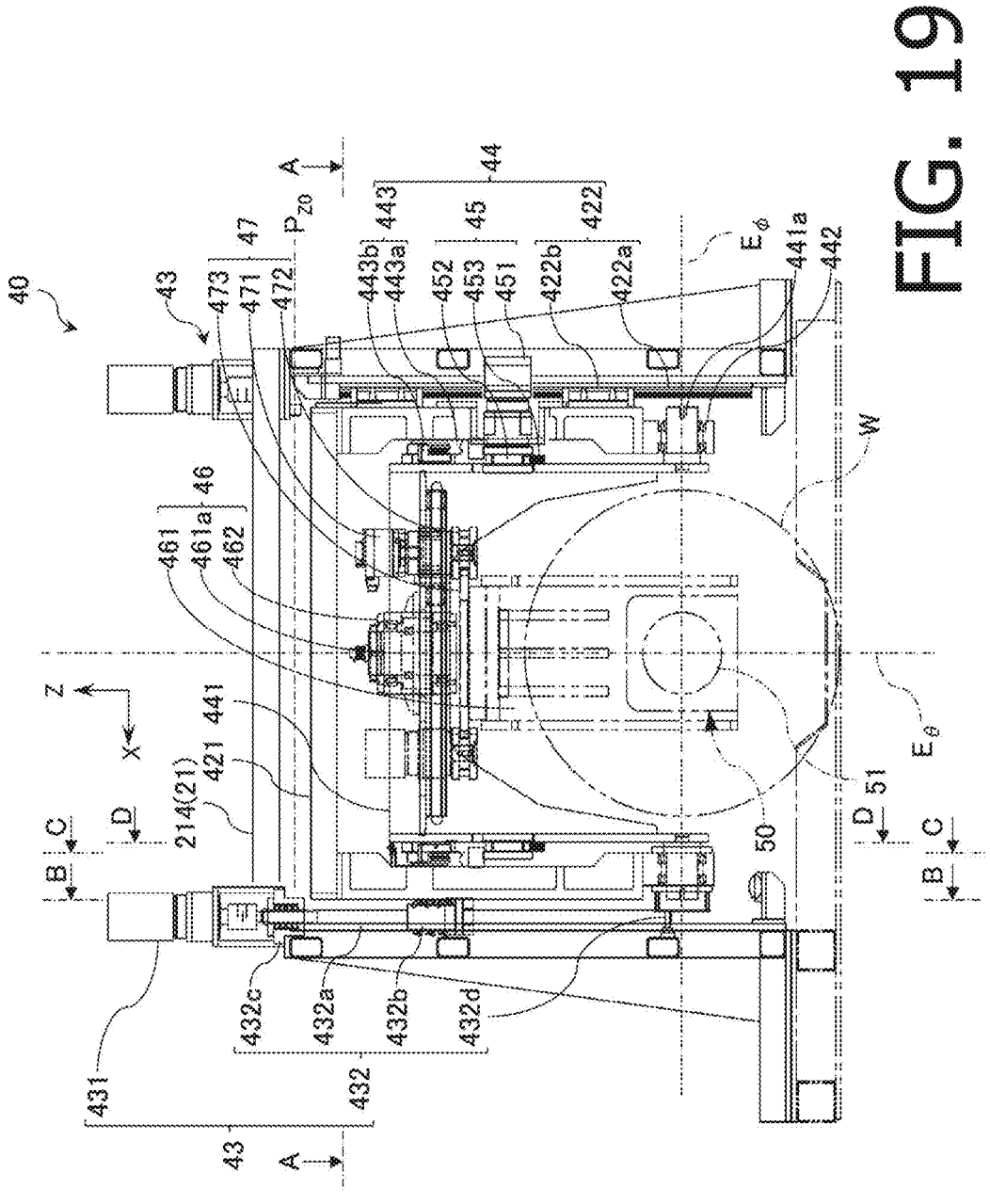
FIG. 19 is a diagram showing a schematic structure of an alignment part 40.
Figure 20:
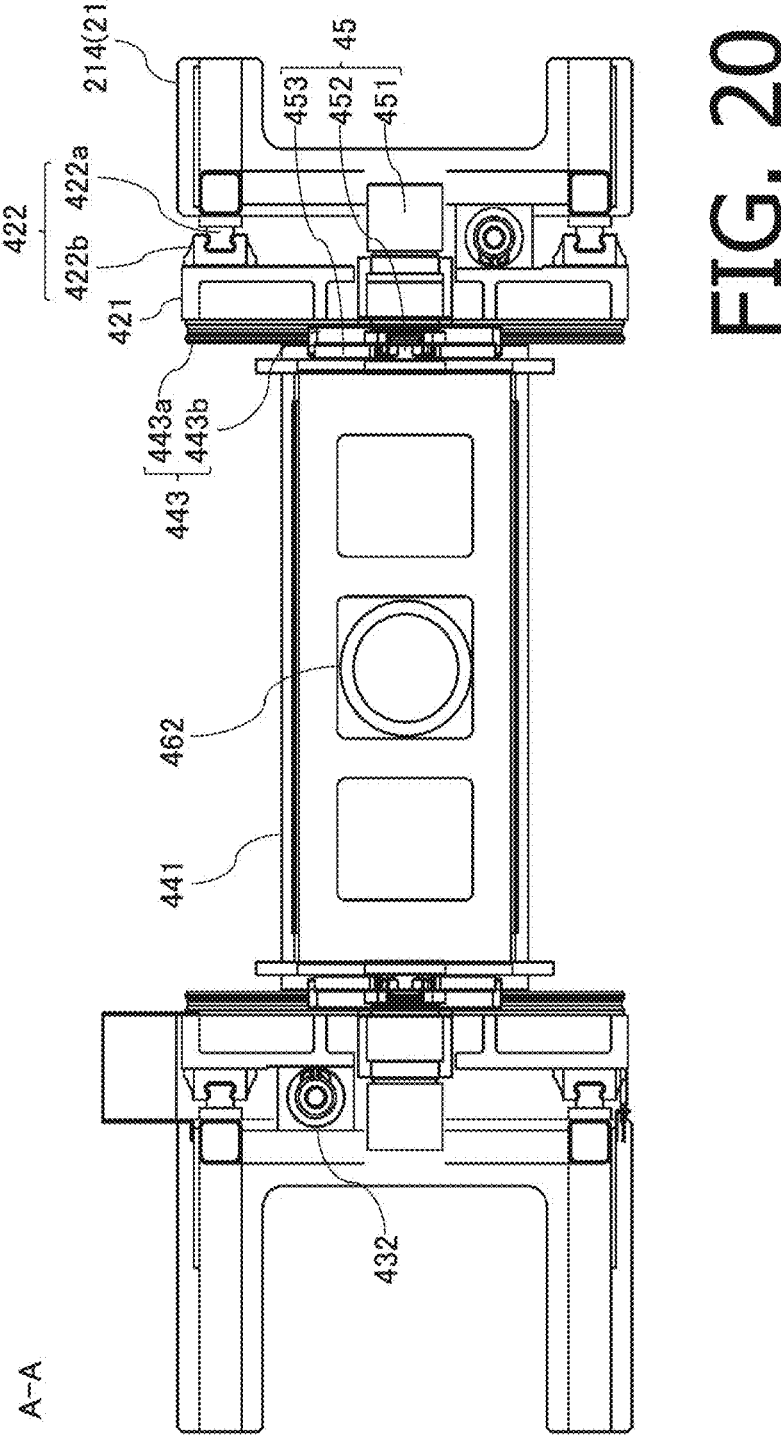
FIG. 20 is a view A-A of FIG. 19.
Figure 21:
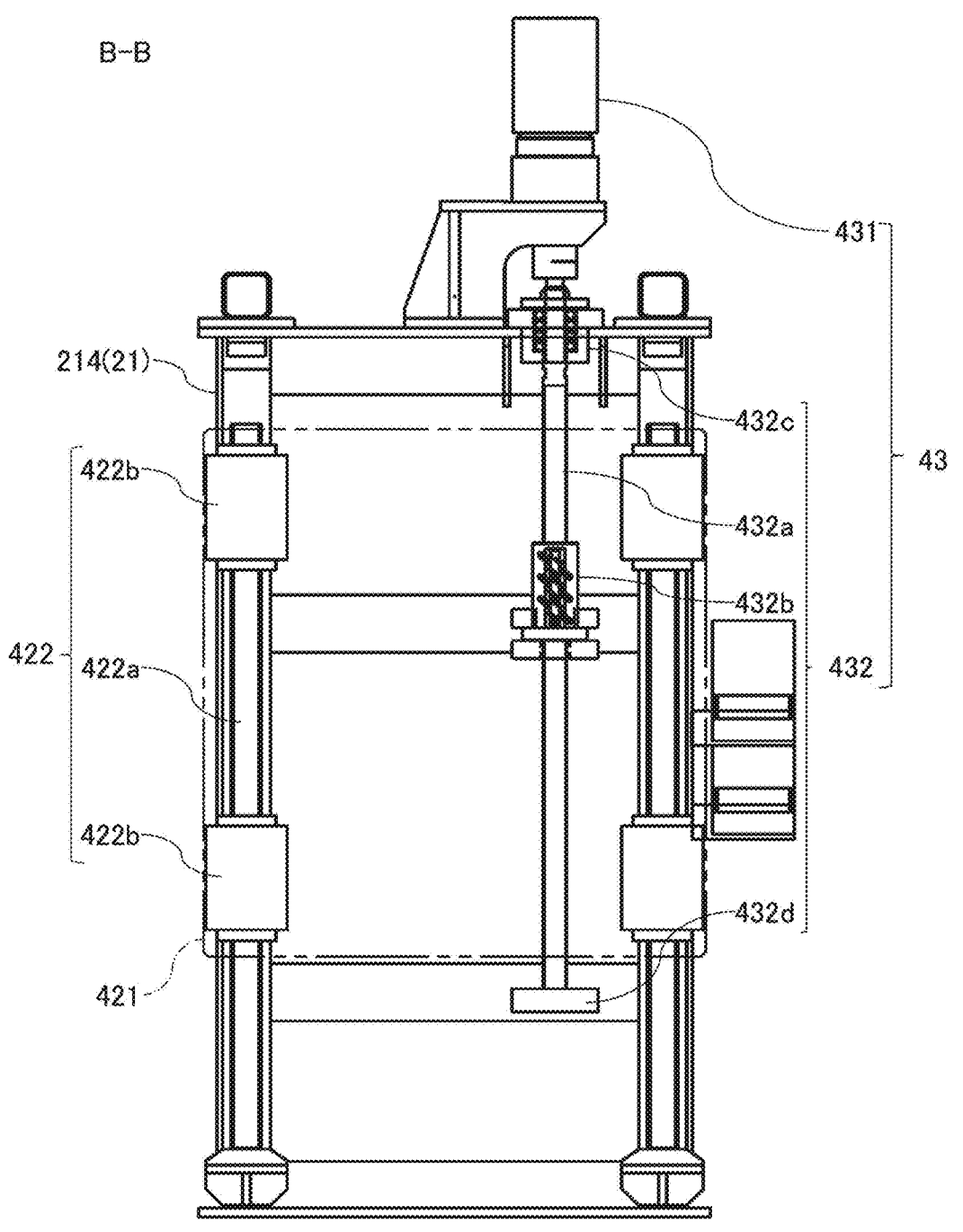
FIG. 21 is a view B-B of FIG. 19.
Figure 22:
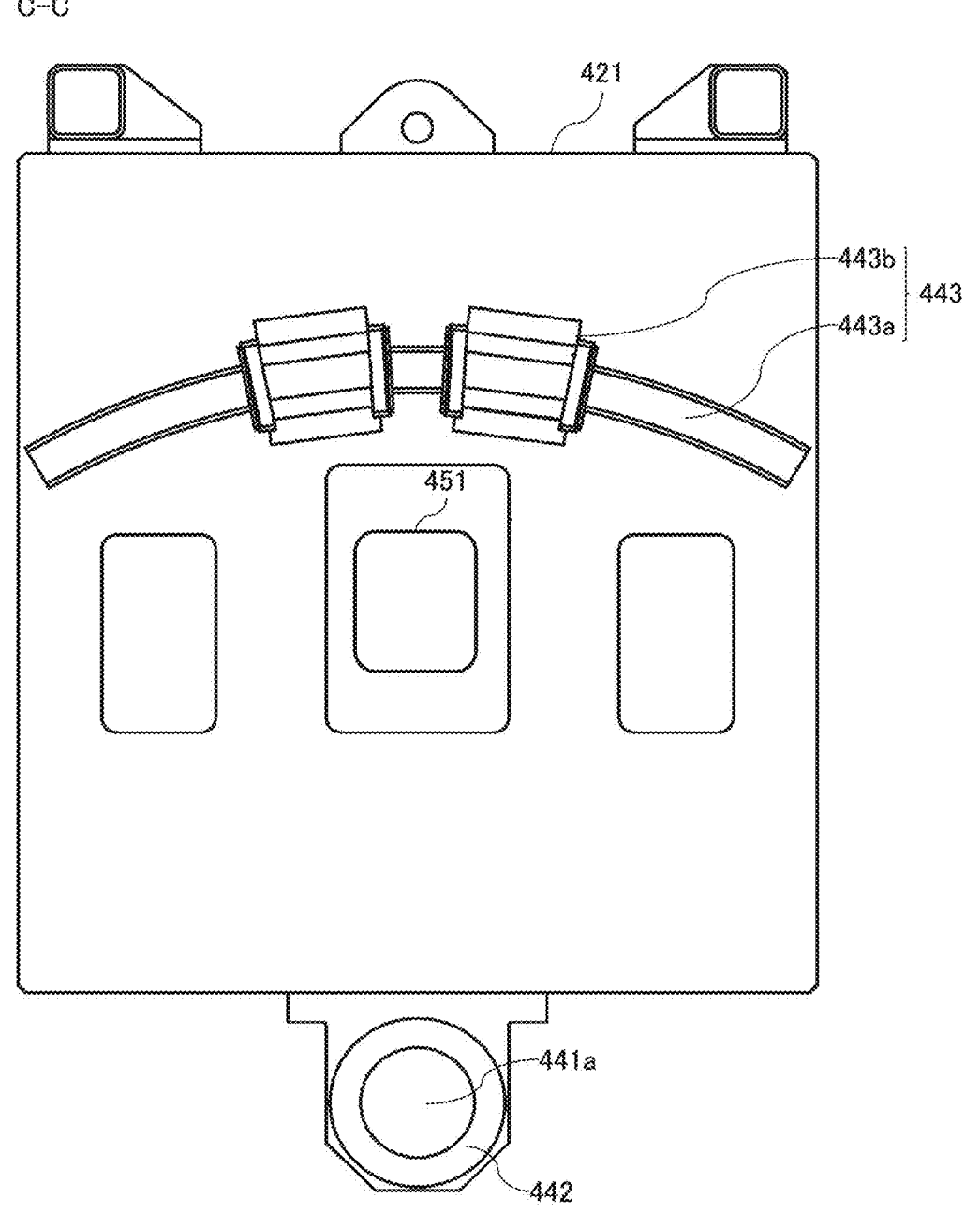
FIG. 22 is a view C-C of FIG. 19.
Figure 23:
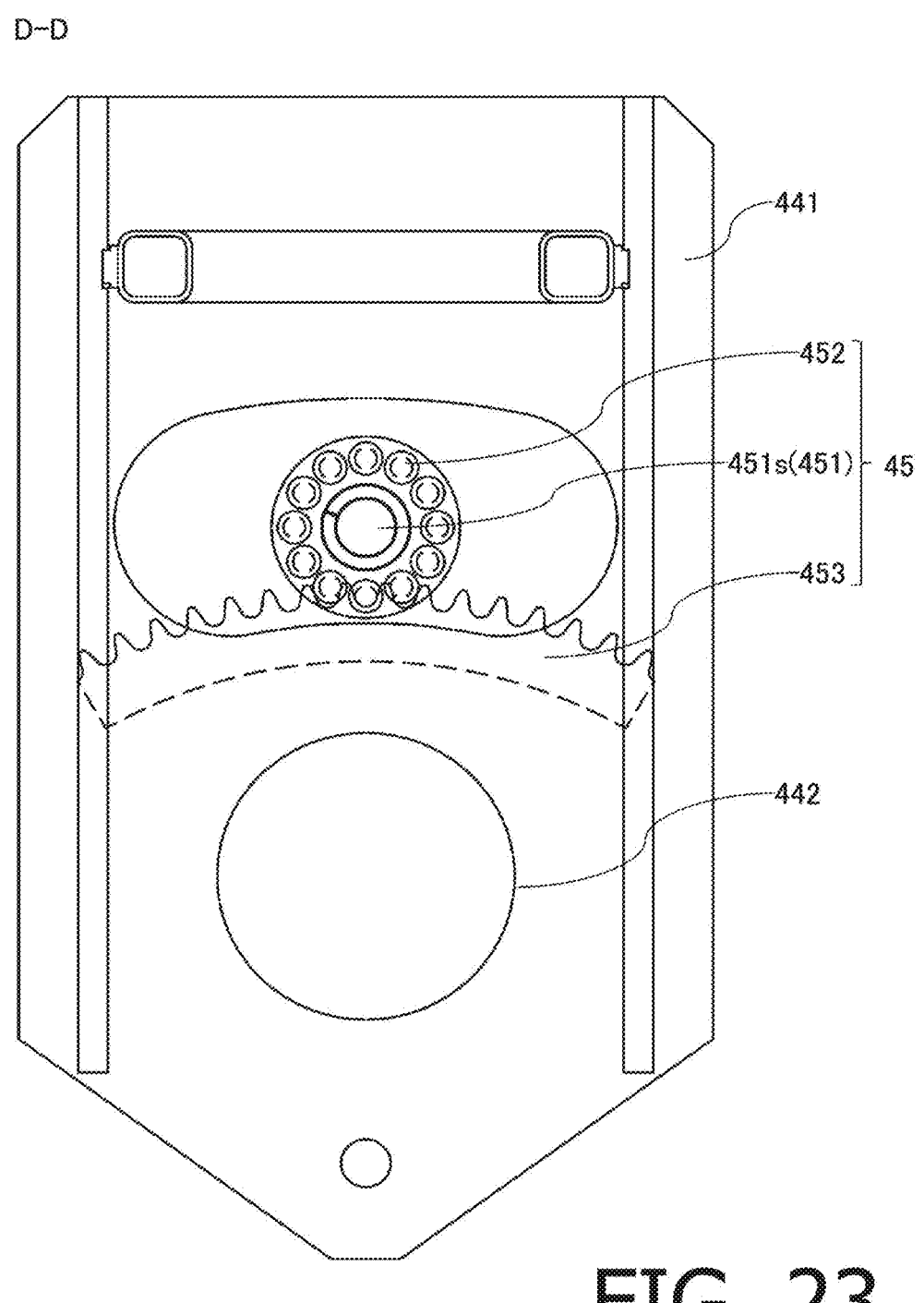
FIG. 23 is a view D-D of FIG. 19.

FIG. 19 is a diagram showing a schematic structure of the alignment part 40. FIGS. 20, 21, 22, and 23 are a view A-A of FIG. 19, a view B-B of FIG. 19, a view C-C of FIG. 19, and a view D-D of FIG. 19, respectively.

The alignment part 40 includes a load adjusting part 42, a camber adjusting part 44, and a slip angle adjusting part 46.

The load adjusting part 42 is a mechanism for adjusting the load that acts on the test wheel W (a vertical load received from the road surface 63a) by changing a height of the spindle 52 and the test wheel W attached to the spindle 52 (more specifically, a distance from the road surface 63a to a center C of the test wheel W). The load adjusting part 42 includes an elevating frame 421 (first movable frame) which is movable vertically (in the Z axis direction) with respect to the base 11, a plurality of (in the illustrated embodiment, two pairs of) linear guides 422 that guide the vertical movement of the elevating frame 421, and one or more (in the illustrated embodiment, one pair of) Z axis drivers 43 that vertically drive the elevating frame 421.

An alignment mechanism support part 214 in the shape of a hut (or an arbor) that accommodates the alignment part 40 is provided on the left side of the main frame 21 of the carriage 20. The elevating frame 421 is accommodated in the alignment mechanism support part 214. The linear guide 422 includes a rail 422a extending up and down, and one or more (in the illustrated embodiment, two) traveling parts 422b configured to travel on the rail 422a. Either of the rail 422a and the traveling part 422b of each linear guide 422 is attached to the alignment mechanism support part 214, and the other is attached to the elevating frame 421.

The Z axis driver 43 (first driver) includes a motor 431 and a ball screw 432 (motion converter) that converts rotational motion of the motor 431 into linear motion in the Z axis direction. The ball screw 432 includes a screw shaft 432a coupled to a shaft of the motor 431, a nut 432b meshing with the screw shaft 432a, and bearings 432c and 432d that rotatably support the screw shaft 432a. The motor 431 and the two bearings 432c and 432d are attached to the alignment mechanism support part 214, and the nut 432b is attached to the elevating frame 421.

When the ball screw 432 is driven by the motor 431, the elevating frame 421 moves up and down together with the nut 432b. Accordingly, the test wheel W moves up and down via the camber adjusting part 44, the slip angle adjusting part 46 and the spindle part 50 supported by the elevating frame 421, and a load corresponding to a drive amount of the ball screw 432 (i.e., a height of the test wheel W) acts on the test wheel W.

In the present embodiment, the screw shaft 432a is directly coupled to the motor 431, but the motor 431 and the screw shaft 432a may be coupled via a reducer or a gear device such as a worm gear for reducing rotation.

Although a feed screw mechanism is used as a motion converter in the present embodiment, another type of motion converter configured to convert rotational motion into linear motion may be used.

Although the motor 431 in the present embodiment is a servo motor, another type of motor of which operation amount can be controlled may be used as the motor 431.

The camber adjusting part 44 is a mechanism for adjusting a camber angle, which is an inclination of the test wheel W with respect to the road surface, by causing the spindle 52 to pivot about an E $\varphi$ axis (an axis extending in the front-rear direction passing through the center C of the test wheel W). The camber adjusting part 44 includes a $\varphi$-rotating frame 441 (second movable frame) configured to rotate about the $E_\varphi$ axis, a pair of bearings 442 that rotatably support the $\varphi$-rotating frame 441, a pair of curved guides 443 that guide the rotation of the $\varphi$-rotating frame 441, and a pair of $\varphi$ drivers 45 (second drivers) on the right and left that rotationally drive the $\varphi$-rotating frame 441.

As shown in FIG. 19, the $\varphi$-rotating frame 441 and the elevating frame 421 of the present embodiment have a gate shape (n shape) as viewed in the Y axis direction. The $\varphi$-rotating frame 441 is accommodated in a cavity portion of the ∩-shaped elevating frame 421. Cylindrical pivots 441a are provided on a front surface and a rear surface of the $\varphi$-rotating frame 441, respectively, coaxially with the $E_\varphi$ axis and projecting outward (i.e., in a direction away from the test wheel W). Each pivot 441a is rotatably supported by the pair of bearings 442 attached to the elevating frame 421. The $\varphi$-rotating frame 441 is supported so as to be rotatable about the $E_\varphi$) axis with the pivots 441a as support shafts. It should be noted that the bearings 442 may be attached to the $\varphi$-rotating frame 441 and the pivots 441a may be attached to the elevating frame 421. Furthermore, the shapes of the $\varphi$-rotating frame 441 and the elevating frame 421 are not limited to the shapes of the present embodiment, and may be any shape having a cavity portion configured to accommodate the spindle part 50 and the like.

The curved guide 443 includes an arc-shaped curved rail 443a disposed coaxially with the $E_\varphi$ axis, and one or more (in the illustrated embodiment, two) traveling parts 443b configured to travel on the curved rail 443a. Either of the curved rail 443a and the traveling part 443b is attached to the elevating frame 421, and the other is attached to the $\varphi$-rotating frame 441.

The $\varphi$ driver 45 includes a pair of spur gears 453 attached to the front and rear surfaces of the $\varphi$-rotating frame 441, a pair of pinions 452 meshing with the spur gears 453, respectively, and a pair of motors 451 that drives the pinions 452, respectively. It should be noted that the spur gears 453 may be attached to the elevating frame 421 and the motors 451 may be attached to the $\varphi$-rotating frame 441. The spur gear 453 is a segment gear formed in an arc shape around the $E_\varphi$ axis (i.e., coaxial with the $E_\varphi$ axis). The spur gear 453 is an internal gear in the illustrated embodiment, but may be an external gear.

The motors 451 are attached to the elevating frame 421, and the pinions 452 are coupled to shafts 451s of the motors 451. Although the motor 451 in the present embodiment is a servo motor, another type of motor of which operation amount can be controlled may be used as the motor 451.

When the pinions 452 are driven to rotate by the motors 451, the $\varphi$-rotating frame 441, together with the spur gears 453 meshing with the pinions 452, rotates about the $E_\varphi$ axis with respect to the elevating frame 421. Accordingly, the test wheel W supported by the $\varphi$-rotating frame 441 via the slip angle adjusting part 46 and the spindle part 50 pivots around the $E_\varphi$ axis, and the camber angle changes.

The slip angle adjusting part 46 is a mechanism for adjusting a slip angle, which is an inclination of the test wheel W (more specifically, a wheel center plane perpendicular to an axle) with respect to the traveling direction (X axis direction) of the carriage 20, by changing an orientation of the spindle 52 around an $E_\theta$ axis (an axis extending in the up-down direction passing through the center C of the test wheel W). As shown in FIG. 19, the slip angle adjusting part 46 includes a $\theta$-rotating frame 461 (third movable frame) rotatable about the $E_\theta$ axis, a bearing 462 that rotatably supports the $\theta$-rotating frame 461, and a $\theta$-driver 47 that rotationally drives the $\theta$-rotating frame 461.

The $\theta$-rotating frame 461 is accommodated in a cavity portion of the $\varphi$-rotating frame 441 having the gate shape (n shape) as viewed in the Y axis direction. A pivot 461a projecting coaxially with the $E_\theta$ axis is provided on an upper surface of the $\theta$-rotating frame 461. The pivot 461a is rotatably supported by a bearing 462 attached to a top plate of a $\varphi$-rotating frame 441. The $\theta$-rotating frame 461 is supported so as to be rotatable about the $E_\theta$ axis with the pivot 461a as a support shaft.

The $\theta$-driver 47 includes a spur gear 473 attached to the $\theta$-rotating frame 461, one or more (in the illustrated embodiment, a pair of) pinions 472 meshing with the spur gear 473, and one or more (in the illustrated embodiment, a pair of) motors 471 that rotationally drive the pinions 472, respectively. The spur gear 473 is coaxially coupled to the pivot 461a. The motor 471 is attached to the $\varphi$-rotating frame 441, and the pinions 452 are attached to a shaft of the motor 471.

Figure 24:
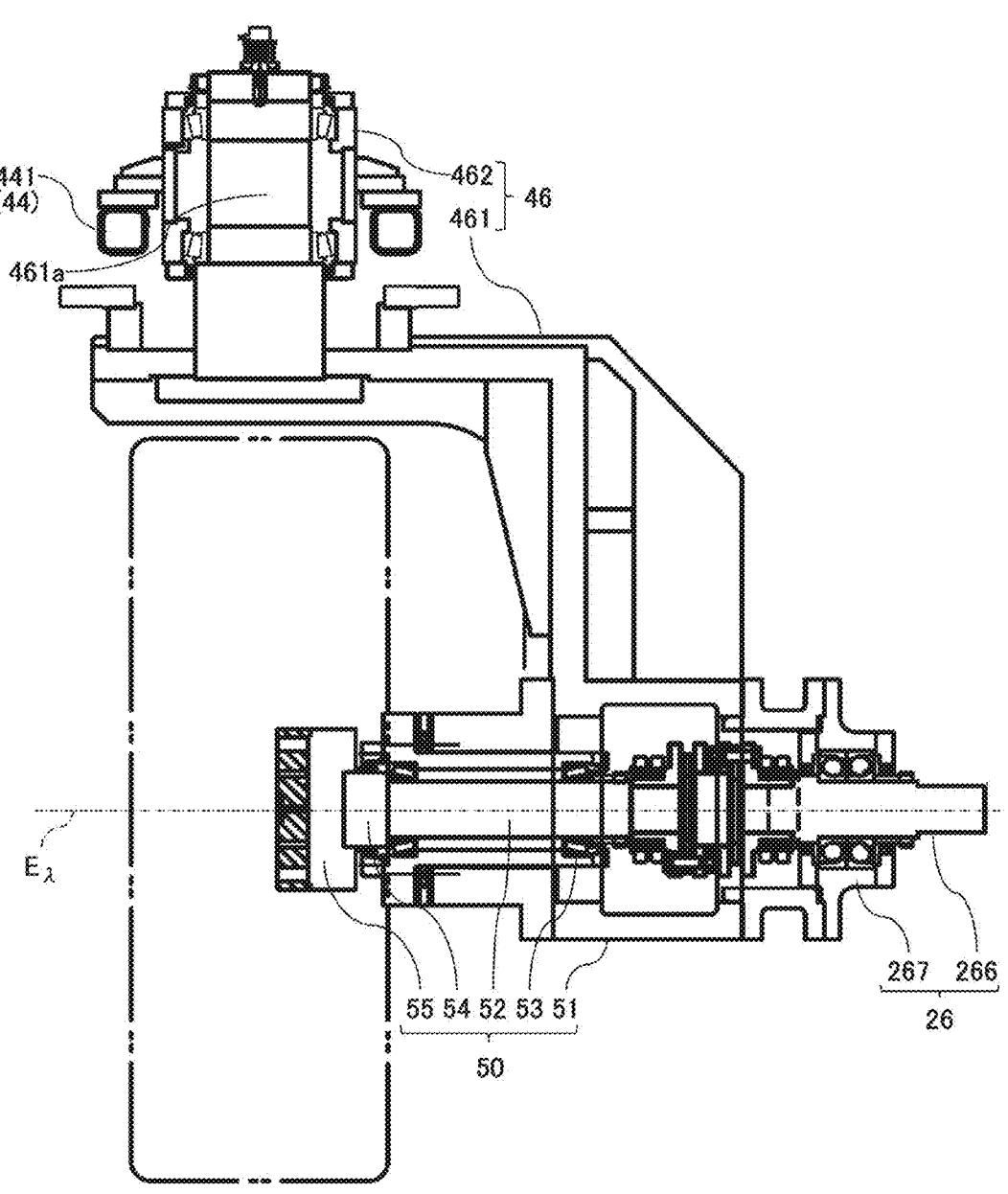
FIG. 24 is a diagram showing a schematic structure of a spindle part.

FIG. 24 is a diagram showing a schematic structure of the spindle part 50 (wheel support part). The spindle part 50 is attached to a lower end portion of the $\theta$-rotating frame 461. The spindle part 50 includes a frame 51 fixed to the $\theta$-rotating frame 461, a plurality of (in the illustrated embodiment, a pair of) bearings 53 attached to the frame 51, the spindle 52 rotatably supported by the bearings 53, a six force components sensor 54 that detects a force applied to the test wheel W, and a wheel hub 55 coaxially attached to a distal end portion of the spindle 52 via the six force components sensor 54. The six force components sensor 54 includes a plurality of conventionally-known piezoelectric elements. The wheel rim Wr (FIG. 1) of the test wheel W is attached to the wheel hub 55.

The transmission shaft 266 of the transmission shaft part 26 is connected to the end of the spindle 52. The transmission shaft 266 is rotatably supported by a bearing 267 attached to the frame 51 of the spindle part 50.

The alignment part 40 is configured such that three axes, namely the $E_\theta$ axis, the $E_\varphi$ axis and an $E_\lambda$ axis being a rotation axis of the test wheel W, intersect at one point, namely the center C of the test wheel W, so that the position of the test wheel W does not move even when the camber angle ($\varphi$ angle) and/or the slip angle ($\theta$ angle) are changed.

Figure 25:
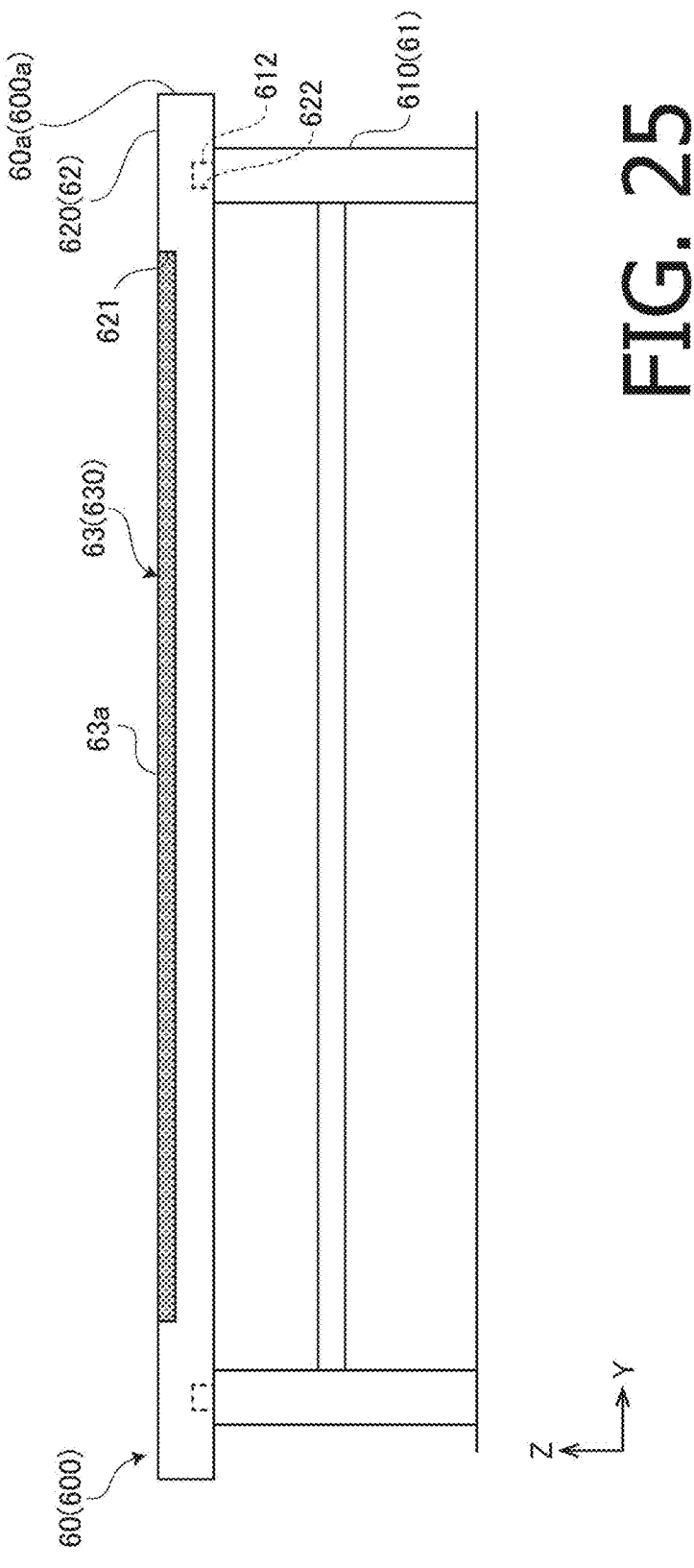
FIG. 25 is a transverse cross-sectional view of a road surface part.

FIG. 25 is a transverse cross-sectional view of the road surface part 60. The road surface part 60 includes the frame 61 and a main body part 60a supported by the frame 61. The main body part 60a includes a base 62 and a pavement part 63 held by the base 62. On an upper surface of the base 62, a recessed part 621 extending in an extending direction of the road surface part 60 (i.e., in the X axis direction being the traveling direction of the carriage 20) is formed. The pavement part 63 is for example formed by filling the recessed part 621 with simulated pavement material which will be described later and hardening the simulated pavement material. On an upper surface of the pavement part 63, the road surface 63*a* with which the test wheel W contacts is formed.

In the present embodiment, the main body part 60*a* is configured from main body part units 600*a* being road surface units (replaceable structures each including at least a portion of the road surface 63*a*) and is detachably attached on the frame 61. The road surface unit is not limited to a configuration in which the main body part 60*a* is unitized (hereinafter referred to as a "main body part unit") as in the present embodiment but may be formed to have a configuration in which only the pavement part 63 is unitized (hereinafter referred to as a "pavement part unit") or a configuration in which the entire road surface part 60 including the frame 61 is unitized (hereinafter referred to as a "road surface part unit").

The main body part 60*a* of the present embodiment is configured from a plurality of the main body part unit 600*a* formed by dividing the main body part 60*a* in an extending direction of the road surface part 60 and is configured to be replaceable per the main body part unit 600*a*. It should be noted that the entire main body part 60*a* may be formed as a single replaceable road surface unit.

By configuring the road surface part 60 from road surface units such as the main body part units 600*a* as in the present embodiment, it becomes possible to replace at least a part of the road surface 63*a*.

For example, only the main body part unit 600*a* at the central part of the road surface part 60 in the extending direction (X axis direction) can be replaced to change a type of the pavement part 63 (e.g., materials, structures, surface profiles and the like) only at the central part. Also, the type of the pavement part 63 may be changed for every main body part unit 600*a* such that, for example, the friction coefficient of the road surface 63*a* changes in the extending direction of the road surface part 60.

On a lower surface of the base 62, a recessed part 622 that fits with a protruded part 612 provided on an upper surface of the frame 61 is provided. The main body part unit 600*a* is detachably attached on the frame 61 by placing the main body part unit 600*a* on the frame 61 such that the protruded part 612 and the recessed part 622 fit to each other and by fixing the main body part unit 600*a* to the frame 61 with one or more conventionally-known fixing parts or mechanisms such as bolts or cam levers.

In the present embodiment, the frame 61 is formed from a plurality of frame units 610 formed by dividing the frame 61 in the extending direction of the road surface part 60 and is replaceable per the frame unit 610.

In the present embodiment, the frame unit 610 and the main body part unit 600*a* are formed in the same length and thus replacement per road surface part unit 600 in which the main body part unit 600*a* is attached to the frame unit 610 is also possible.

In the present embodiment, the pavement part 63 is formed integrally with the base 62. However, the pavement part 63 may be configured to be detachable from and attachable to the base 62. For example, the pavement part 63 may be configured from a plurality of pavement part units 630 formed by dividing the pavement part 63 in the extending direction of the road surface part 60, and may be configured to be replaceable per pavement part unit 630. In this case, the pavement part unit 630 and a base unit 620 may be formed in the same length to make replacement per complex unit in which the pavement part unit 630 is attached to the base unit 620 (in other words, the main body part unit 600*a* in which the pavement part 63 is made detachable)

possible. Also, the frame unit 610, the base unit 620 and the pavement part unit 630 may be assembled to form the road surface part unit 600 to make replacement per road surface part unit 600 possible.

As described above, in the present embodiment, a plurality of road surface part units 600 are connected to form the road surface part 60. By this configuration, it becomes possible to extend or shorten the road surface part 60 by adding or removing the road surface part unit 600. Furthermore, by configuring the plurality of road surface units to have the same structure, it becomes possible to efficiently manufacture the road surface part 60.

In the present embodiment, as with the road surface part 60, the track part 10 is divided into a plurality of track part units 100 in its extending direction. It is also possible to extend or shorten the track part 10 by adding or removing the track part unit 100. The track part unit 100 is formed in the same length as the road surface part unit 600. Therefore, it is possible to form the track part 10 and the road surface part 60 in the same length. The road surface part 60 and the track part 10 may also be configured to be possible to extend, shorten or partially replace per complex unit in which the track part unit 100 and the road surface part unit 600 are integrated.

In the road surface part 60 of the present embodiment, a simulated pavement simulating asphalt-paved road (i.e., a pavement of which influences on a tire such as wear volume of a tire are comparable with the actual asphalt-paved road) is formed as the pavement part 63. The simulated pavement is for example formed by shaping and curing simulated pavement material in which binder such as, for example, urethane resin or epoxy resin is added to aggregate formed by crushing (and further polishing and/or etching as necessary) ceramics with excellent wear resistance such as silicon carbide or alumina. By using such simulated pavement material, a simulated road surface with excellent wear resistance and stable road surface state (i.e., a simulated road surface that causes stable wear volume and the like to the test tire T) can be obtained. The wear volume of a tire can be adjusted by, for example, particle size of the aggregate and/or amount of the binder added.

The simulated pavement of the present embodiment has a single-layered structure. However, for example, a simulated pavement in which a plurality of layers formed from different materials are layered in a thickness direction may be used. Simulated pavements simulating flagstone pavements, brick pavement, concrete pavement and the like by, for example, adjusting types and/or particle size of the aggregate and/or adjusting types and/or amount of the binder may also be used.

The road surface 63*a* may also be formed to cause more (or less) damage on a tire than the actual road surface. It becomes possible to perform accelerated tire deterioration test by using the road surface 63*a* which has greater influence on a tire than the actual road surface.

The pavement part 63 may also be formed from actual pavement material (e.g., asphalt compound used for a superficial layer of an asphalt pavement). The pavement part 63 replicating or imitating not only a superficial layer of an actual pavement forming the road surface but also a lower layer structure of the actual pavement may also be used.

In the tire testing device 1 of the present embodiment, since the road surface 63*a* does not move during the test, the test can be performed in a state where foreign matter (e.g., water, snow, mud water, dirt, sand, gravel, oil or the like or matter simulating the aforementioned foreign matter) which has influence on performance of a tire is scattered on the road surface 63*a*. For example, by performing the test in a state where water is scattered on the road surface 63*a*, wet braking test can be performed.

Figure 26:
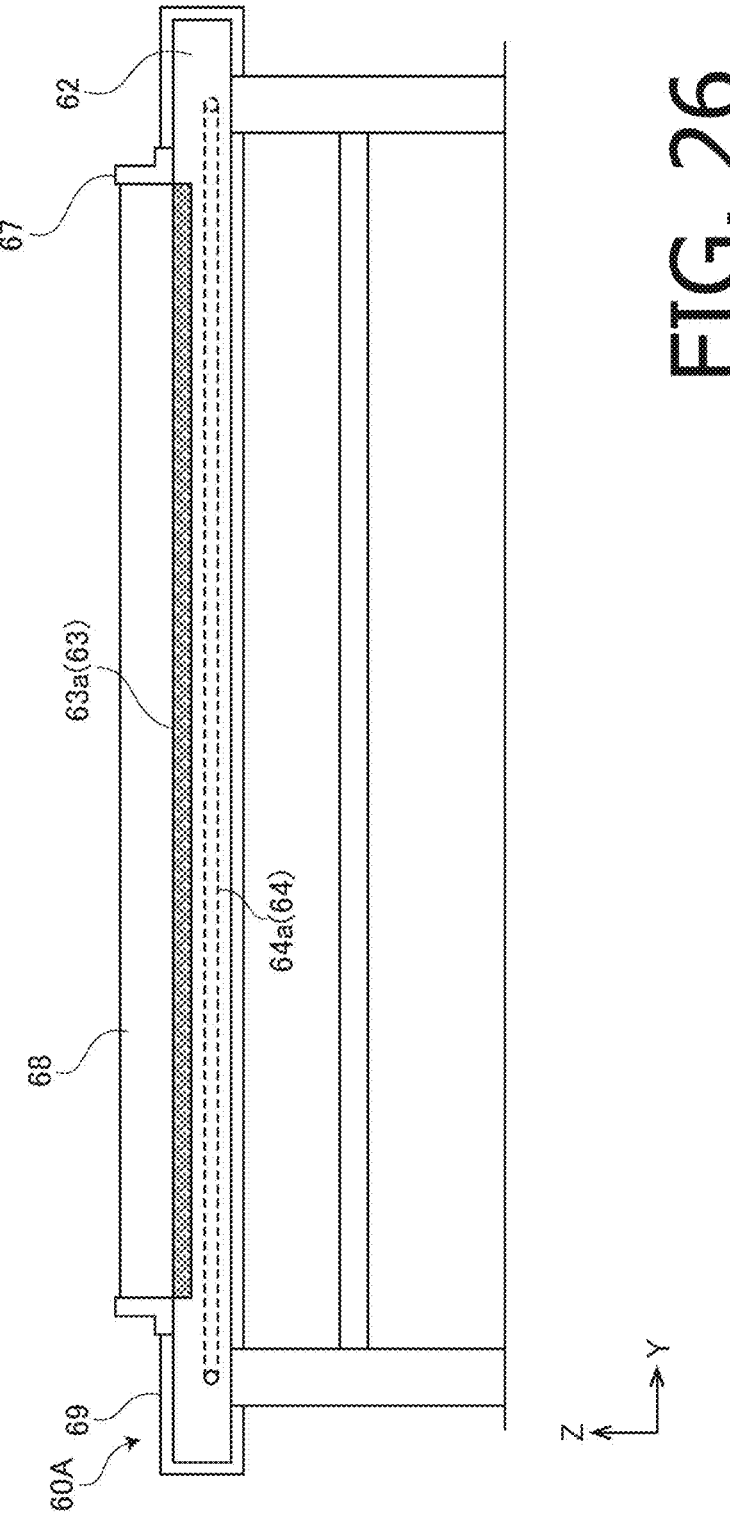
FIG. 26 is a transverse cross-sectional view of a variation of the road surface part.

A variation of the road surface part 60 will now be described. FIG. 26 is a transverse cross-sectional view of a road surface part 60A which is a variation of the road surface part 60. The road surface part 60A includes a frame part 67 attached to the base 62. The frame part 67 is bonded to the base 62 to be watertight by caulking or the like and forms a basin 68 together with the base 62 and the pavement part 63. Foreign matter (e.g., water, gravel, dirt, fallen leaves or the like) having influence on performance of a tire is put in the basin 68 to cover the road surface 63*a*. By using the basin 68, it becomes possible to thickly deposit foreign matter on the road surface 63*a*. The frame part 67 of this variation is attached on an upper surface of the base 62, but the frame part 67 may be attached on side faces of the base 62. The frame part 67 may also be attached on an upper surface of the pavement part 63.

The road surface part 60A includes a temperature adjusting system 64 configured to adjust temperature of the road surface 63*a*. The temperature adjusting system 64 of the present variation has a flow channel 64*a* embedded in the base 62, a temperature sensor 64*b* configured to detect temperature of the road surface 63*a*, and a temperature adjuster 64*c* (FIG. 38). The temperature sensor 64*b* is, for example, a contact type temperature sensor which uses a thermocouple, a thermistor or the like or a non-contact type temperature sensor such as an infrared sensor. The temperature adjuster 64*c* is connected to the controller 72 and adjusts the temperature of the road surface 63*a* to a set temperature based on a command from the controller 72. Specifically, the temperature adjuster 64*c* adjusts temperature of heat carrier (e.g., oil or water containing antifreeze liquid) based on detection result by the temperature sensor 64*b* and transmits the heat carrier to the flow channel 64*a*. It is possible to adjust the temperature of the road surface 63*a* to a predetermined temperature by causing the heat carrier of which temperature is adjusted by the temperature adjuster 64*c* to flow through the flow channel 64*a*. An outer surface of the base 62 is coated with heat insulating material 69 to stabilize the temperature of the road surface 63*a* and to improve heat use efficiency.

The temperature adjusting system 64 can adjust the temperature of the road surface 63*a* in a wide range from a low temperature (e.g., −40 degrees Celsius) up to a high temperature (e.g., 80 degrees Celsius). It is possible to form a frozen road surface by filling the basin 68 with water and setting the set temperature of the road surface 63*a* to below zero. That is, it is possible to perform ice braking test by using the road surface part 60A of the present variation. It is also possible to perform snow braking test in a state where the basin 68 is filled with snow.

The flow channel 64*a* is formed to meander at constant intervals within the base 62 in parallel with the road surface 63*a*. The base 62 is segmented into a plurality of sections (the base units 620) in its extending direction and respective flow channels 64*a* are formed to respective sections. By this configuration, it becomes possible to adjust the temperature of the entire road surface 63*a* more evenly.

Next, a load detecting part 165 will be described. The load detecting part 165 is a component configured to detect distribution of load acting on a tire tread surface.

Figure 27:
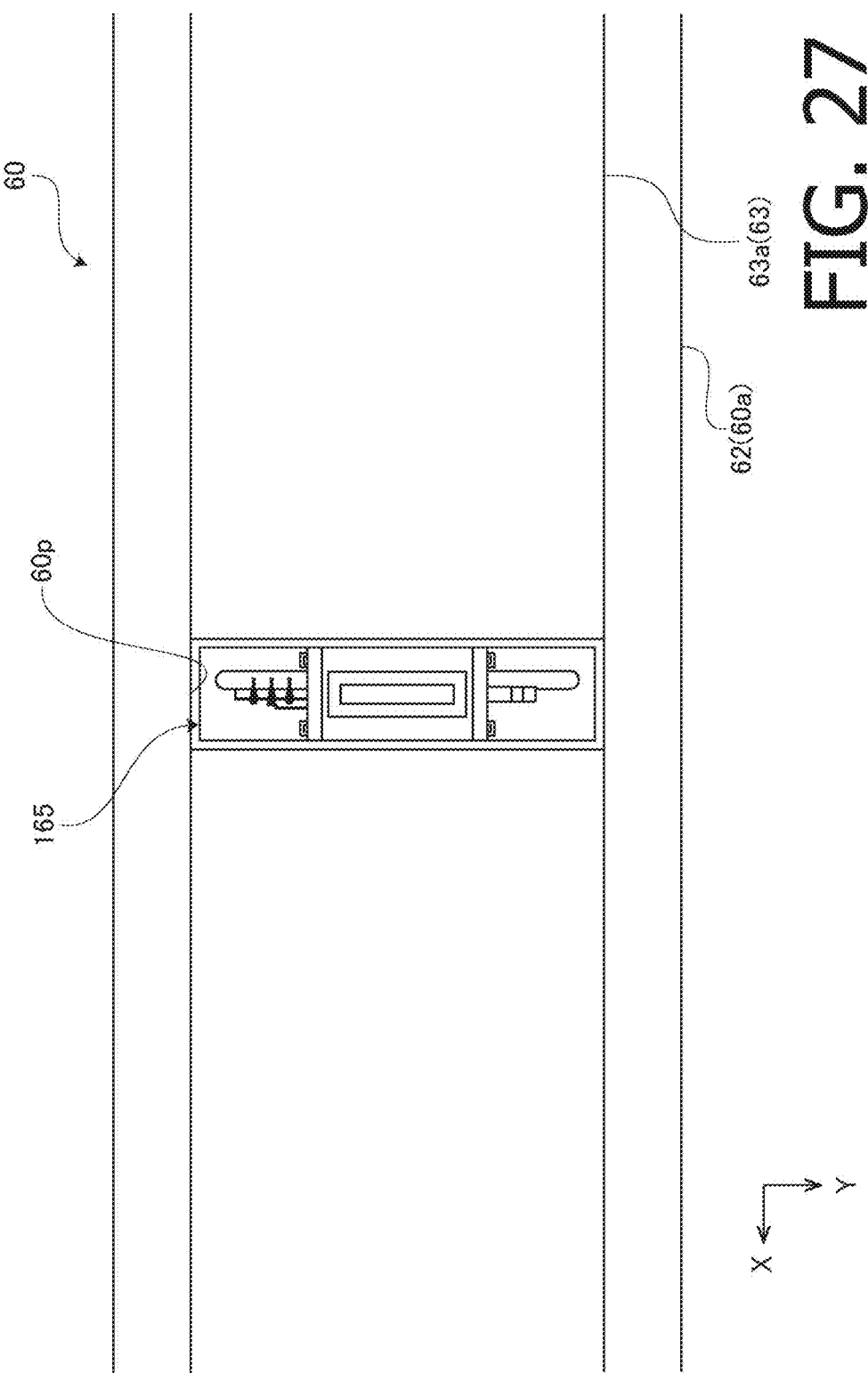
FIG. 27 is a plan view of the road surface part in the vicinity of a load detecting part.
Figure 28:
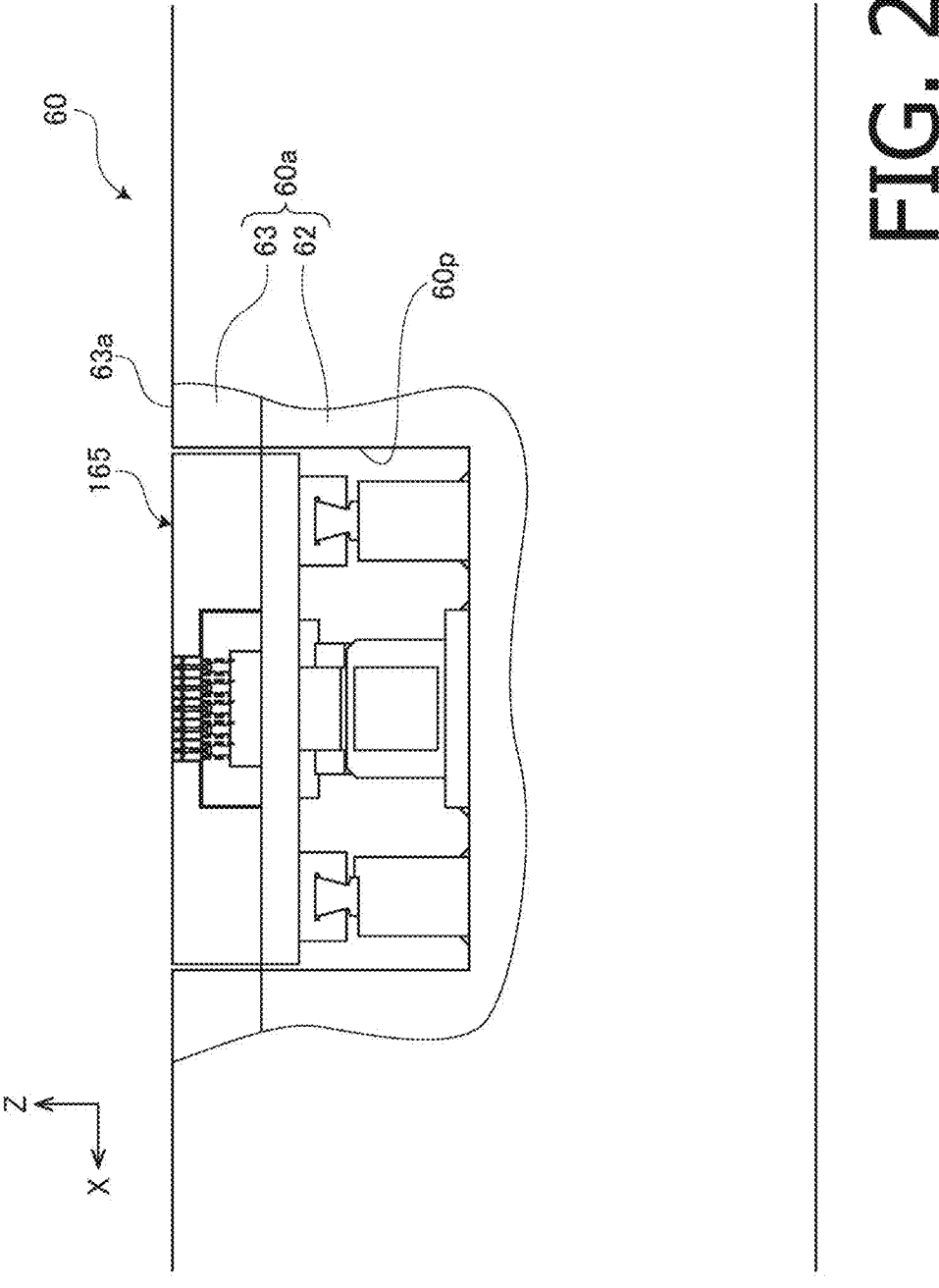
FIG. 28 is a side view of the road surface part in the vicinity of the load detecting part.
Figure 29:
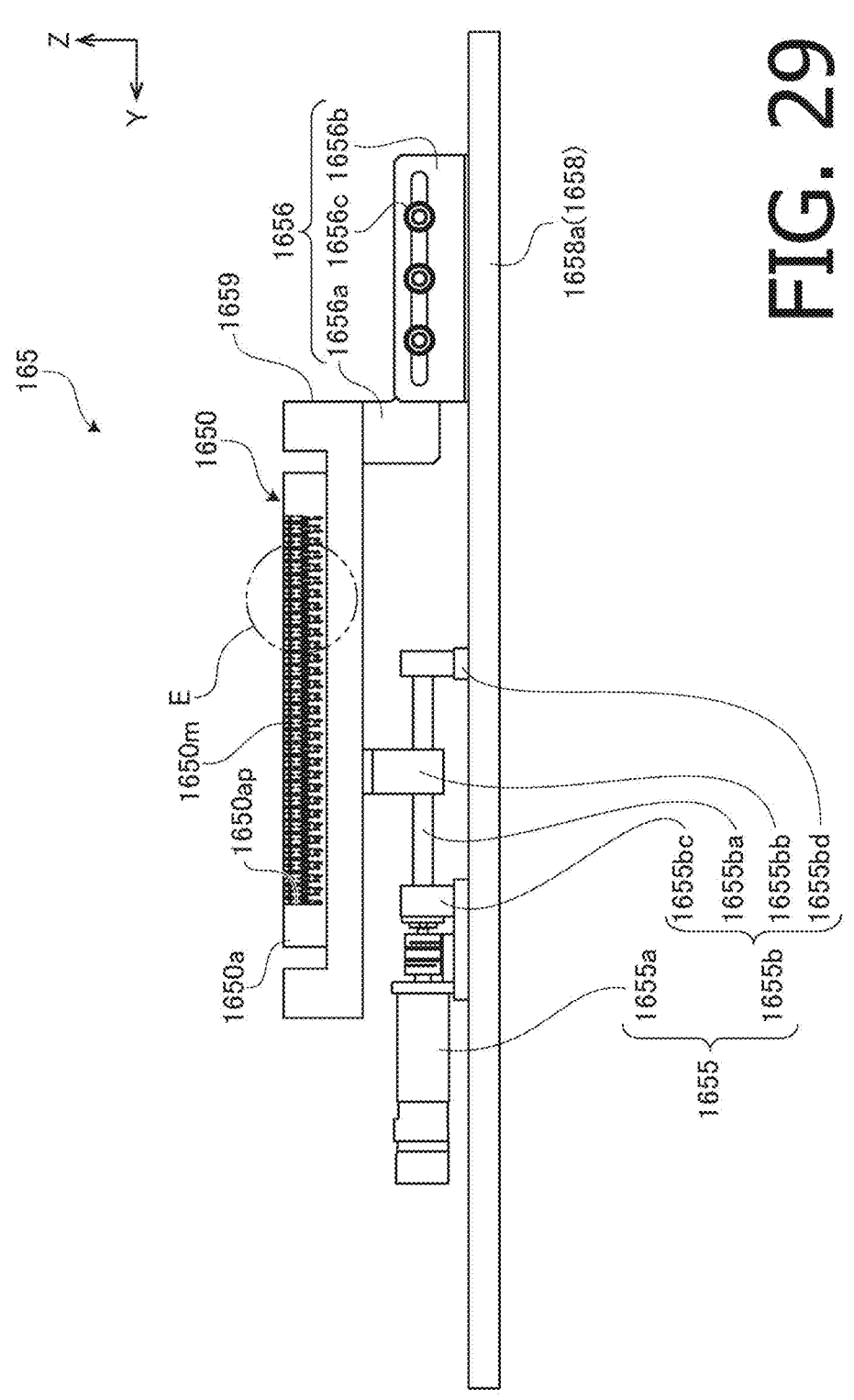
FIG. 29 is a front view of the load detecting part.
Figure 30:
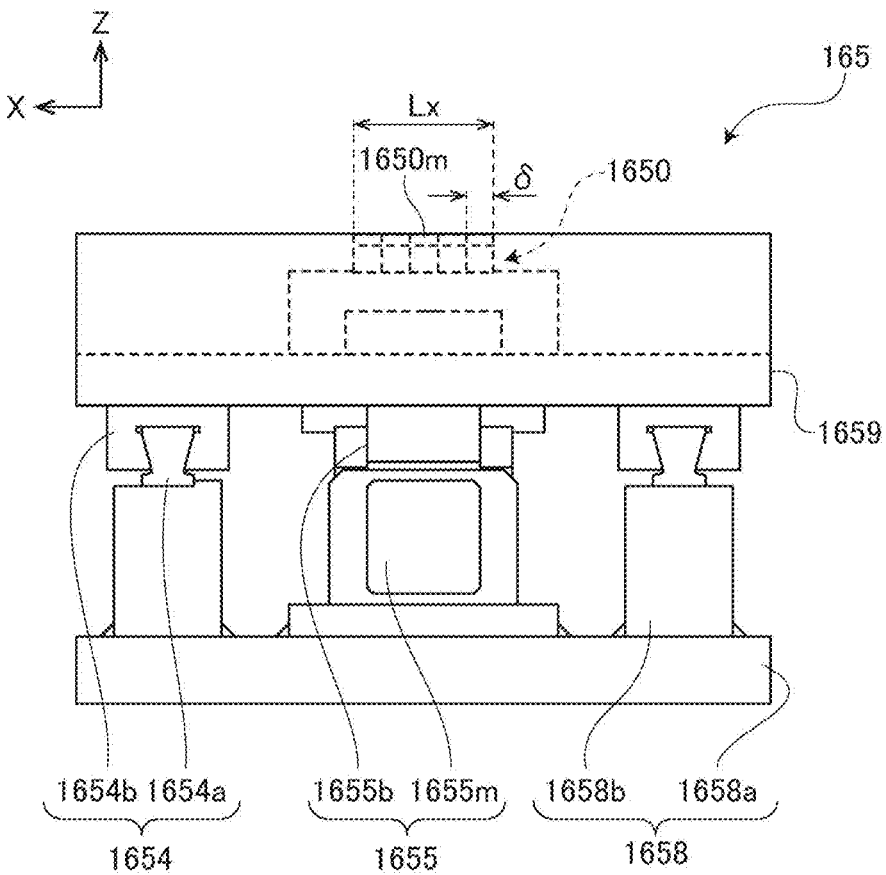
FIG. 30 is a side view of the load detecting part.
Figure 31:
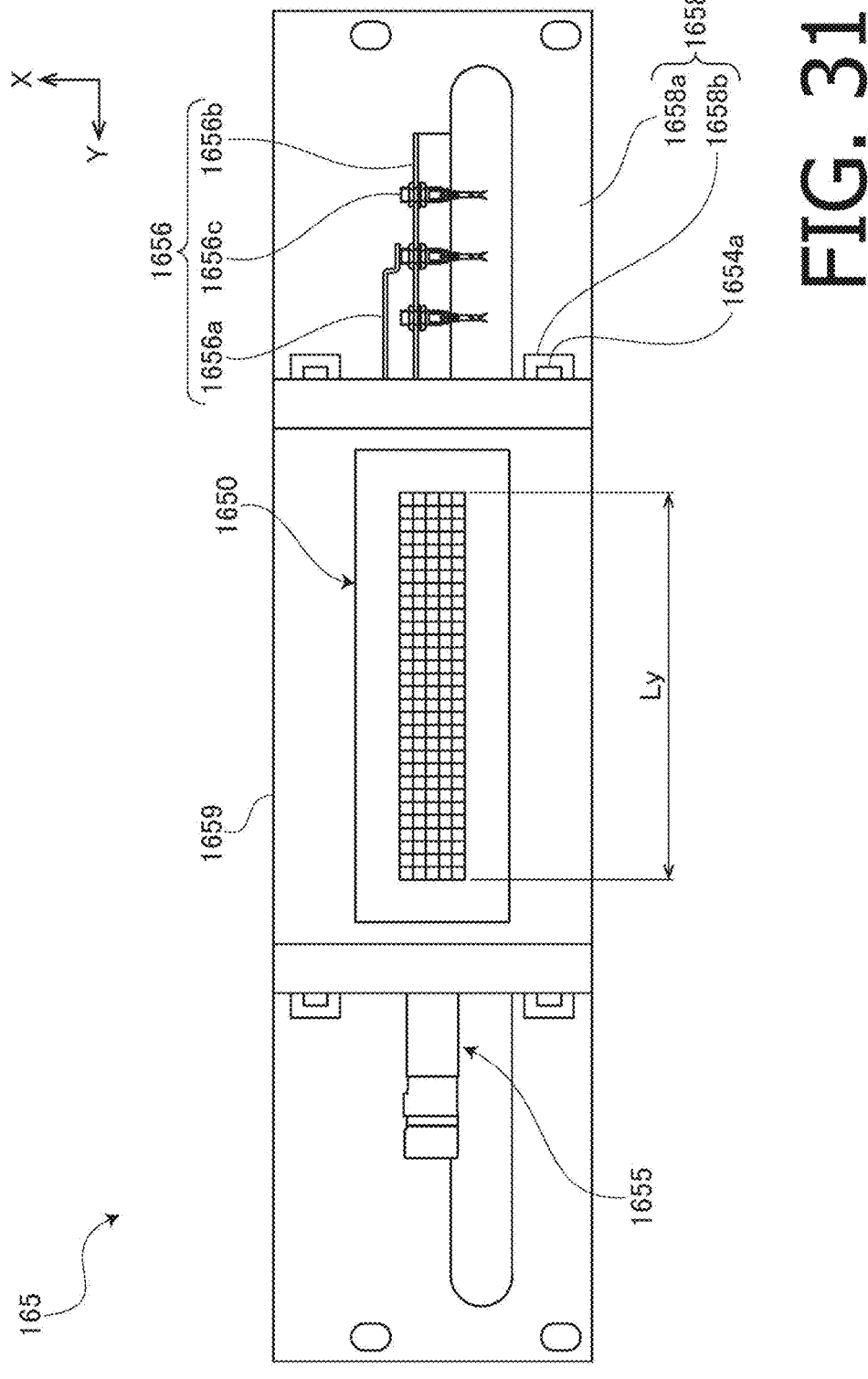
FIG. 31 is a plan view of the load detecting part.

FIGS. 27 and 28 are a plan view and a right side view of and around the load detecting part 165 of the road surface part 60, respectively. FIGS. 29 to 31 are a front view, a right side view and a plan view of the load detecting part 165, respectively.

As shown in FIGS. 27 and 28, on an upper surface of the main body part 60*a* of the road surface part 60, a recessed part 60*p* elongated in the Y axis direction is formed. The load detecting part 165 is accommodated inside the recessed part 60*p* and is fixed to the bottom of the recessed part 60*p*.

As shown in FIGS. 29 to 31, the load detecting part 165 includes a fixed frame 1658, a movable frame 1659, a pair of linear guides 1654, a sensor array unit 1650, a mover 1655, and a sensor position detecting part 1656. In FIG. 29, the linear guides 1654 and rail supporting parts 1658*b* of the fixed frame 1658 which will be described later are omitted. The movable frame 1659 is supported by the pair of linear guides 1654 to be movable in the Y axis direction (i.e., in a widthwise direction of the road surface part 60). The sensor array unit 1650 is attached on an upper surface of the movable frame 1659. Details of the sensor array unit 1650 will be described later.

Figure 32:
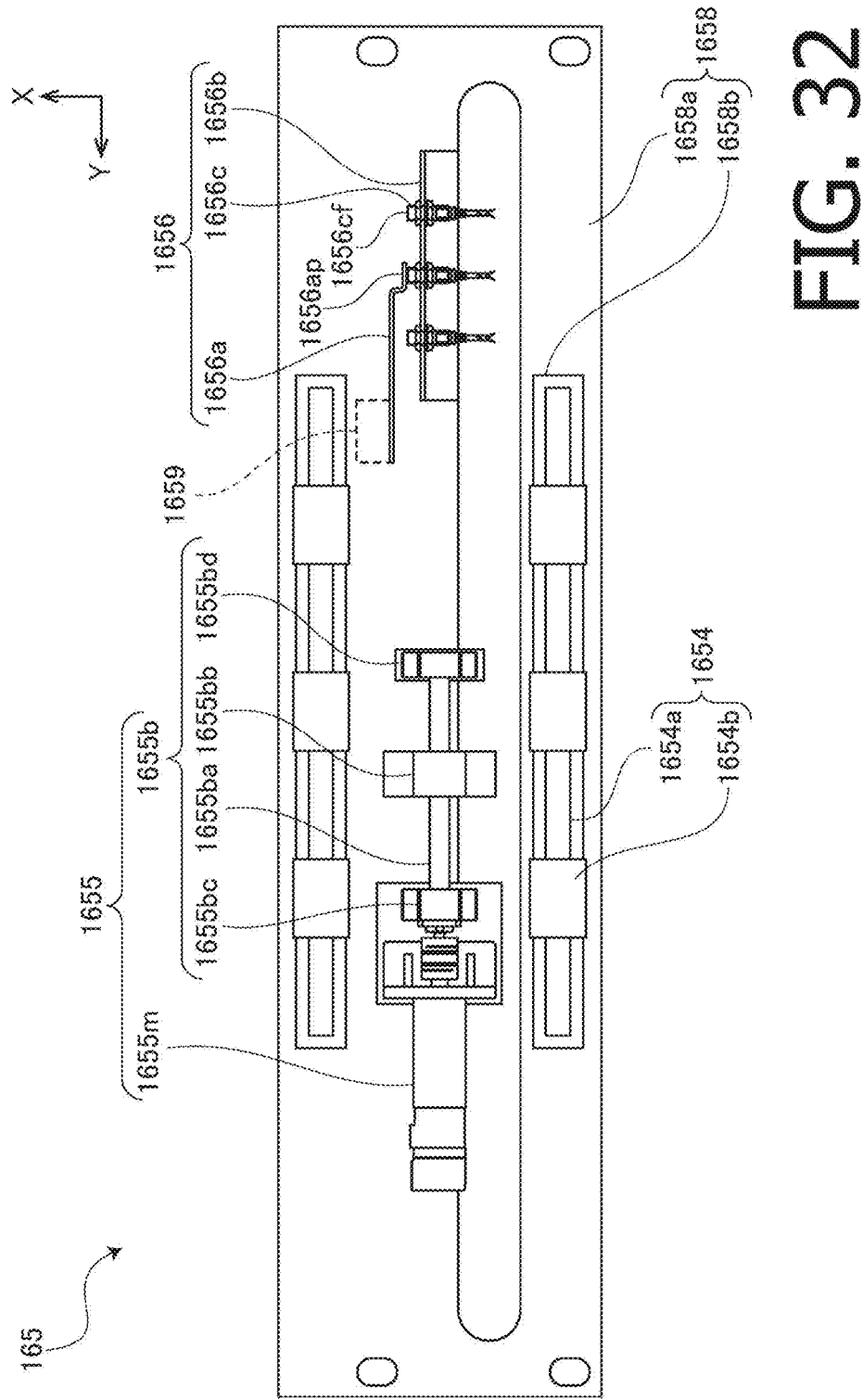
FIG. 32 is a plan view showing a state in which a movable part of the load detecting part is removed.

FIG. 32 is a plan view showing the load detecting part 165 in a state where the movable part (i.e., the movable frame 1659 and the sensor array unit 1650) is removed.

As shown in FIGS. 30 and 32, the fixed frame 1658 includes a substantially rectangular base plate 1658*a*, and a pair of rail supporting parts 1658*b* fixed on an upper surface of the base plate 1658*a*. The pair of rail supporting parts 1658*b* are arranged in the X axis direction with an interval therebetween while orienting their lengthwise directions in the Y axis direction.

The linear guide 1654 includes a rail 1654*a* extending in the Y axis direction, and a plurality of (in the present embodiment, three) carriages 1654*b* (hereinafter referred to as "runners 1654*b*") configured to travel on the rail 1654*a*. The rail 1654*a* is attached on an upper surface of the rail supporting part 1658*b*. The runners 1654*b* are attached on a lower surface of the movable frame 1659. The movement of the movable frame 1659 in the Y axis direction is guided by the linear guides 1654.

The mover 1655 is arranged between the pair of rail supporting parts 1658*b* and the linear guides 1654. The mover 1655 includes a motor 1655*m* and a ball screw 1655*b*. The ball screw 1655*b* includes a screw shaft 1655*ba*, a nut 165*bb*, a bearing part 1655*bc*, and a bearing part 1655*bd*. Although the motor 1655*m* in the present embodiment is a servo motor, other types of motor capable of controlling an operating amount may be used as the motor 1655*m*.

The screw shaft 1655*ba* is rotatably supported by a pair of the bearing parts 1655*bc* and 1655*bd* at both ends of the screw shaft 1655*ba*. One end of the screw shaft 1655*ba* is connected to a shaft of the motor 1655*m*. The nut 1655*bb* engaging with the screw shaft 1655*ba* is attached on the lower surface of the movable frame 1659. As the screw shaft 1655*ba* is rotated by the motor 1655*m*, the movable frame 1659 and the sensor array unit 1650 moves in the Y axis direction together with the nut 1655*bb*. That is, a position of the sensor array unit 1650 in the Y axis direction can be changed by rotationally driving the motor 1655*m*.

As shown in FIG. 32, the sensor position detecting part 1656 includes a movable arm 1656*a*, a plurality of (in the present embodiment, three) proximity sensors 1656*c*, and a sensor attaching part 1656*b*. An end portion of the movable arm 1656*a* is fixed to the movable frame 1659 and the movable arm 1656*a* is movable in the Y axis direction together with the movable frame 1659. The sensor attaching part 1656*b* is attached to the fixed frame 1658.

The plurality of proximity sensors 1656c are arranged in the Y axis direction with intervals (e.g., at constant intervals) while orienting their detecting surfaces 1656cf in the X axis positive direction and are attached to the sensor attaching part 1656b.

At a tip portion of the movable arm 1656a, a proximity part 1656ap adjacent to the proximity sensors 1656c are formed. In the present embodiment, the proximity part 1656ap is formed by bending the tip portion of the movable arm 1656a in a crank shape. The proximity part 1656ap is disposed at the same height as the detecting surfaces 1656cf of the plurality of proximity sensors 1656c. The detecting surfaces 1656cf of the plurality of proximity sensors 1656c are arranged within a movable range of the proximity part 1656ap in the Y axis direction with intervals therebetween.

Figure 33:
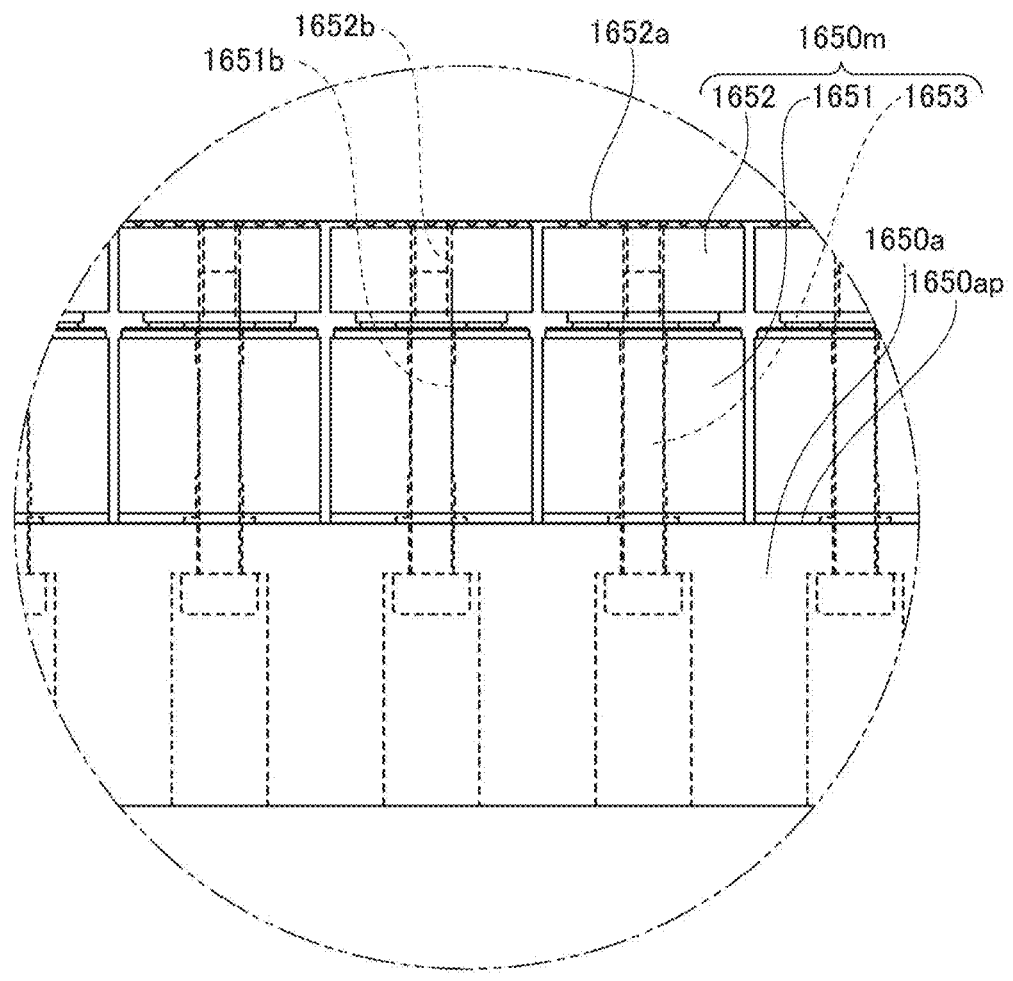
FIG. 33 is an enlarged view of an area E in FIG. 18.

FIG. 33 is an enlarged view of an area E surrounded by a chain double-dashed line in FIG. 29. As shown in FIGS. 29 and 33, the sensor array unit 1650 includes a frame 1650a and a plurality of (in the present embodiment, 150) load detecting modules 1650m. At the central part of an upper surface of the frame 1650a, a recessed part 1650ap long in the Y axis direction is formed. The plurality of load detecting modules 1650m are accommodated in the recessed part 1650ap and are fixed to the bottom of the recessed part 1650ap.

The plurality of load detecting modules 1650m are arranged in the X axis direction and the Y axis direction at lattice points at constant intervals (e.g., with substantially no gap therebetween). In the present embodiment, 150 load detecting modules 1650m are arranged in 5 rows in the X axis direction and 30 rows in the Y axis direction.

The load detecting module 1650m includes a three force components sensor 1651, a pavement part 1652, and a bolt 1653. The three force components sensor 1651 is a cylindrical piezoelectric element whose central axis is oriented in the Z axis direction. The pavement part 1652 is a cuboidal member whose lengths in the X axis direction and in the Y axis direction are the same and formed of, for example, a simulated pavement material or pavement material that is the same as the pavement part 63. It should be noted that the shapes of the three force components sensor 1651 and the pavement part 1652 are not limited to these shapes. For example, the shape of the three force components sensor 1651 may be cuboidal and the shape of the pavement part 1652 may be cylindrical.

At the center of the cylindrical three force components sensor 1651, a hole 1651b penetrating in the Z axis direction is formed. At the center of the pavement part 1652, a bolt hole 1652b extending in the Z axis direction is formed. The load detecting module 1650m is integrated and fixed to the frame 1650a by the bolt 1653 inserted through the hole 1651b of the three force components sensor 1651 and screwed in the bolt hole 1652b of the pavement part 1652. Upper surfaces of the pavement parts 1652 are disposed horizontally at the same height to form a road surface 1652a. An area in the X axis direction and the Y axis direction where the load detecting modules 1650m are arranged is a detecting area of the sensor array unit 1650. A width (i.e., a length in the Y axis direction) Ly (FIG. 31) of the detection area of the sensor array unit 1650 is sufficiently wider than a tread width of the test tire T so that the entire tire tread width of the test tire T can contact the road surface 1652a.

Temporal changes of the following three forces $f_R$, $f_T$ and $f_L$ that act on the road surface 1652a of each load detecting module 1650m (i.e., on the tire tread) are detected by the three force components sensor 651.

a) radial force $f_R$ b) tangential force $f_T$ c) lateral force $f_L$

It is possible to detect distribution and temporal change of force that the road surface receives from the tire tread of the test tire T (i.e., force that acts on the tire tread) by using the load detecting part 165.

FIG. 38 is a block diagram showing a schematic configuration of a control system 1a of the tire testing device 1. The control system 1a includes a controller 72 configured to control operation of the entire device, a measuring part 74 configured to perform various measurements, and an interface 76 configured for input from and output to outside.

To the controller 72, the motors 141 of respective drive parts 14, the motor 32 of the torque applying device 30, the motor 431 of the load adjusting part 42, the motor 451 of the camber adjusting part, the motor 471 of the slip angle adjusting part 46, and the motor 1655m of the mover 1655 are connected via drivers 141a, 32a, 431a, 451a, 471a, and 1655a, respectively. The temperature adjuster 64c is also connected to the controller 72.

The controller 72 and respective drivers 141a, 32a, 431a, 451a and 471a are communicably connected to each other with optical fibers and it is made possible to perform high-speed feedback control between the controller 72 and respective servo amplifiers. It is thereby made possible to perform synchronized control with high precision (with high resolution and high accuracy in the time axis).

The six force components sensor 54 of the spindle part 50, the three force components sensors 1651 of the load detecting part 165, and the proximity sensors 1656c of the sensor position detecting part 1656 are connected to the measuring part 74 via amplifiers 54a, 1651a, and 1656ca, respectively. Signals from the six force components sensor 54, the three force components sensors 1651, and the proximity sensors 1656c are amplified by the amplifiers 54a, 1651a, and 1656ca, respectively, and then converted into digital signals in the measuring part 74, thereby generating measurement data. The measurement data is input to the controller 72. In FIG. 38, only one of the three force components sensors 1651, only one of the amplifiers 1651a, only one of the proximity sensors 1656c, and only one of the amplifiers 1656ca are shown.

Pieces of phase information detected by built-in rotary encoders RE of respective motors 141, 32, 431, 451, 471 and 1655m are input to the controller 72 via respective drivers 141a, 32a, 451a, 471a and 1655a.

The interface 76 includes, for example, one or more of a user interface for input by and output to a user, a network interface for connection to various types of network such as a LAN (Local Area Network), and various types of communication interfaces such as a USB (Universal Serial Bus) and a GPIB (General Purpose Interface Bus) for connection to external devices. The user interface includes, for example, one or more of various types of operation switches, indicators, various types of display devices such as an LCD (Liquid Crystal Display), various types of pointing devices such as a mouse and a touch panel, and various types of input/output devices such as a touch screen, a video camera, a printer, a scanner, a buzzer, a speaker, a microphone and a memory card reader/writer.

The controller 72 can cause the carriage 20 to travel in a predetermined speed by synchronously controlling driving of the motors 141 of respective drive parts 14 based on speed setting data that is input through the interface 76. In the present embodiment, all the four drive parts 14 are driven in the same phase (To be more exact, the drive parts 14LA and 14LB on the left and the drive parts 14RA and 14RB on the right are driven in opposite phases [in opposite rotating directions].).

The controller 72 can apply a predetermined longitudinal force to the test tire T by controlling driving of the motor 32 of the torque applying device 30 based on setting data of the longitudinal force (braking force or driving force) to be applied to the test tire T obtained through the interface 76. The controller 72 can also apply a predetermined torque to the test wheel W by controlling the torque applying device 30 based on setting data (or acceleration setting data) in place of the longitudinal force setting data.

The controller 72 can execute the control of the drive part 14 for causing the carriage 20 to travel in a predetermined traveling speed (and, at the same time, causing the test tire T to rotate in a peripheral speed that is substantially the same as the traveling speed) and the control of the torque applying device 30 for applying the longitudinal force (or the torque) to the test tire T synchronously based on a synchronizing signal.

Aside from basic waveforms such as sine wave, half sine wave, sawtooth wave, triangle wave and trapezoid wave, longitudinal force (or torque) waveforms that are measured in on-road tests, longitudinal force (or torque) waveforms that are obtained through simulated calculations, or other arbitrary synthesized waveforms (e.g., waveforms that are generated by a function generator or the like) can be used as waveforms of the torque to be generated by the torque applying device 30.

Similarly, with regard to the control of the traveling speed of the carriage 20 (or the rotating speed of the test wheel W), aside from the basic waveforms, waveforms of rotating speeds of wheels that are measured in on-road tests, waveforms of change of speed that are obtained through simulated calculations, or other arbitrary synthesized waveforms (e.g., waveforms that are generated by a function generator or the like) can be used.

Next, a procedure for changing the position of the sensor array unit 1650 in the Y axis direction with the mover 1655 will be described. In an initial state shown in FIG. 32, the sensor array unit 1650 is disposed at a position where the proximity part 1656ap of the movable arm 1656a opposes the detecting surface 1656cf of the proximity sensor 1656c positioned at the center. As an instruction to move the sensor array unit 1650 to the left (in the Y axis positive direction) is provided through, for example, a user operation on a touch screen, the controller 72 transmits a command for an anti-clockwise rotation to the driver 1655a to move the sensor array unit 1650 in the Y axis direction. The driver 1655a which received the command for the anti-clockwise rotation supplies driving current that causes the motor 1655m to rotate in the anti-clockwise direction. As the motor 1655m is driven in the anti-clockwise direction by the drive current, the screw shaft 1655ba rotates in the anti-clockwise direction together with the shaft of the motor 1655m, and the sensor array unit 1650 moves in the Y axis direction together with the nut 1655bb and the movable frame 1659.

As the sensor array unit 1650 moves in the Y axis direction, the proximity part 1656ap of the movable arm 1656a moves away from the detecting surface 16556cf of the proximity sensor 1656c at the center and the proximity sensor 1656c at the center becomes less responsive to proximation. In time, the proximity part 1656ap of the movable arm 1656a reaches a position opposing the detecting surface 1656cf of the proximity sensor 1656c on the left (on the Y axis positive direction side). At this time, the proximity sensor 1656c on the left detects proximation and outputs a proximation signal indicating detection of proximation. The measuring part 74 which received the proximation signal through the amplifier 1656ca notifies the controller 72 that the sensor array unit 1650 reached a fixed position on the left. The controller 72 which received the notification from the measuring part 74 transmits a command to stop driving to the driver 1655a. The driver 1655a which received the command to stop driving stops supplying driving current to the motor 1655m. The rotations of the shaft of the motor 1655m and the screw shaft 1655ba thereby stop and the nut 1655bb and the sensor array unit 1650 also stop, and the displacement of the sensor array unit 1650 completes.

By providing the mover 1655, it becomes possible to shorten the length Ly (FIG. 31) of the detecting area of the sensor array unit 1650 in the Y axis direction to reduce the number of load detecting modules 1650m necessary to measure the load distribution, and thus it becomes possible to reduce cost necessary to manufacture and maintain the sensor array unit 1650.

Figure 34:
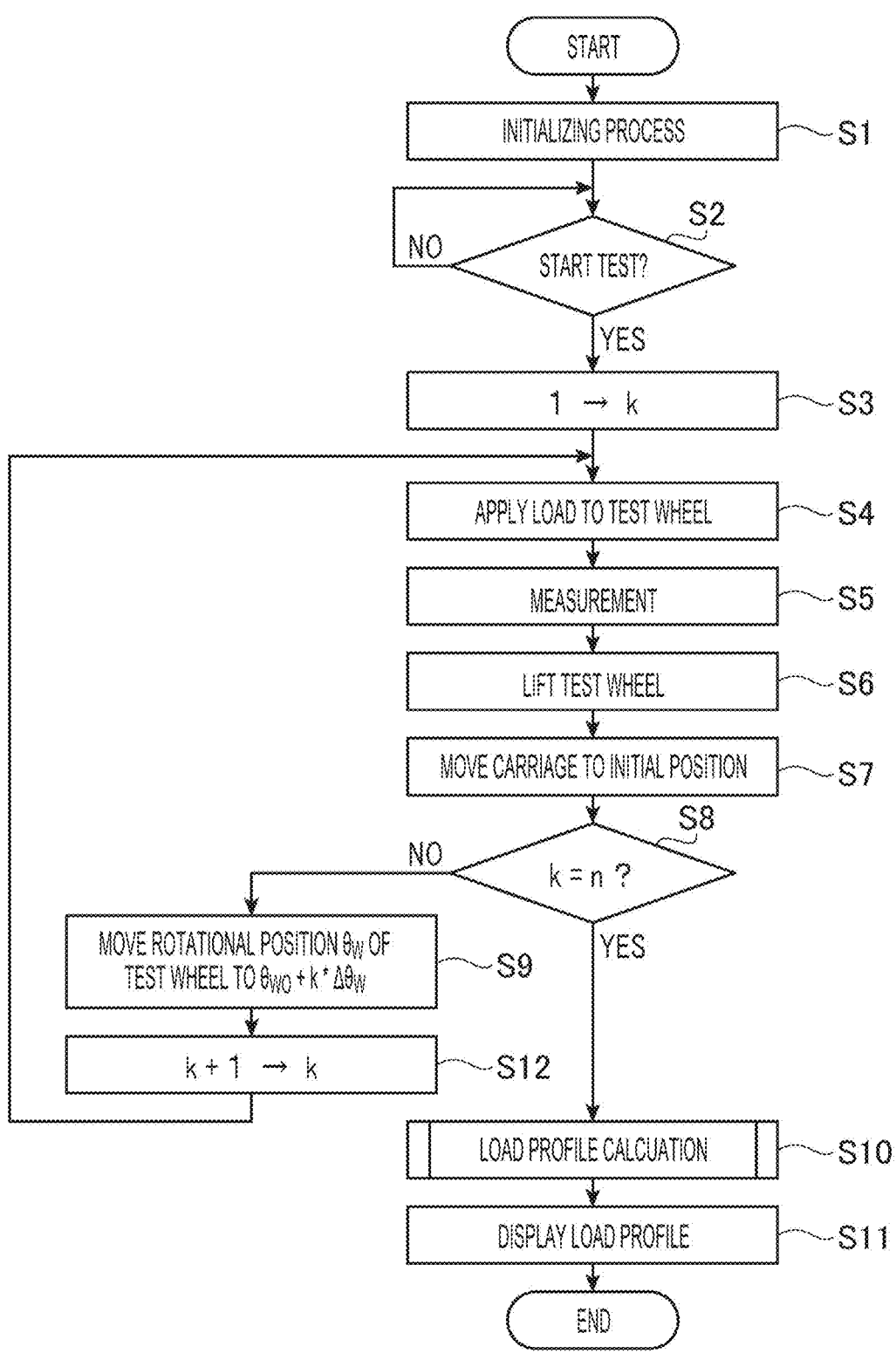
FIG. 34 is a flowchart showing a procedure for obtaining distribution of load acting on a tire tread.

Next, a method for obtaining distribution of load acting on the tire tread by using the load detecting part 165 will be described. FIG. 34 is a flowchart showing a procedure of the method for obtaining distribution of load acting on the tire tread.

As the power of the tire testing device 1 is switched on, the controller 72 firstly execute an initializing process S1. As shown in FIG. 1, in an initial state, the carriage 20 is positioned at an initial position (an initial traveling position) $P_{X0}$ being set at a position near an end of its movable range in the X axis minus direction. The elevating frame 421 (FIG. 19) is positioned at an initial position $P_{Z0}$ being set for example at a position near an upper end of its movable range. At the initial position $P_{Z0}$, the test wheel W is lifted off the road surface 63a and it is possible to attach and detach the test wheel W and to adjust alignment of the test wheel W. The camber and the slip angle are also adjusted to set values by the camber adjusting part 44 and the slip angle adjusting part 46, respectively.

In the state where the test wheel W is lifted off the road surface 63a, the motor 32 of the torque applying device 30 is driven and a rotational position $\theta_W$ of the test wheel W is moved to an initial rotational position $\theta_{W0}$ to complete the initializing process S1. A rotational position $\theta_H$ of the torque applying device 30 (i.e., the rotating frame 31) is dependent on a traveling position $P_X$ of the carriage 20. In the initial state, the torque applying device 30 is always positioned at an initial rotational position $\theta_{H0}$.

After completion of the initializing process S1, as an instruction to start the test is provided through, for example, a user operation on a touch screen (S2: YES), the number of measurement sets k being a counter is reset to 1 (S3). Then, the test wheel W is made to descend and contact the road surface 63a and a set load is applied to the test wheel W by the load adjusting part 42 (S4).

Then, the first measurement set S5 is executed. In the measurement set S5, the motors 141 of respective drive parts 14 are driven, and the carriage 20 travels at a set traveling speed and the test wheel W rotates at a peripheral speed that is substantially the same as the traveling speed of the carriage 20. The motor 32 of the torque applying device 30 is also driven and a set torque is applied to the test wheel W.

In the measurement set S5, forces acting on the road surface 1652a and the test wheel W are detected by the three force components sensor 1651 of the load detecting part 165 and the six force components sensor 54 of the spindle part 50, respectively, at predetermined time intervals (e.g., at 5 msec intervals). The time intervals of the detections by the three force components sensor 1651 and the six force components sensor 54 are appropriately set in accordance with test conditions (e.g., the traveling speed of the carriage 20 and required test accuracy).

In the measurement set S5, the traveling position $P_X$ of the carriage 20 and the rotational position $\theta_W$ of the test wheel W are calculated at predetermined time intervals (e.g., at time intervals that is the same as those of detections by the three force components sensor 1651). The traveling position $P_X$ of the carriage 20 is calculated from detection results by the built-in rotary encoders RE (FIG. 38) of the motors 141 of the drive parts 14, reduction ratios of the belt mechanisms 142 and pitch diameters of the drive pulleys 152 of the belt mechanisms 15. In the description of the present embodiment, the traveling position $P_X$ of the carriage 20 is defined as a position of the rotation axis Ay of the test wheel W in the traveling direction of the carriage 20 (in the X axis direction).

The rotational position $\theta_W$ of the test wheel W is calculated based on detection results by the rotary encoder 38 of the torque applying device 30 and the built-in rotary encoder RE of the motor 32. Specifically, the rotational position $\theta_W$ of the test wheel W is calculated by adding the product of the rotational position $\theta_M$ of the shaft 321 of the motor 32 detected by the rotary encoder RE of the motor 32 (the initial rotational position $\theta_{M0}$ in the initial state being 0 [rad]) and a reduction ratio of the reducer 33 (i.e., a rotational position $\theta_S$ of the shaft 34 with respect to the rotating frame 31) to a rotational position $\theta_H$ of the rotating frame 31 of the torque applying device 30 detected by the rotary encoder 38.

It should be noted that a detector such as a rotary encoder for detecting a rotational position $\theta_T$ of an output from the torque applying device 30 (e.g., a rotational position of the spindle 52 and the transmission shafts 261, 266) may be provided to detect the rotational position $\theta_W$ of the test wheel W directly with the detector.

The detection results by the three force components sensor 1651 and the six force components sensor 54 are associated with the detection results by the built-in rotary encoders RE of the motors 141 of the drive parts 14 (i.e., the traveling position $P_X$ of the carriage 20) and the detection result of the rotational position $\theta_W$ of the test wheel W that are detected at the same timing and are stored in a storage 721 of the controller 72 (or in a storage that the controller 72 can access such as the server 77 connected to the controller 72 via for example a LAN). Regarding the detection result by the three force components sensor 1651, only the result within a time period in which the test wheel W passes over the sensor array unit 1650 and the results within predetermined time periods before and after the aforementioned time period may be stored. With this configuration, it is possible to reduce an amount of data to be stored.

As the carriage 20 reaches a dead end of a traveling zone and stops, the test wheel W is lifted by the load adjusting part 42 to a height at which the test wheel W is lifted off the road surface 63a (e.g., the same height as the initial state) (S6). Then, the drive parts 14 are driven and the carriage 20 moves to the initial position $P_{X0}$ (S7).

The above-described processes S4 to S9 are repeated until the number of measurement sets k reaches a preset number n (S8). If the number of measurement sets k has not yet reached the preset number n (S8: NO), the motor 32 of the torque applying device 30 is driven to move the rotational position $\theta_W$ of the test wheel W to a rotational position $\theta_{W0}+k*\Delta\theta_W$ (S9), and the counter k is incremented (S12). That is, the rotational position $\theta_W$ of the test wheel W at the initial position $P_{X0}$ is changed by an angular width $\Delta\theta_W$ each time the number of measurement sets k increases by one.

The angular width $\Delta\theta_W$ is, for example, set to a value that is equal to or less than a central angle $\theta_{C1}$ of the test wheel W corresponding to a length Lx (FIG. 30) of the detecting area of the sensor array unit 1650 in the X axis direction (i.e., a rotation angle $\theta_{C1}$ of the test wheel W when the test wheel W rolls for a distance Lx). For example, the angular width $\Delta\theta_W$ is set to a value that is the same as or slightly smaller than a central angle $\theta_{C2}$ of the test wheel W corresponding to an arrangement interval $\delta$ (FIG. 30) of the load detecting modules 1650m.

Also, the angular width $\Delta\theta_W$ may for example be set to a value obtained by dividing $2\pi$ by the preset number n. In this case, the entire circumference of the test wheel W is measured without gap by the n measurement sets.

After completion of the preset n measurement sets (S8: YES), a load profile calculation S10 is executed.

Figure 35:
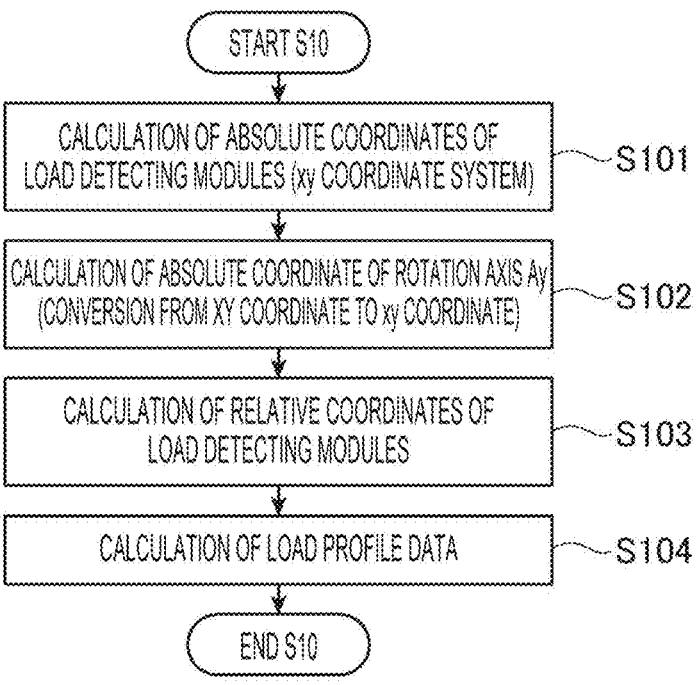
FIG. 35 is a flowchart showing a procedure for a load profile calculation.

FIG. 35 is a flowchart showing a procedure for the load profile calculation S10. The load profile calculation S10 is a process for calculating the load profile data based on measurement results obtained by the n measurement sets S5.

The load profile data is data in which values of three types of forces acting on a tire (i.e., the radial force $f_R$, the tangential force $f_T$ and the lateral force $f_L$) are associated with plane coordinates on the road surface.

In the load profile calculation S10, firstly, calculation of coordinates of respective load detecting modules 1650m (S101) is executed. In the present embodiment, a coordinate of a point at the center of the upper surface of the load detecting module 1650m is defined as the coordinate of the load detecting module 1650m.

Figure 36:
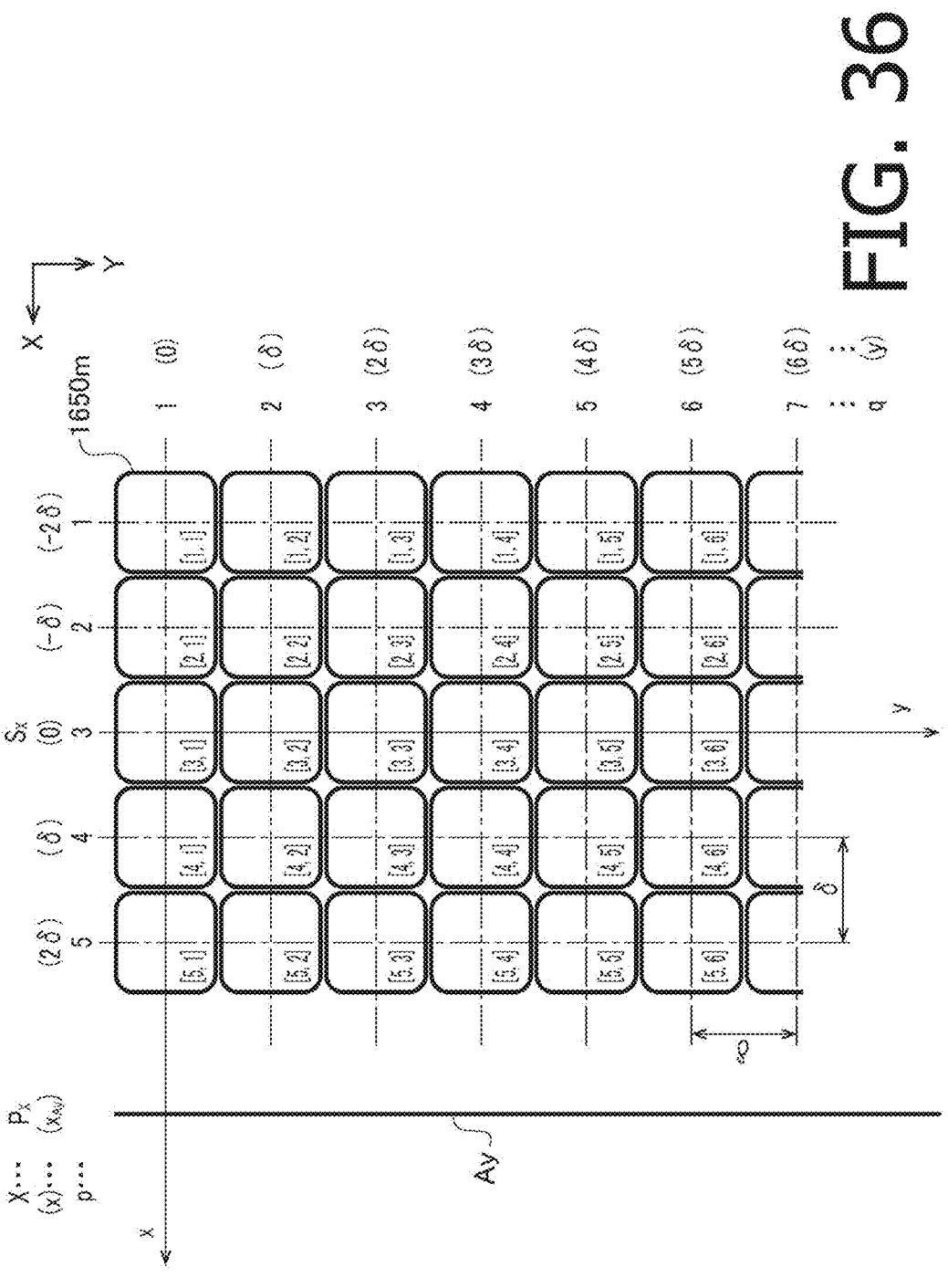
FIG. 36 is a plan view showing a positional relationship between load detecting modules and a rotation axis of a test wheel in the third variation.

FIG. 36 is a diagram showing positional relationship between the load detecting modules 1650m and the rotation axis Ay of the test wheel W. As described above, in the present embodiment, 150 load detecting modules are arranged in 5 rows in the X axis direction and 30 rows in the Y axis direction. In the following description, the number of row of the load detecting module 1650m in the X axis direction will be represented by p, the number of row of the load detecting module 1650m in the Y axis direction will be represented by q, and a position of the load detecting module 1650m will be expressed by a pair of positive integer [p, q] (hereinafter referred to as an address [p, q]).

In the load profile calculation S10, an (x, y) coordinate system is used. The (x, y) coordinate system is a two-dimensional orthogonal coordinate system parallel to an (X, Y) coordinate system, the origin of the (x, y) coordinate system being the center of the upper surface of the load detecting module 1650m positioned at the address [3, 1]. That is, the xy plane is a plane on which the road surfaces 63a and 1652a of the road surface part 60 are disposed. In the present embodiment, the origin of the (x, y) coordinate system (i.e., a position of the load detecting module 1650m of address [3,1]) is defined as a position of the sensor array unit 1650. In the following description, a coordinate whose origin is a fixed point is referred to as an absolute coordinate, and a coordinate whose origin is a movable point is referred to as a relative coordinate. In the load profile calculation S10, the absolute coordinates of respective load detecting modules 1650m are calculated.

In the present embodiment, the load detecting modules 1650m are arranged at constant intervals $\delta$ in the x axis direction and the y axis direction. Therefore, the coordinates x and y of the address [p, q] are calculated in accordance with the following formulas.

$$x=(p-3)*\delta$$

$$y=(q-1)*\delta$$

Then, an x coordinate of the rotation axis Ay of the test wheel W (hereinafter referred to as a "coordinate $x_{Ay}$") is calculated (S102). The coordinate $x_{Ay}$ is calculated in accordance with the following formula.

$$x_{Ay}=P_X-S_X$$

where $P_X$: X coordinate of the traveling position $P_X$ of the test wheel W (the rotation axis Ay)

$S_X$: X coordinate of the origin of the (x, y) coordinate system

That is, in the process S102, the coordinates of the rotation axis Ay of the test wheel W are converted from the XY coordinate system into the xy coordinate system.

Then, relative positions (relative coordinates) of the load detecting modules 1650m with respect to the traveling position $P_X$ of the test wheel W (the rotation axis Ay) are calculated (S103). Relative coordinates $(x_r, y_r)$ of the load detecting modules 1650m are calculated in accordance with the following formulas. In the present embodiment, load profile data of the relative coordinates with respect to the rotation axis Ay is obtained.

$$x_r=x-x_{Ay}$$

$$y_r=y$$

Then, pieces of load profile data of three types of forces $f_R$, $f_T$ and $f_L$ are calculated by averaging all the measurement results (i.e., the radial forces $f_R$, the tangential forces $f_T$ and the lateral forces $f_L$ measured by respective load detecting modules 1650m) for every relative coordinate $(x_r, y_r)$ (S104). In the process S104, the pieces of load profile data may be calculated as proximate curved surfaces that can be obtained by regression analysis (e.g., curved surface fitting such as the least square method).

In the process S104, the pieces of load profile data may be calculated while taking into account the rotational position $\theta_W$ of the test wheel W (i.e., for every rotational position $\theta_W$). In this case, the pieces of load profile data may be calculated while further taking into account symmetric property of a tread pattern of the test tire T about the rotation axis Ay. Specifically, the pieces of load profile data may be calculated for all the rotational positions $\theta_W$ that are same in phase of a cycle of the tread pattern in the circumferential direction.

In the present embodiment, by the n measurement sets, measurements for only one rotation of the test wheel W is performed. However, the number of measurement sets may be increased to perform measurements for a plurality of rotations. In the present embodiment, since a plurality of measurement sets are performed while changing the rotational position $\theta_W$ of the test wheel W at the initial position $P_{X0}$ by the central angle $\theta_{C2}$ of the test wheel W corresponding to the arrangement interval $\delta$ of the load detecting modules 1650m, resolution of the load profile data in the x axis direction is nearly the size of the arrangement interval $\delta$ of the load detecting modules 1650m. By repeatedly performing the measurement set while changing the rotational position $\theta_W$ by a further smaller angle (e.g., 1/10 of the central angle $\theta_{C2}$), substantial resolution in the x axis direction can be made smaller than the arrangement interval $\delta$ of the load detecting modules 1650m. For example, if the measurement sets are repeated while changing the rotational position $\theta_W$ by 1/m of the central angle $\theta_{C2}$ (m being a natural number), the substantial resolution in the x axis direction can be fined up to nearly $\delta$/m.

In the present embodiment, the length Lx (FIG. 30) of the detecting area of the sensor array unit 1650 in the X axis direction is shorter than a length of the tire tread in the X axis direction. Therefore, the load distribution cannot be obtained for the entire tire tread only by causing the test wheel W to roll over the sensor array unit 1650 once.

Therefore, in the present embodiment, a method of measuring the load distribution on the tire tread in several separate measurements while shifting the rotational position $\theta_W$ of the test wheel W at the time the test wheel W rolls on the sensor array unit 1650 is adopted. By this method, it becomes possible to shorten the length of the detecting area of the sensor array unit 1650 in the X axis direction and reduce the number of load detecting modules 1650m necessary to measure the load distribution, and thus it is possible to reduce costs necessary to manufacture and maintain the sensor array unit 1650.

By repeatedly performing the measurement set while changing a Y axis position of the sensor array unit 1650 with the mover 1655 by a predetermined interval, substantial resolution in the y axis direction can be made smaller. In this case, a motor capable of controlling position (e.g., a servo motor or a step motor) is used as the motor 1655m of the mover 1655. For example, by repeatedly performing the measurement set while changing the Y axis position of the sensor array unit 1650 by 1 mm, the substantial resolution in the y axis direction can be fined to nearly 1 mm.

Figure 37:
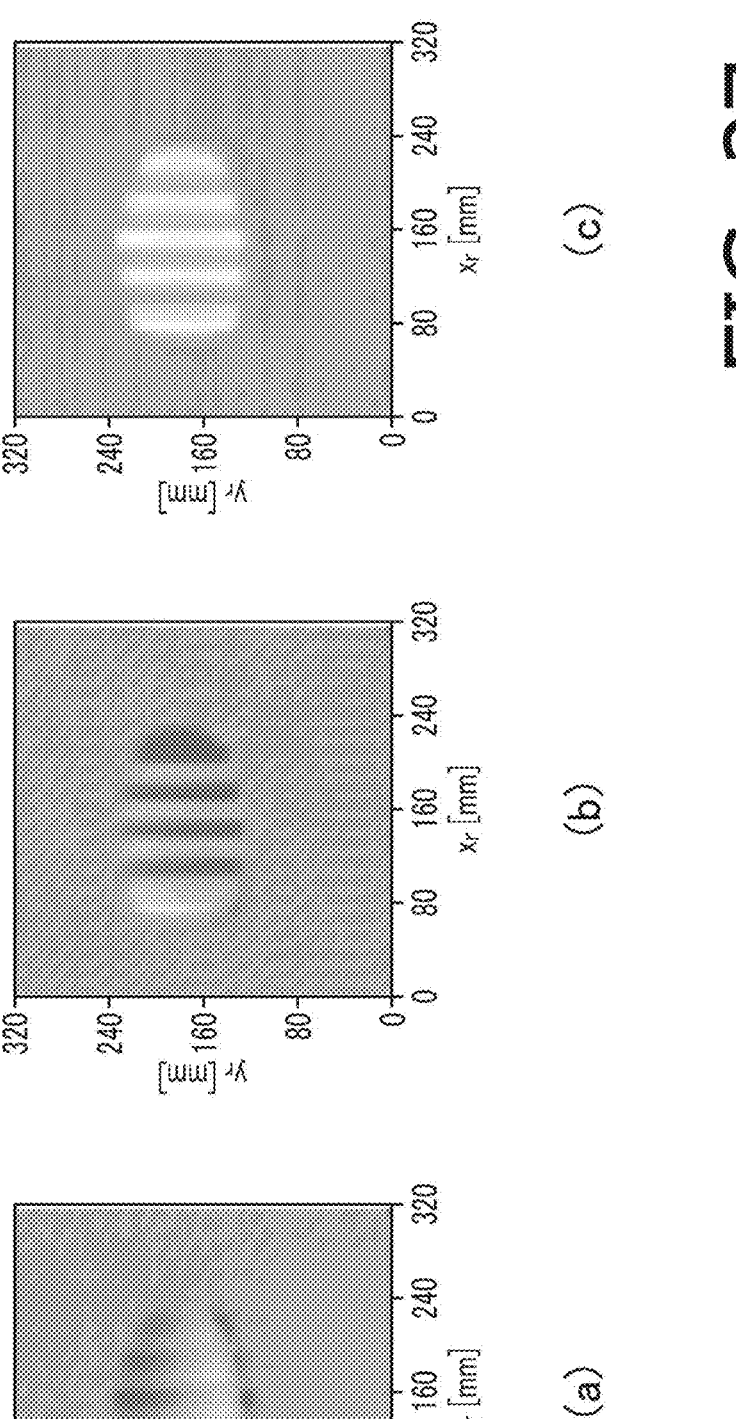
FIG. 37 shows display examples of load profiles.

Then, load profile images created on the basis of the calculated load profiles are displayed on a display device of the interface 76 and the distribution of the load acting on the tire tread is visualized (S11). FIG. 37 shows examples of displayed load profile images. FIG. 37(a) is a load profile image of the tangential forces $f_T$, FIG. 37(b) is a load profile image of the lateral forces $f_L$, and FIG. 37(c) is a load profile image of the radial forces $f_R$. The load profile images shown in FIG. 37 are images generated by converting values of forces at respective positions $(x_r, y_r)$ into brightness. The form of the load profile images is not limited to that of the present embodiment, but may be of another form such as a three dimensional CG image.

Hereinabove, the illustrative embodiments according to aspects of the present disclosure have been described. The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that the present disclosure can be practiced without reapportioning to the details specifically set forth. In other instances, well known processing structures have not been described in detail, in order not to unnecessarily obscure the present disclosure.

Only exemplary illustrative embodiments of the present disclosure and but a few examples of their versatility are shown and described in the present disclosure. It is to be understood that the present disclosure is capable of use in various other combinations and environments and is capable of changes or modifications within the scope of the inventive concept as expressed herein. For instance, according to aspects of the present disclosure, the following modifications are possible.

In the above-described embodiments, the tire testing device 1 includes two belt mechanisms 15. However, the tire testing device 1 may include one belt mechanism 15 or three or more belt mechanisms 15.

In the above-described embodiments, the belt mechanisms 15 are driven by the power generated by the pair of drive parts 14. However, the belt mechanisms 15 may be configured to be driven by one drive part 14 or three or more drive parts 14.

In the above-described embodiments, the toothed belt and the toothed pulleys are used in each of the belt mechanisms 15, 24 and 25. However, a flat belt or a V belt, or a V-ribbed belt having a plurality of V-shaped ribs arranged in the width direction may be used in place of the toothed belt in one or more belt mechanisms. A general-purpose belt having core wires formed by twisting glass fibers may also be used. Other type of winding transmission mechanism such as a chain transmission mechanism or a wire transmission mechanism and other type of power transmission mechanism such as a ball screw mechanism, a gear transmission mechanism or a hydraulic mechanism may also be used in place of each belt mechanism.

In the above-described embodiments, the power for driving the carriage 20 and the power for driving the test wheel W (the spindle 52) are supplied from the common drive parts 14 and are transmitted through the common belt mechanisms 15. However, aspects of the present disclosure are not limited to this configuration. For example, the power for driving the carriage 20 and the power for driving the test wheel W may be generated by separate drive parts and may be transmitted through separate power transmitter (e.g., separate belt mechanisms). In this case, driving of the drive part for driving the carriage and driving of the drive part for driving the test wheel needs to be synchronously controlled in order to synchronize the traveling speed of the carriage 20 and the peripheral speed of the test wheel W.

In the above-described embodiments, simple driving system and control system are realized by commonalizing a portion (the drive parts 14 and the drive belt mechanisms 15) of the mechanism for driving the carriage 20 (a carriage driver) and a portion (the drive parts 14 and the drive belt mechanisms 15) of the mechanism for driving the test wheel W (a test wheel driver). The commonalization of the carriage driver and the test wheel driver (especially the commonalization of the drive parts 14) is made possible due to reduction of load the drive parts 14 bear by the introduction of the torque applying device 30 to isolate a power source for controlling speed of the test wheel W from a power source for controlling torque of the test wheel W.

In the above-described embodiment, a configuration is adopted in which the drive parts 14RA and 14RB on the right serve both as the carriage driver and the rotational motion supplying unit, and the drive parts 14LA and 14LB on the left serve as the carriage driver. However, aspects of the present disclosure are not limited to this configuration. For example, the drive parts 14LA and 14LB on the left may serve both as the carriage driver and the rotational motion supplying unit, and the drive parts 14RA and 14RB on the right may serve as the carriage driver. Alternatively, both the drive parts 14LA and 14LB on the left and the drive parts 14RA and 14RB on the right may serve both as the carriage driver and the rotational motion supplying unit. This configuration is realized, for example, by coupling a total of two shafts 223B of the first driven parts 22R and 22L (in other words, by replacing the two shafts 223B with one long shaft 223B coupling the first driven parts 22R and 22L on the left and on the right).

In the above-described third variation, it is made possible to measure the load profiles of a tire tread that is longer than the length Lx of the detecting area of the sensor array unit 1650 in the X axis direction by changing the rotational position $\theta_W$ of the test wheel W at the initial position $P_{Z0}$ for every measurement set. However, it becomes possible to measure the load profiles of a tire tread that is longer than the length Lx without changing the rotational position $\theta_W$ of the test wheel W at the initial position $P_{Z0}$ for every measurement set by providing a mechanism that makes it possible to change a position of the sensor array unit 1650 in the X axis direction. The mechanism that makes it possible to change the position of the sensor array unit 1650 in the X axis direction can for example be configured with a motor capable of controlling position and a feed screw mechanism (e.g., a ball screw mechanism) as with the mover 1655.

In the above-described embodiment, the rod 124a or the like is supported by a pair of single row bearings 127a or the like in the guide mechanism 12 of the track part 10. However, aspects of the present disclosure are not limited to this configuration. For example, a rod may be supported by one or more multiple row or single row bearings.

In the above-described embodiment, a heat-treated rail is used in the guide mechanism 12 of the track part 10. However, aspects of the present disclosure are not limited to this configuration. For example, a normal rail (JIS E 1101: 2001) or a light rail (JIS E 1103:1993) may be used. Furthermore, in addition to the flat bottom rail, rails having other shapes such as a double-headed rail, a cow-headed rail, and a bridge-shaped rail may be used.

In the above-described embodiment, the motor 141 (AC servo motor) is used in the drive part 14. However, aspects of the present disclosure are not limited to this configuration. In place of the AC servo motor, another type of motor of which speed or position can be controlled (e.g., a DC servo motor or a so-called inverter motor in which an inverter circuit is combined with an AC motor or a brushless motor) may be used.

In the above-described embodiment, the motors 32, 451, and 461, which are AC servo motors, are used in the torque applying device 30, the load adjusting part 42, and the slip angle adjusting part 46, respectively. However, aspects of the present disclosure are not limited to this configuration. In place of an AC servo motor, another type of motor of which position can be controlled (e.g., a DC servo motor or a stepping motor) may be used.

What is claimed is:

1. A tire testing device comprising:

a road surface; and a carriage configured to rotatably hold a test wheel on which a test tire is mounted and traveling along the road surface in a state where the test tire is made to contact the road surface, wherein the carriage includes:

an axle part that rotatably supports the test wheel, and an alignment part configured to adjust wheel alignment of the test wheel by changing orientation of the axle part;

the alignment part includes a load adjusting part configured to adjust load acting on the test wheel by changing a height of the axle part;

the load adjusting part includes:

a first movable frame supported to be movable up and down, linear guides that guide up-and-down movement of the first movable frame, and a first driver that drives the first movable frame up and down;

the linear guides include:

a rail, and a traveling part configured to travel on the rail;

one of the rail and the traveling part is fixed to the first movable frame;

the carriage includes a main frame having an alignment mechanism support part that accommodates the alignment part;

the other of the rail and the traveling part is fixed to the alignment mechanism support part;

the alignment part includes a camber adjusting part configured to adjust a camber angle of the test wheel;

the camber adjusting part includes:

a second movable frame supported so as to be rotatable about an $E_\varphi$ axis parallel to a traveling direction of the carriage, and a φ driver that rotationally drives the second movable frame about the $E_\varphi$ axis;

the camber adjusting part includes curved guides that guide rotation of the second movable frame;

the curved guide includes:

an arc-shaped curved rail disposed concentrically with the $E_\varphi$ axis, and a second traveling part configured to travel on the curved rail;

one of the curved rail and the second traveling part is fixed to the second movable frame;

the alignment mechanism support part, the first movable frame, and the second movable frame each have a substantially inverted U-shaped cross section when cut along a plane orthogonal to a rotation axis of the test wheel;

the linear guides are between inner sides of the substantially inverted U-shape of the alignment mechanism support part and outer sides of the substantially inverted U-shape of the first movable frame so that the first movable frame is sandwiched by the linear guides; and the curved guides are between the inner sides of the substantially inverted U-shape of the first movable frame and the outer sides of the substantially inverted U-shape of the second movable frame so that the second movable frame is sandwiched by the curved guides.

2. The tire testing device according to claim 1, wherein the camber adjusting part includes:

a cylindrical first pivot disposed coaxially with the $E_\varphi$ axis, and a first bearing that rotatably supports the first pivot; and one of the first pivot and the first bearing is fixed to the second movable frame.

3. The tire testing device according to claim 2, wherein the other of the first pivot and the first bearing is fixed to the first movable frame.

4. The tire testing device according to claim 1, wherein the alignment part includes a slip angle adjusting part configured to adjust a slip angle of the test wheel; and the slip angle adjusting part includes:

a third movable frame supported to be rotatable about an $E_\theta$ axis orthogonal to each of an $E_\lambda$ axis being a rotation axis of the test wheel and the $E_\varphi$ axis, and a θ driver that rotationally drives the third movable frame about the $E_\theta$ axis.

5. The tire testing device according to claim 4, wherein the slip angle adjusting part includes:

a cylindrical second pivot disposed coaxially with the $E_\theta$ axis, and a second bearing that rotatably supports the second pivot; and one of the second pivot and the second bearing is fixed to the third movable frame.

6. The tire testing device according to claim 1, wherein the axle part includes:

a spindle;

a third bearing that rotatably supports the spindle; and a wheel hub coaxially attached to a distal end portion of the spindle and to which the test wheel is to be attached.

7. A tire testing device comprising:

a road surface; and a carriage configured to rotatably hold a test wheel on which a test tire is mounted and traveling along the road surface in a state where the test tire is made to contact the road surface, wherein the carriage includes:

an axle part that rotatably supports the test wheel, an alignment part configured to adjust wheel alignment of the test wheel by changing orientation of the axle part, and a main frame having an alignment mechanism support part that accommodates the alignment part;

the alignment part includes a load adjusting part configured to adjust load acting on the test wheel by changing a height of the axle part;

the load adjusting part includes:

a first movable frame supported to be movable up and down, a linear guide that guides up-and-down movement of the first movable frame, and a first driver that drives the first movable frame up and down;

the alignment part includes a camber adjusting part configured to adjust a camber angle of the test wheel;

the camber adjusting part includes:

a second movable frame supported so as to be rotatable about an $E_\varphi$ axis parallel to a traveling direction of the carriage, a φ driver that rotationally drives the second movable frame about the $E_\varphi$ axis, a cylindrical first pivot disposed coaxially with the $E_\varphi$ axis, and a first bearing that rotatably supports the first pivot;

one of the first pivot and the first bearing is fixed to the second movable frame;

the other of the first pivot and the first bearing is fixed to the first frame;

the camber adjusting part includes a curved guide that guides rotation of the second movable frame;

the curved guide includes:

an arc-shaped curved rail disposed concentrically with the $E_\varphi$ axis, and a second traveling part configured to travel on the curved rail;

one of the curved rail and the second traveling part is fixed to the second movable frame;

the alignment mechanism support part, the first movable frame, and the second movable frame each have a substantially inverted U-shaped cross section when cut along a plane orthogonal to a rotation axis of the test wheel;

the linear guides are between inner sides of the substantially inverted U-shape of the alignment mechanism support part and outer sides of the substantially inverted U-shape of the first movable frame so that the first movable frame is sandwiched by the linear guides; and the curved guides are between the inner sides of the substantially inverted U-shape of the first movable frame and the outer sides of the substantially inverted U-shape of the second movable frame so that the second movable frame is sandwiched by the curved guides.

8. The tire testing device according to claim 7, wherein the linear guide includes:

a rail, and a traveling part configured to travel on the, rail; and one of the rail and the traveling part is fixed to the first movable frame.

9. The tire testing device according to claim 8, wherein the other of the rail and the traveling part is fixed to the alignment mechanism support part.

10. The tire testing device according to claim 7, wherein the alignment part includes a slip angle adjusting part configured to adjust a slip angle of the test, wheel; and the slip angle adjusting part includes:

a third movable frame supported to be rotatable about an $E_\theta$ axis orthogonal to each of an $E_\lambda$ axis being a rotation axis of the test wheel and the $E_\varphi$ axis, and a $\theta$ driver that rotationally drives the third movable frame about the $E_\theta$ axis.

11. The tire testing device according to claim 10, wherein the slip angle adjusting part includes:

a cylindrical second pivot disposed coaxially with the $E_\theta$ axis, and a second bearing that rotatably supports the second pivot; and one of the second pivot and the second bearing is fixed to the third movable frame.

12. The tire testing device according to claim 7, wherein the axle part includes:

a spindle;

a third bearing that rotatably supports the spindle; and a wheel hub coaxially attached to a distal end portion of the spindle and to which the test wheel is to be attached.

\* \* \* \* \*